US012513302B2

(12) United States Patent
Rufitskiy et al.

(10) Patent No.: US 12,513,302 B2
(45) Date of Patent: Dec. 30, 2025

(54) MAGNITUDE PREDICTION WITH CANDIDATE PRUNING

(71) Applicant: Comcast Cable Communications, LLC, Philadelphia, PA (US)

(72) Inventors: Vasily Alexeevich Rufitskiy, Vladimir (RU); Alexey Konstantinovich Filippov, Khimki (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 101 days.

(21) Appl. No.: 18/453,923

(22) Filed: Aug. 22, 2023

(65) Prior Publication Data

US 2024/0064308 A1 Feb. 22, 2024

Related U.S. Application Data

(60) Provisional application No. 63/399,875, filed on Aug. 22, 2022.

(51) Int. Cl.
*H04N 19/137* (2014.01)
*H04N 19/105* (2014.01)
*H04N 19/176* (2014.01)

(52) U.S. Cl.
CPC ......... *H04N 19/137* (2014.11); *H04N 19/105* (2014.11); *H04N 19/176* (2014.11)

(58) Field of Classification Search
CPC ... H04N 19/137; H04N 19/105; H04N 19/176
USPC .................................................. 375/240.02
See application file for complete search history.

(56) References Cited

U.S. PATENT DOCUMENTS

| 2015/0373370 A1 | 12/2015 | Rapaka et al. |
| 2018/0278951 A1 | 9/2018 | Seregin et al. |
| 2022/0086451 A1 | 3/2022 | Bae et al. |

(Continued)

FOREIGN PATENT DOCUMENTS

WO    WO-2024010338 A1 *  1/2024

OTHER PUBLICATIONS

JVET-AB0170-v1, Joint Video Experts Team (JVET) of ITU-T SG16 WP3, 28th Meeting, Mainz, Germany, Oct. 20-28, 2022, Source: Ofinno, LLC, Title: Non-EE2: Block Vector Difference Prediction for IBC blocks.

(Continued)

*Primary Examiner* — Albert Kir
(74) *Attorney, Agent, or Firm* — Banner & Witcoff, Ltd.

(57) ABSTRACT

Encoding and/or decoding a block of a video frame may be based on a previously decoded reference block in the same frame or a different frame. The reference block may be indicated by a block vector (BV). A block vector difference (BVD) predictor may be used to make predictions about the magnitude of a BVD. The BVD predictor may be selected from BVD candidates, which may be pruned based on costs associated with them. Pruning the BVD candidates may improve additional predictions and thus improve the compression efficiency of the predictions. A motion vector difference (MVD) predictor may be used to make predictions about the magnitude of an MVD. The MVD may be used with a motion vector predictor (MVP) to indicate a motion vector (MV).

20 Claims, 25 Drawing Sheets

(56) References Cited

U.S. PATENT DOCUMENTS

| | | | | |
|---|---|---|---|---|
| 2023/0095946 A1* | 3/2023 | Ruiz Coll | .............. | H04N 19/52 |
| | | | | 375/240.02 |
| 2023/0217013 A1* | 7/2023 | Nien | .................... | H04N 19/593 |
| | | | | 375/240.12 |
| 2023/0283780 A1* | 9/2023 | Bae | ...................... | H04N 19/159 |
| | | | | 375/240.02 |
| 2025/0150615 A1* | 5/2025 | Ruiz Coll | ............ | H04N 19/167 |
| 2025/0211767 A1* | 6/2025 | Chen | ...................... | H04N 19/44 |

OTHER PUBLICATIONS

JVET-AC0104-v2, Joint Video Experts Team (JVET) of ITU-T SG16 WP3, 29th Meeting, by teleconference, Jan. 11-20, 2023, Source: Ofinno, LLC, Title: EE2-3.3: Block Vector Difference Prediction for IBC blocks.

JVET-AC0239-v2, Joint Video Experts Team (JVET) of ITU-T SG16 WP3, 29th Meeting, by teleconference, Jan. 11-20, 2023, Source: Ofinno, LLC, Title: Non-EE2: Prediction of MVD magnitude suffix bins.

JVET-K0067-v1, Joint Video Experts TEAm (JVET) of ITU-T SG16 WP3, 11th Meeting, Ljubljana, Slovenia, Jul. 10-18, 2018, Source: Huawei Technologies, Title: CE9: Motion vector difference signs derivation (Test 4.2).

Dec. 6, 2023—International Search Report—App. No. PCT/US2023/030854.

* cited by examiner

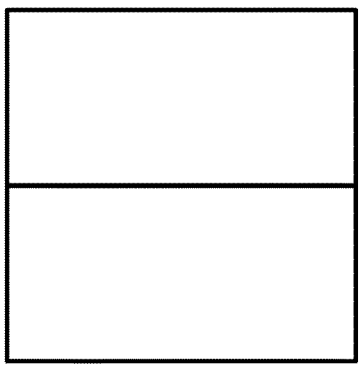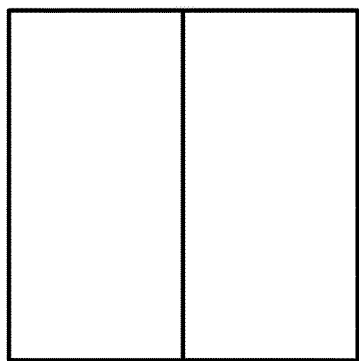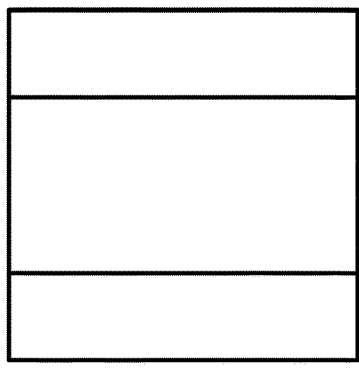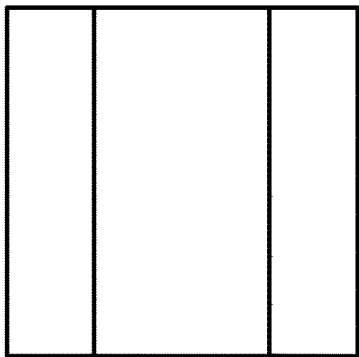
FIG. 6

The quick brown fox jumps over the lazy dog. The quick brown fox jumps over the lazy dog. The quick brown fox jumps over the lazy dog.

FIG. 16

MAGNITUDE PREDICTION WITH CANDIDATE PRUNING

CROSS-REFERENCE TO RELATED APPLICATIONS

This application claims the benefit of U.S. Provisional Application No. 63/399,875 filed on Aug. 22, 2022. The above referenced application is hereby incorporated by reference in its entirety.

BACKGROUND

A computing device processes video for storage, transmission, reception, and/or display. Processing a video comprises encoding and/or decoding, for example, to reduce a data size associated with the video.

SUMMARY

The following summary presents a simplified summary of certain features. The summary is not an extensive overview and is not intended to identify key or critical elements.

A video may comprise a sequence of frames (pictures) displayed consecutively. Predictive encoding and decoding may involve the use of information associated with blocks, within a frame, to encode and/or decode other blocks in the same frame or between frames (e.g., consecutive frames) in a sequence of frames. For example, information associated with a block (e.g., luma and/or chroma components of the block) may be encoded using previously decoded information associated with a reference block in the same frame or a previous frame. A reference block may be indicated in the form of a block vector (BV) that represents the location of the reference block with respect to a current block being encoded or decoded. The BV may be indicated as a function of certain elements including, for example, a block vector predictor (BVP) and block vector difference (BVD) for reducing signaling overhead required for directly indicating the BV. Compressing the symbols of such elements may be limited, for example, if those symbols have a uniform probability distribution. Rather than directly signaling the magnitude of the BVD, the magnitude symbols of the BVD may be predicted and an indication may be signaled indicating whether the prediction was correct. The magnitude symbol predictions may have a non-uniform distribution, which may improve compression efficiency. A BVD predictor may be used to predict the magnitude symbols of the BVD. The BVD predictor may be selected from multiple BVD candidates, for example, based on a cost associated with the BVD predictor such as a template matching cost. A subset of BVD candidates may be determined based on the BVD predictor, for example, by pruning the BVD candidates. The subset of BVD candidates may be used to predict another magnitude symbol of the BVD. Using a subset of BVD candidates to predict an additional magnitude symbol of a BVD may improve predictions of additional magnitude symbols, resulting in an improvement of the compression efficiency of the magnitude symbol predictions, and a reduction of the overhead needed to signal the magnitude symbol predictions. The disclosures provided herein may also be used to predict magnitude symbols of a motion vector difference (MVD), which may be used with a motion vector predictor (MVP) to determine a motion vector (MV).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6 shows example binary tree and ternary tree partitions.

FIG. 16 shows an example of intra block copy (IBC) for encoding.

DETAILED DESCRIPTION

Figure 1:
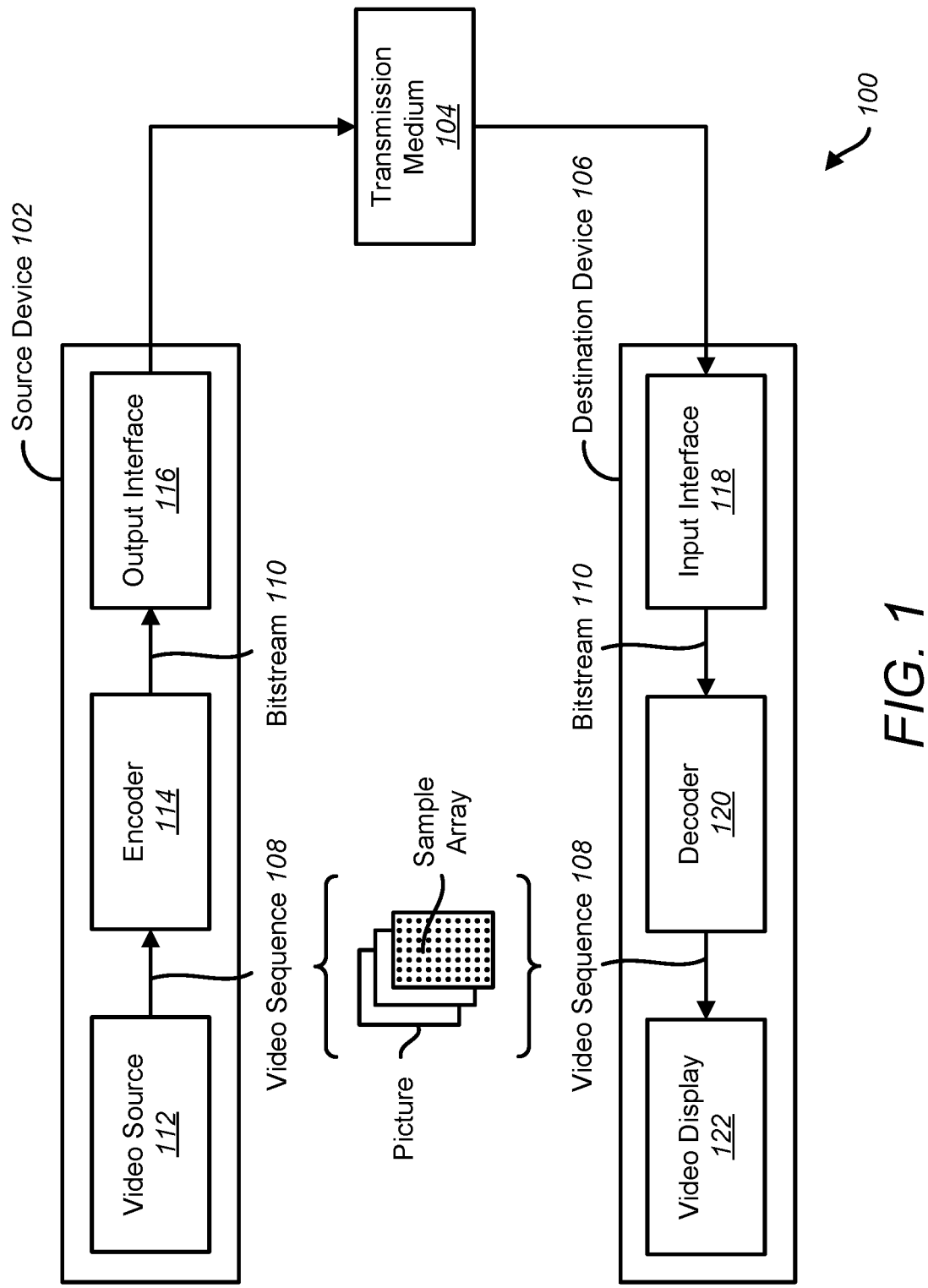
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
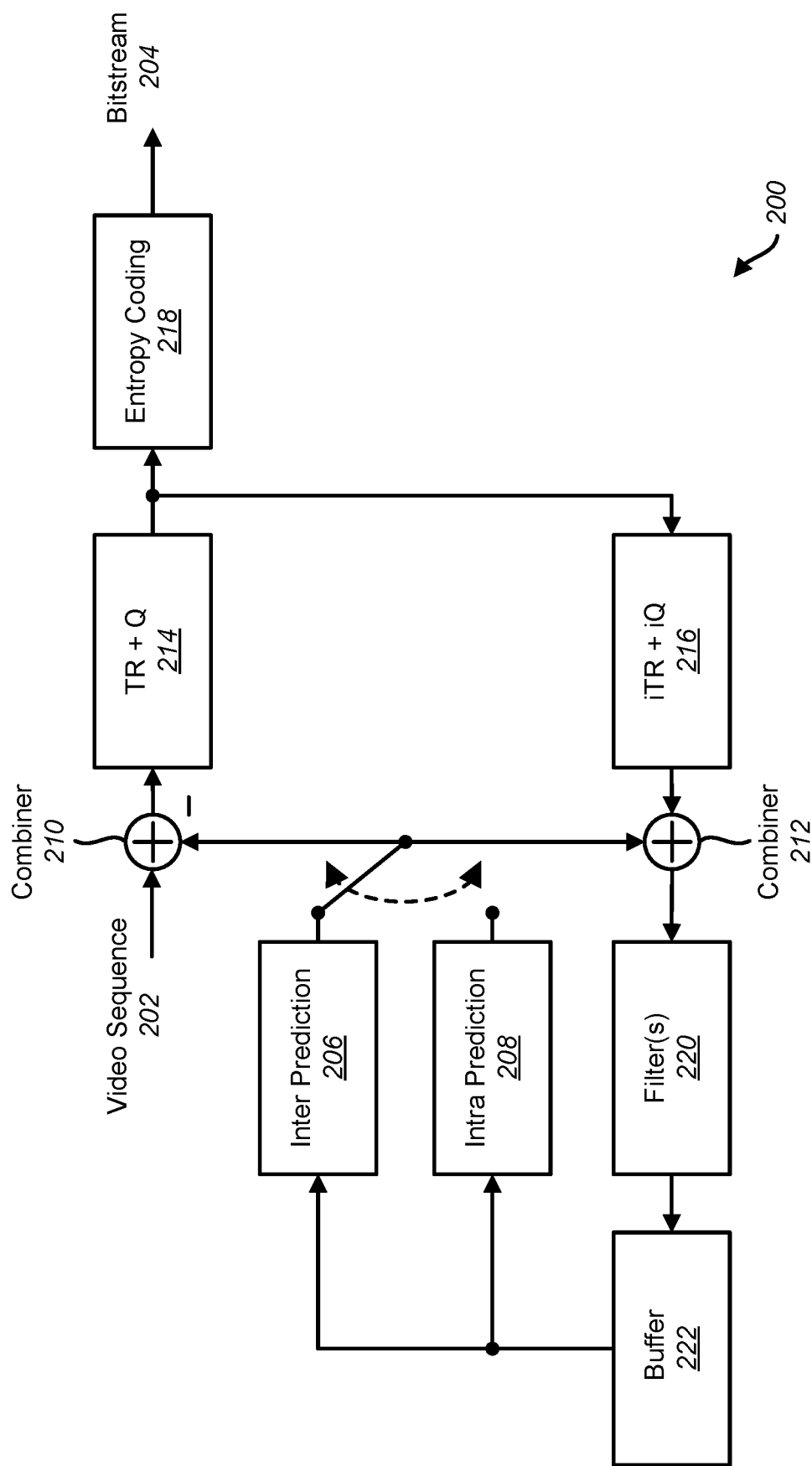
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
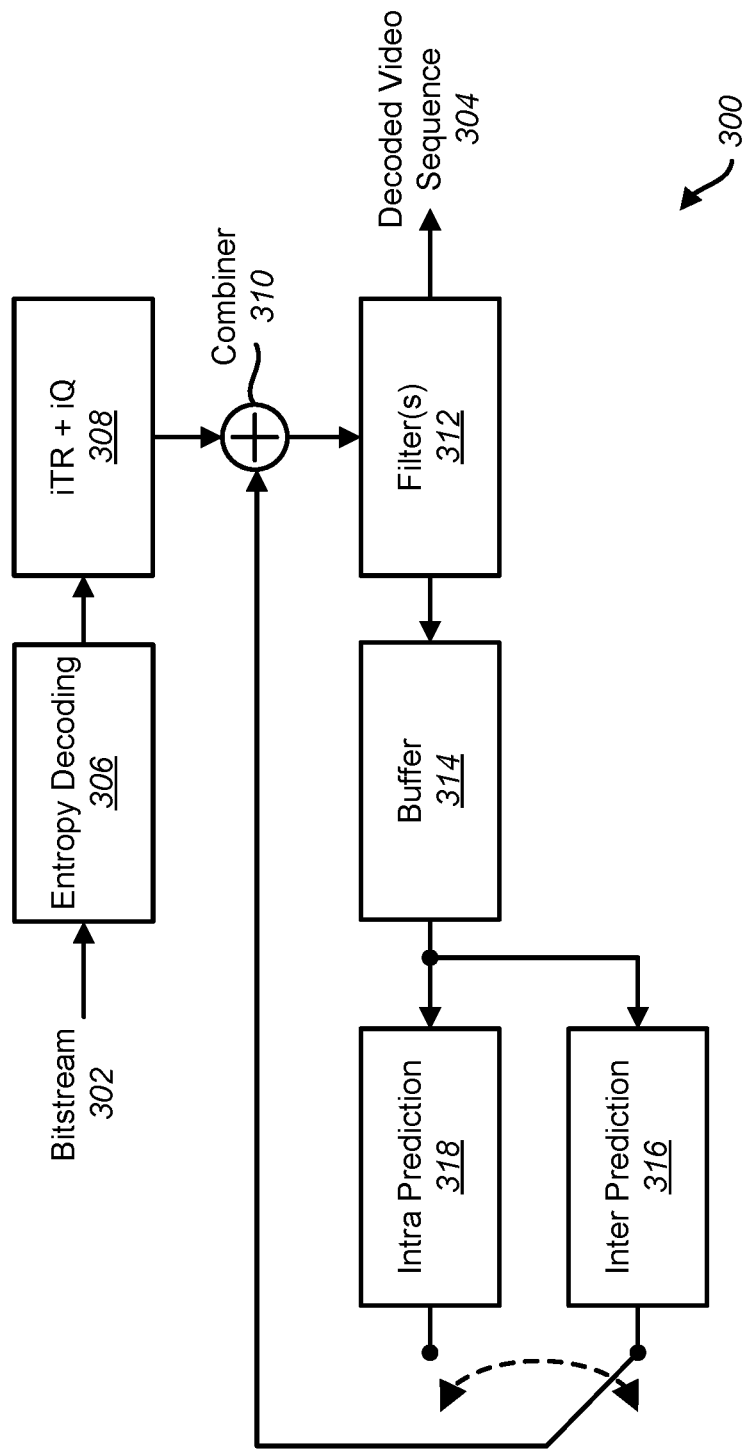
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
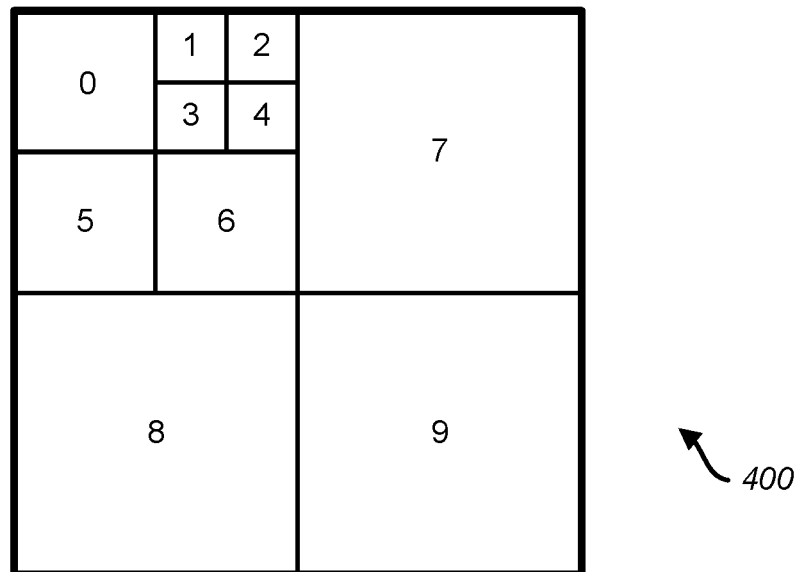
FIG. 4 shows an example quadtree partitioning of a coding tree block (CTB).
Figure 5:
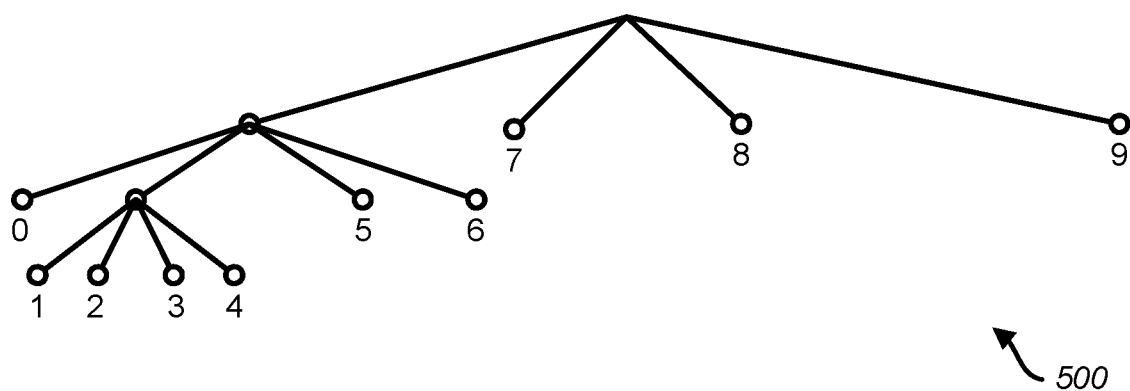
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CB s of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
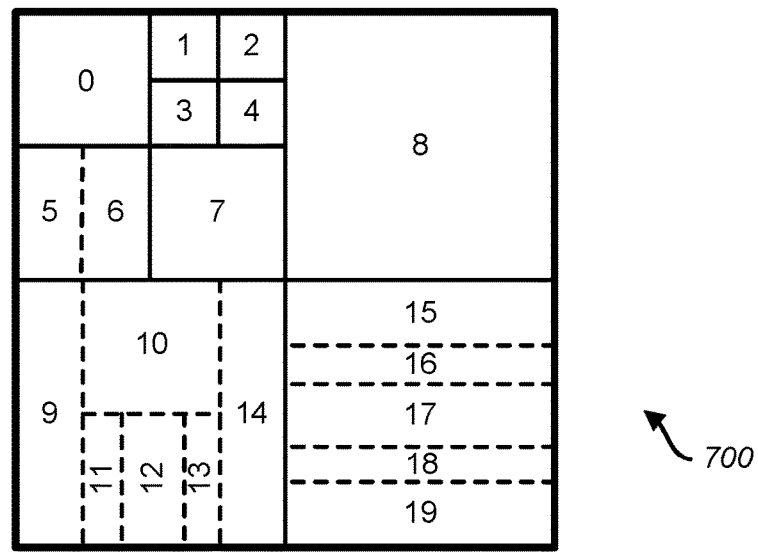
FIG. 7 shows an example of combined quadtree and multi-type tree partitioning of a CTB.
Figure 8:
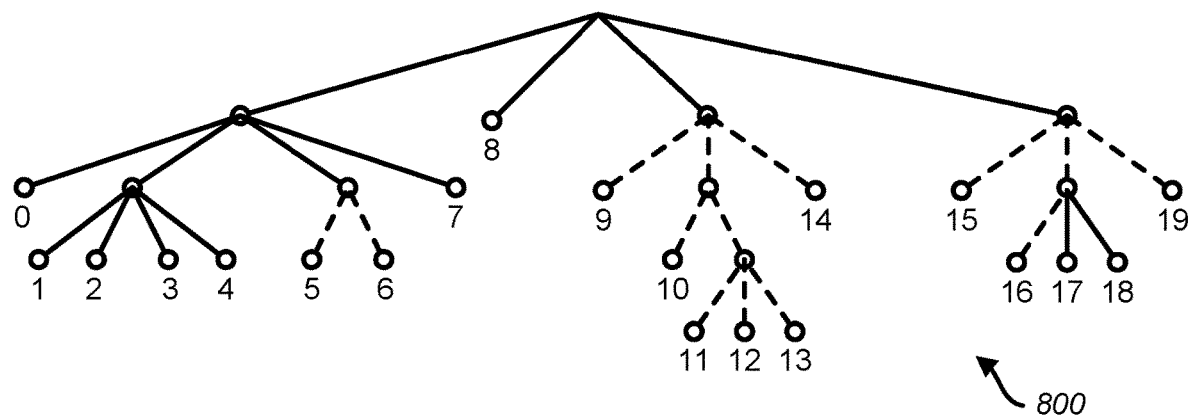
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CB s may be leaf CB s respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CB s based on a horizontal ternary tree partition. Two of the three CBs may be leaf CBs respectively labeled 15 and 19 in FIGS. 7 and 8. The remaining, non-leaf CB may be partitioned into three CB s based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
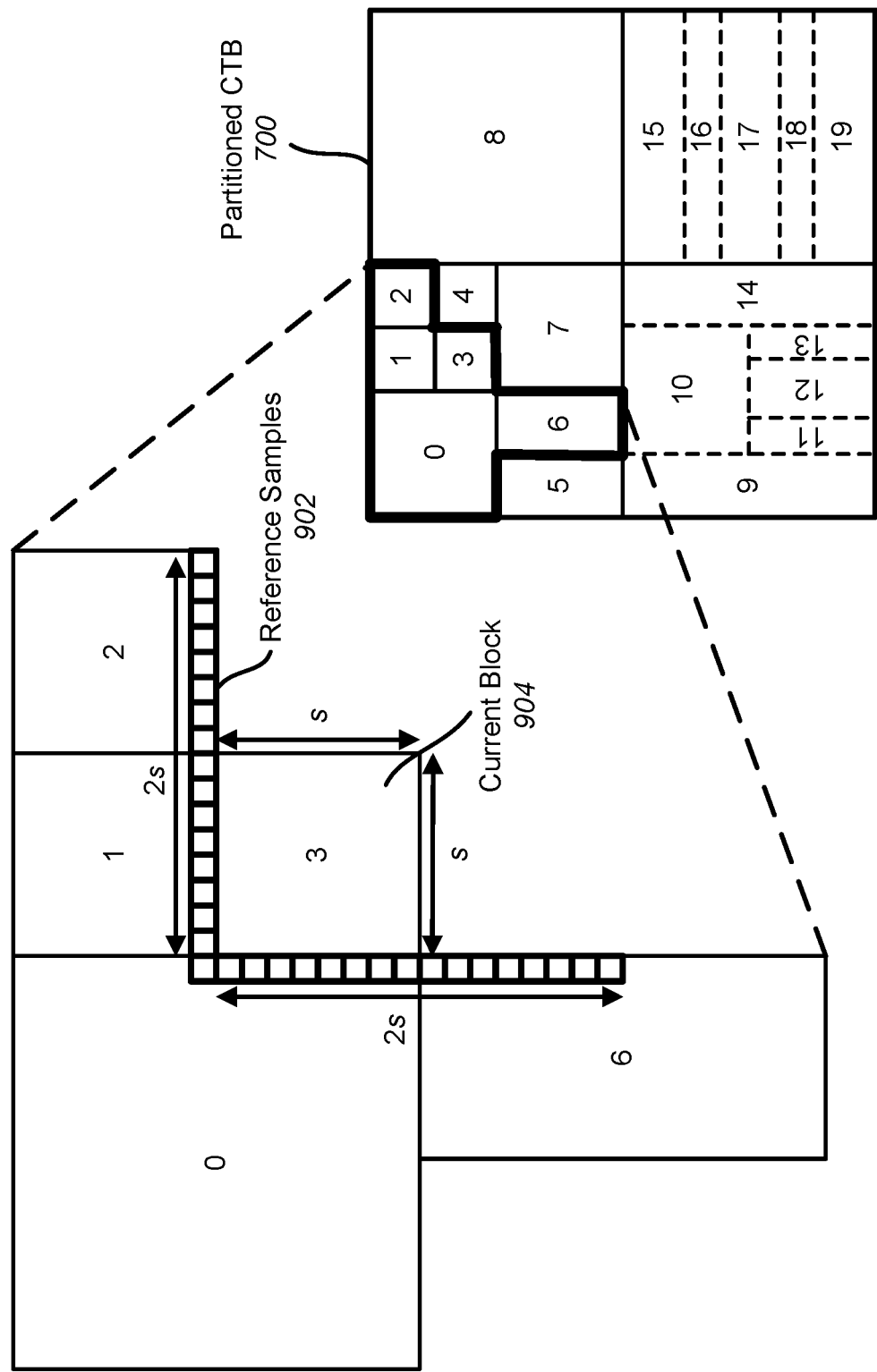
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
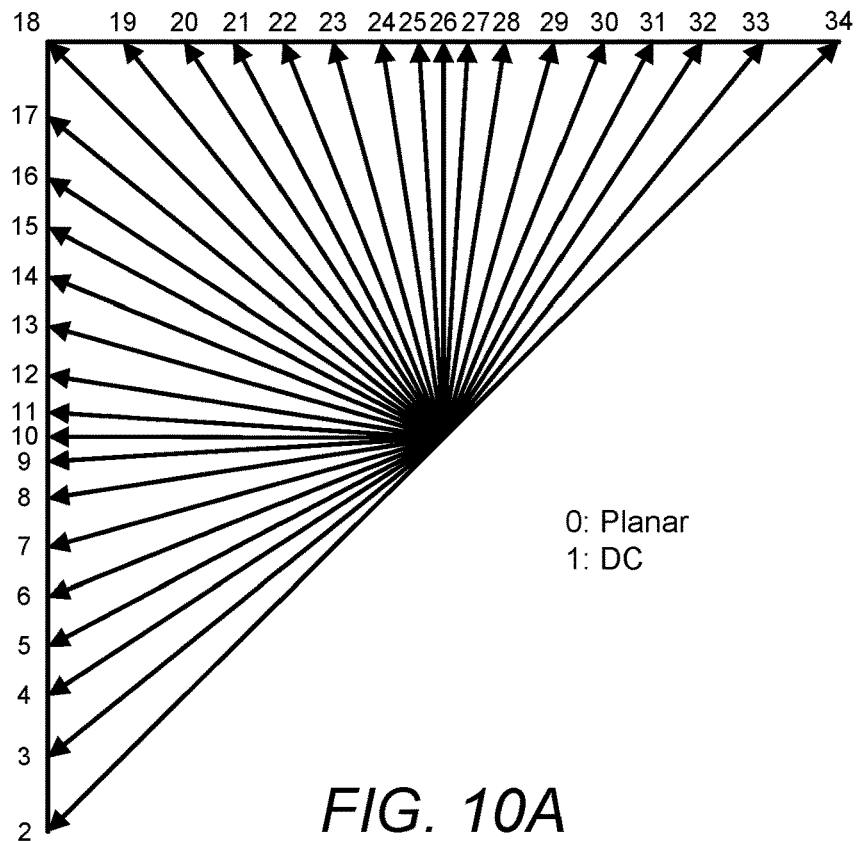
FIGS. 10A and 10B show example intra prediction modes.
Figure 10B:
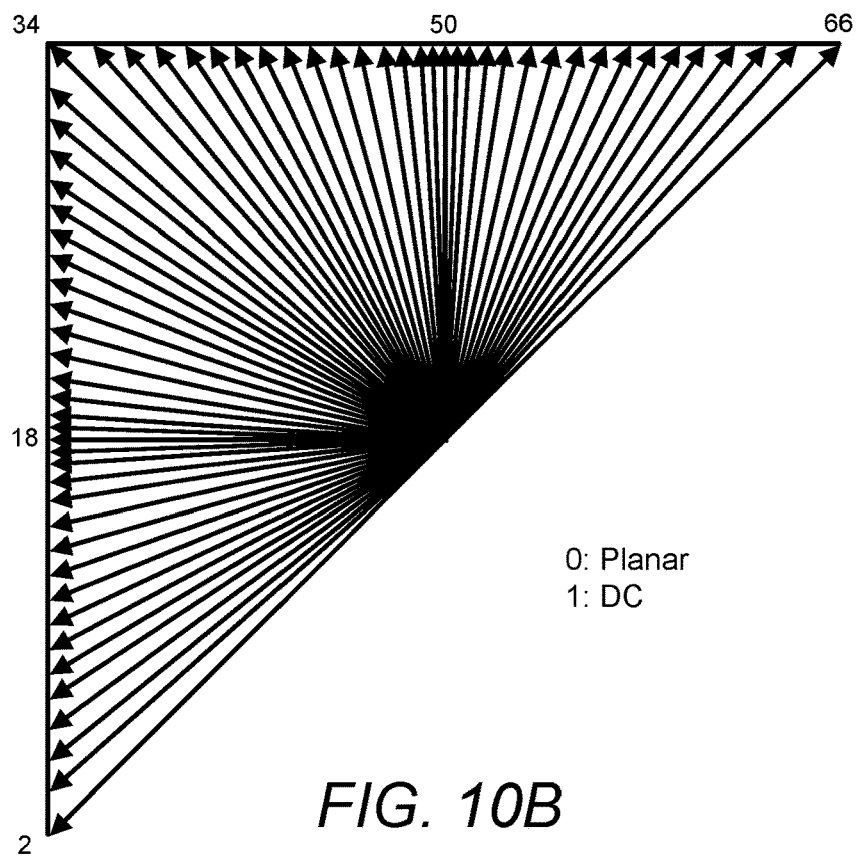

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
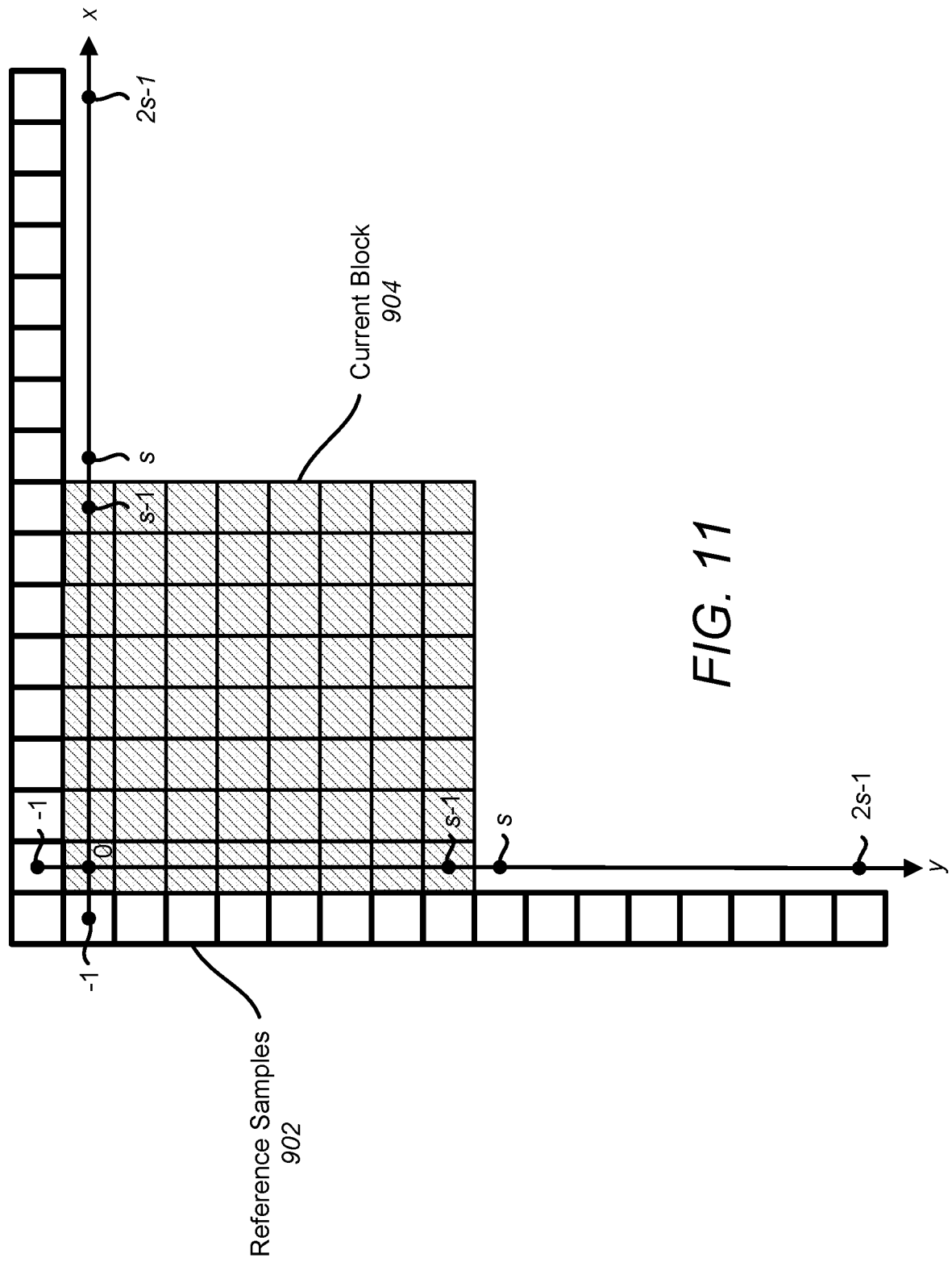
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x] [y]. In order to simplify the prediction process, the reference samples 902 may be placed in two, one-dimensional arrays. The reference samples 902, above the current block 904, may be placed in the one-dimensional array $ref_1[x]$:

$$ref_1[x]=p[-1+x][-1], (x \geq 0). \quad (1)$$

The reference samples 902 to the left of the current block 904 may be placed in the one-dimensional array $ref_2[y]$:

$$ref_2[y]=p[-1][-1+y], (y \geq 0). \quad (2)$$

The prediction process may comprise determination of a predicted sample p[x] [y] (e.g., a predicted value) at a location [x] [y] in the current block 904. For planar mode, a sample at the location [x] [y] in the current block 904 may be predicted by determining/calculating the mean of two interpolated values. The first of the two interpolated values may be based on a horizontal linear interpolation at the location [x] [y] in the current block 904. The second of the two interpolated values may be based on a vertical linear interpolation at the location [x] [y] in the current block 904. The predicted sample p[x] [y] in the current block 904 may be determined/calculated as:

$$p[x][y] = \frac{1}{2 \cdot s}(h[x][y] + v[x][y] + s), \quad (3)$$

where $$h[x][y]=(s-x-1) \cdot ref_2[y]+(x+1) \cdot ref_1[s] \quad (4)$$

may be the horizontal linear interpolation at the location [x] [y] in the current block 904 and $$v[x][y]=(s-y-1) \cdot ref_1[x]+(y+1) \cdot ref_2[s] \quad (5)$$

may be the vertical linear interpolation at the location [x] [y] in the current block 904. s may be equal to a length of a side (e.g., a number of samples on a side) of the current block 904.

A sample at a location [x] [y] in the current block 904 may be predicted by the mean of the reference samples 902, such as for a DC mode. The predicted sample p[x] [y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \tag{6}$$

A sample at a location [x] [y] in the current block 904 may be predicted by projecting the location [x] [y] in a direction specified by a given angular mode to a point on the horizontal or vertical line of samples comprising the reference samples 902, such as for an angular mode. The sample at the location [x] [y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
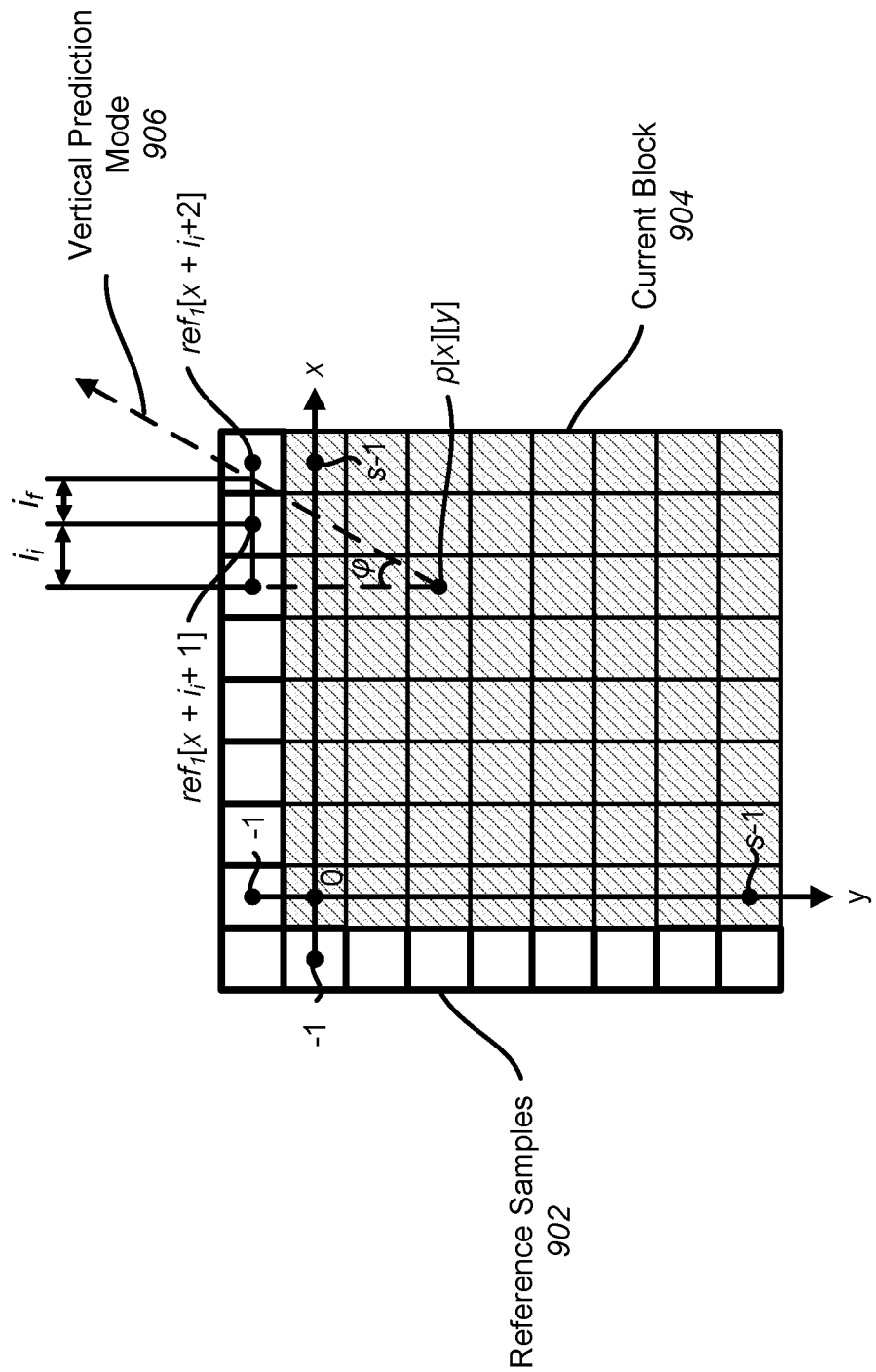
FIG. 12 shows an example application of an intra prediction mode for prediction of a current block.

FIG. 12 shows an example application of an intra prediction mode for prediction of current block. FIG. 12 specifically shows prediction of a sample at a location [x] [y] in the current block 904 for a vertical prediction mode 906. The vertical prediction mode 906 may be given by an angle φ with respect to the vertical axis. The location [x] [y] in the current block 904, in vertical prediction modes, may be projected to a point (e.g., a projection point) on the horizontal line of reference samples $ref_1[y]$. The reference samples 902 are only partially shown in FIG. 12 for ease of illustration. As shown in FIG. 12, the projection point on the horizontal line of reference samples $ref_1[y]$ may not be exactly on a reference sample. A predicted sample p[x] [y] in the current block 904 may be determined/calculated by linearly interpolating between the two reference samples, for example, if the projection point falls at a fractional sample position between two reference samples. The predicted sample p[x] [y] may be determined/calculated as:

$$p[x][y]=(1-i_f)\cdot ref_1[x+i_i+1]+i_f ref_1[x+i_i+2]. \tag{7}$$

$i_i$ may be the integer part of the horizontal displacement of the projection point relative to the location [x] [y]. $i_i$ may be determined/calculated as a function of the tangent of the angle φ of the vertical prediction mode 906 as:

$$i_i = \lfloor (y+1)\cdot \tan \varphi \rfloor. \tag{8}$$

$i_f$ may be the fractional part of the horizontal displacement of the projection point relative to the location [x] [y] and may be determined/calculated as:

$$i_f = ((y+1)\cdot \tan \varphi) - \lfloor (y+1)\cdot \tan \varphi \rfloor, \tag{9}$$

where $\lfloor \cdot \rfloor$ is the integer floor function.

A location [x] [y] of a sample in the current block 904 may be projected onto the vertical line of reference samples $ref_2[y]$, such as for horizontal prediction modes. A predicted sample p[x] [y] for horizontal prediction modes may be determined/calculated as:

$$p[x][y]=(1-i_f)\cdot ref_2[y+i_i+1]+i_f ref_2[y+i_i+2]. \tag{10}$$

$i_i$ may be the integer part of the vertical displacement of the projection point relative to the location [x] [y]. $i_i$ may be determined/calculated as a function of the tangent of the angle φ of the horizontal prediction mode as:

$$i_i = \lfloor (x+1)\cdot \tan \varphi \rfloor. \tag{11}$$

i f may be the fractional part of the vertical displacement of the projection point relative to the location [x] [y]. $i_f$ may be determined/calculated as:

$$i_f = ((x+1)\cdot \tan \varphi) - \lfloor (x+1)\cdot \tan \varphi \rfloor, \tag{12}$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x] [y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on i f (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x] [y], for vertical prediction modes, may be determined based on the four-tap FIR filter as:

$$p[x][y] = \sum_{i=0}^{3} fT[i]\cdot ref_1[x+iIdx+i], \tag{13}$$

where fT[i], i=0 . . . 3, may be the filter coefficients, and I dx is integer displacement. A predicted sample p[x] [y], for horizontal prediction modes, may be determined based on the four-tap FIR filter as:

$$p[x][y] = \sum_{i=0}^{3} fT[i]\cdot ref_2[y+iIdx+i]. \tag{14}$$

Supplementary reference samples may be determined/constructed if the location [x] [y] of a sample in the current block 904 to be predicted is projected to a negative x coordinate. The location [x] [y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x] [y] of a sample in the current block 904 to be predicted is projected to a negative y coordinate. The location [x] [y] of a sample may be projected to a negative y coordinate, for example, if negative horizontal prediction angles φ are used. The supplementary reference samples may be determined/constructed by projecting the reference samples in $ref_1[y]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
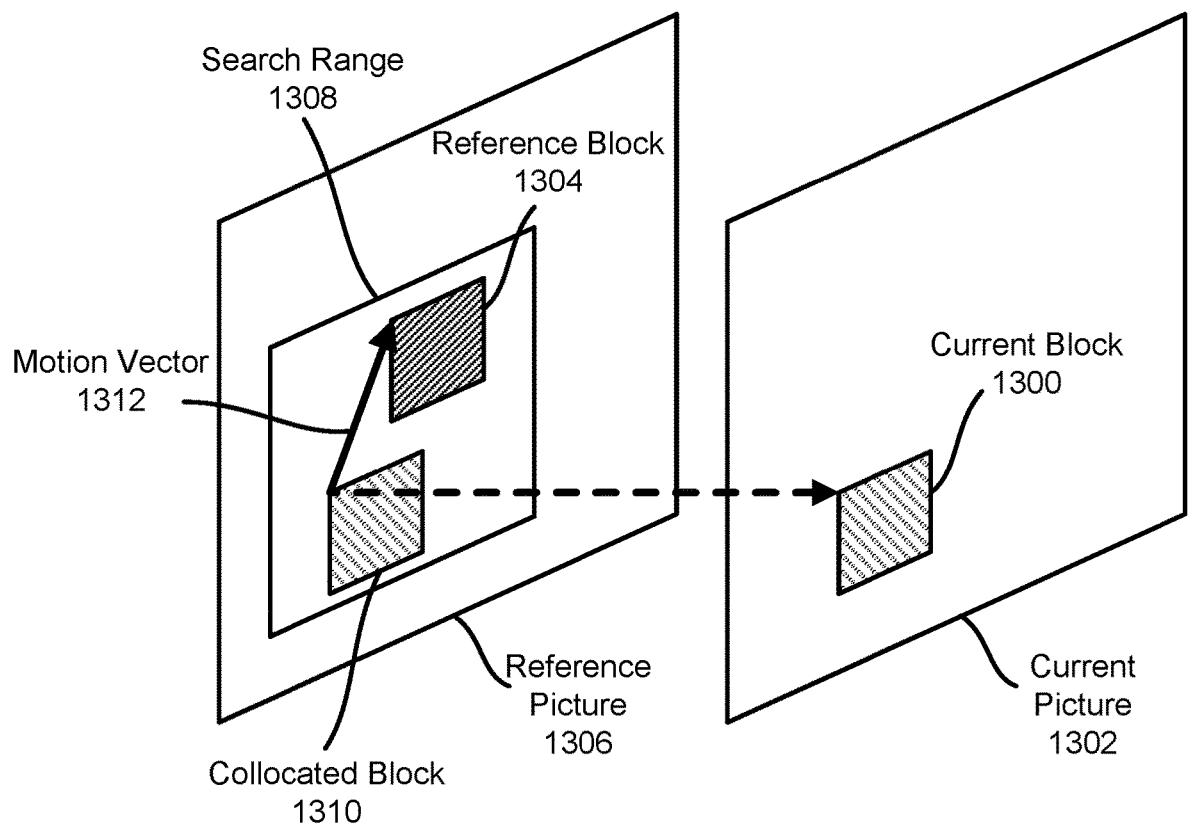
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
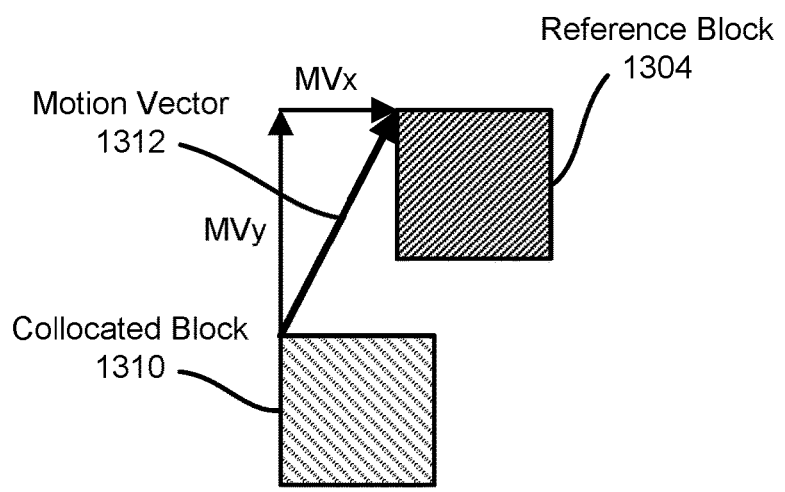
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
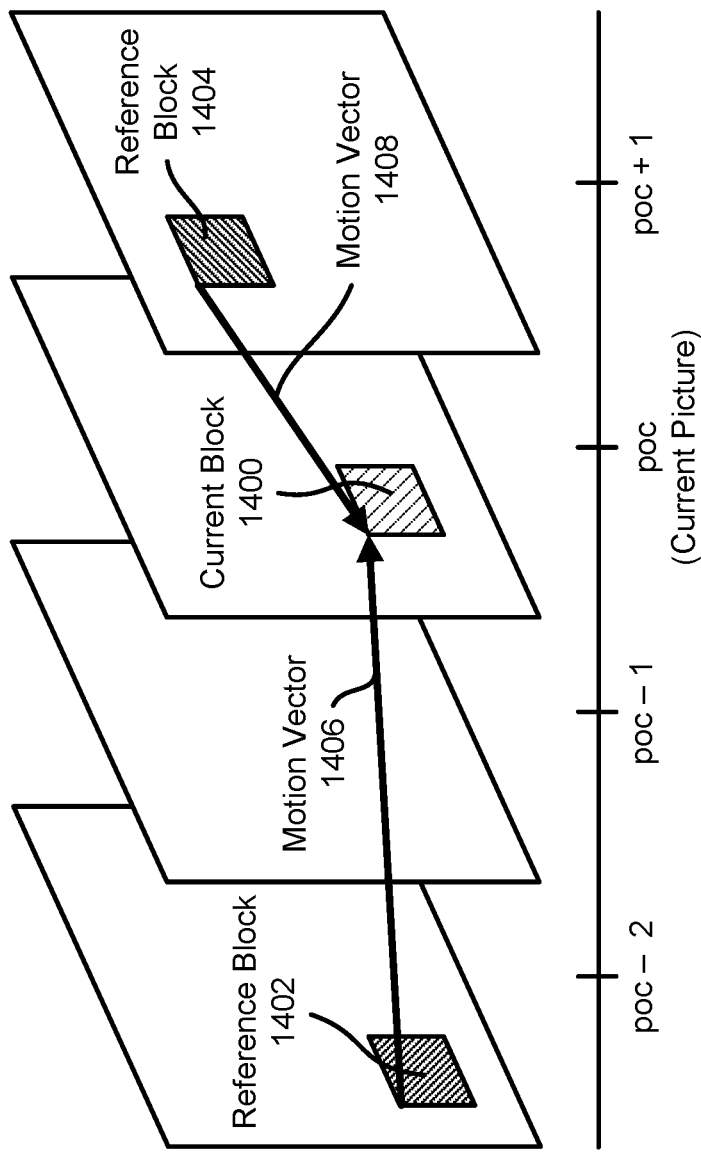
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/ indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components MVD, and MVD y . MVD, and MVD y may be determined/calculated as:

$$MVD_x = MV_x - MVP_x, \quad (15)$$

$$MVD_y = MV_y - MVP_y. \quad (16)$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
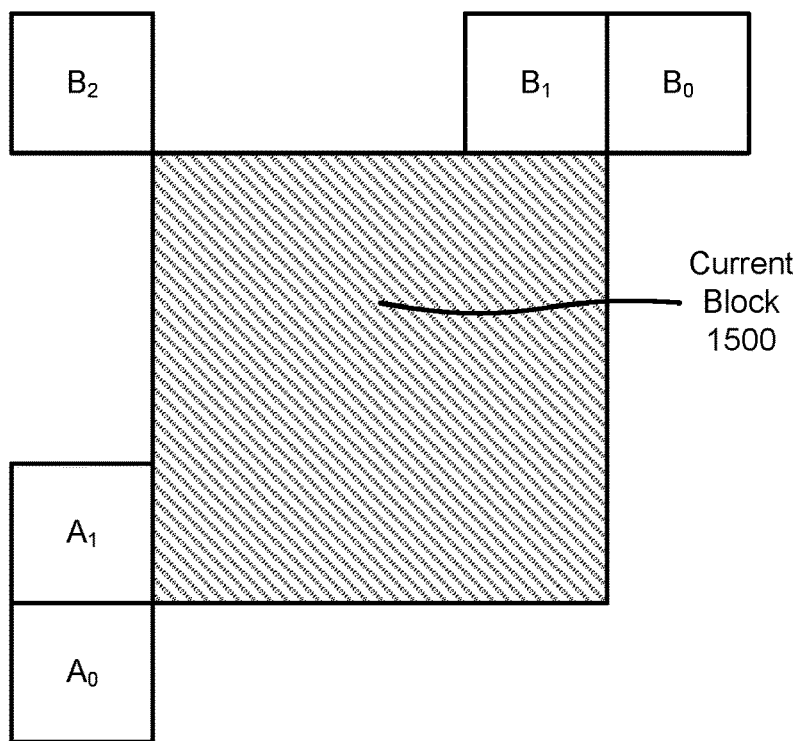
FIG. 15A shows example spatial candidate neighboring blocks for a current block.
Figure 15B:
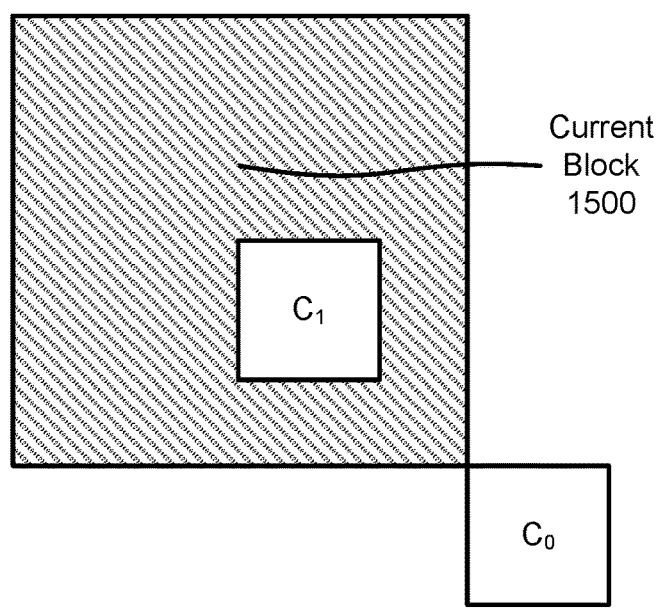
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component (BVx) and a vertical component (BVy)) relative to a position of the current block being coded, the BVD may represented by two components $BVD_x$ and $BVD_y$. $BVD_x$ and $BVD_y$ may be determined/calculated as:

$$BVD_x = BV_x - BVP_x, \quad (17)$$

$$BVD_y = BV_y - BVP_y. \quad (18)$$

BVDx and BVDy may respectively represent horizontal and vertical components of the BVD. BVPx and BVPy may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted A0, A1, B0, B1, and B2.

As described herein (e.g., with respect to FIGS. 2 and 3), entropy coding may be performed at the end of a video encoding process and at the beginning of a video decoding process. Entropy coding is a technique for compressing a sequence of symbols (e.g., 0 and 1) by representing symbols with a greater probability of occurring using fewer bits than symbols with a less probability of occurring. Shannon's information theory provides that the optimal average code length for a symbol with probability p is $-\log_2 p$, for example, if the compressed sequence of symbols is represented in bits (e.g., {0, 1}).

Arithmetic coding is one method of entropy coding. Arithmetic coding is based on recursive interval subdivision. To arithmetically encode a symbol that takes a value from an m-ary source alphabet, an initial coding interval may be divided into m disjoint subintervals. Each of the m disjoint subintervals may have a width proportional to the probability of the symbol having a different one of the values in the m-ary source alphabet. The probabilities of the symbol having the different values in the m-ary source alphabet may be referred to as a probability model for the symbol. The symbol is arithmetically encoded by choosing the subinterval corresponding to the actual value of the symbol as the new coding interval. By recursively using this interval-subdivision scheme to each symbol $s_i$ of a given sequence $s = \{s_1, s_2, \ldots, s_N\}$, the encoder may determine a value in the range of the final coding interval, after the Nth interval subdivision, as the arithmetic code word for the sequence s. Each successive symbol of the sequence s that is encoded reduces the size of the coding interval in accordance with the probability model of the symbol. The more likely symbol values reduce the size of the coding interval by less than the unlikely symbol values and hence add fewer bits to the arithmetic code word for the sequence s in accordance with the general principle of entropy coding.

Arithmetic decoding is based on the same recursive interval subdivision. To arithmetically decode a symbol that takes a value from an m-ary source alphabet, an initial coding interval may be divided into m disjoint subintervals. Each of the m disjoint subintervals may have a width proportional to the probability of the symbol having a different one of the values in the m-ary source alphabet. The probabilities of the symbol having the different values in the m-ary source alphabet may be referred to as a probability model for the symbol as described herein. The symbol is arithmetically decoded from an arithmetic code word by determining the symbol value corresponding to the subinterval in which the arithmetic code word falls within. This subinterval then becomes the new coding interval. The decoder may sequentially decode each symbol $s_i$ of a sequence $s = \{s_1, s_2, \ldots, s_N\}$ by recursively using this interval-subdivision scheme N times and determining which subinterval the arithmetic code word falls within at each iteration.

For each symbol that is arithmetically coded, a different probability model may be used to subdivide the coding interval. For example, the probability model for a symbol may be determined by a fixed selection (e.g., based on a position of the symbol in a sequence of symbols) or by an adaptive selection from among two or more probability models (e.g., based on information related to the symbol). It is also possible for two or more symbols in a sequence of symbols to use a joint probability model. Selection of a probability model for a symbol may be referred to as context modeling. Arithmetic coding that uses context modeling may be referred to more specifically as context-based arithmetic coding. In addition to probability model selection for a symbol, the selected probability model may be updated based on the actual coded value of the symbol. For example, the probability of the actual coded value of the symbol may be increased in the probability model, and the probability of all other values may be decreased. Arithmetic coding that uses both context modeling and probability model adaptation may be referred to more specifically as context-based adaptive arithmetic coding.

The disclosures herein provide an example of arithmetic coding. Other variations of arithmetic coding may be possible. A renormalization operation may be performed, for example, if arithmetic coding is performed, to ensure that the precision needed to represent the range and lower bound of a subinterval does not exceed the finite precision of registers used to store these values. Other simplifications to the coding process may be made to decrease complexity, increase speed, and/or reduce power requirements of the implementation of the coding process in either hardware, software, or some combination of hardware and software. For example, probabilities of symbols and lower bounds and ranges of subintervals may be approximated or quantized in such implementations.

Figure 17:
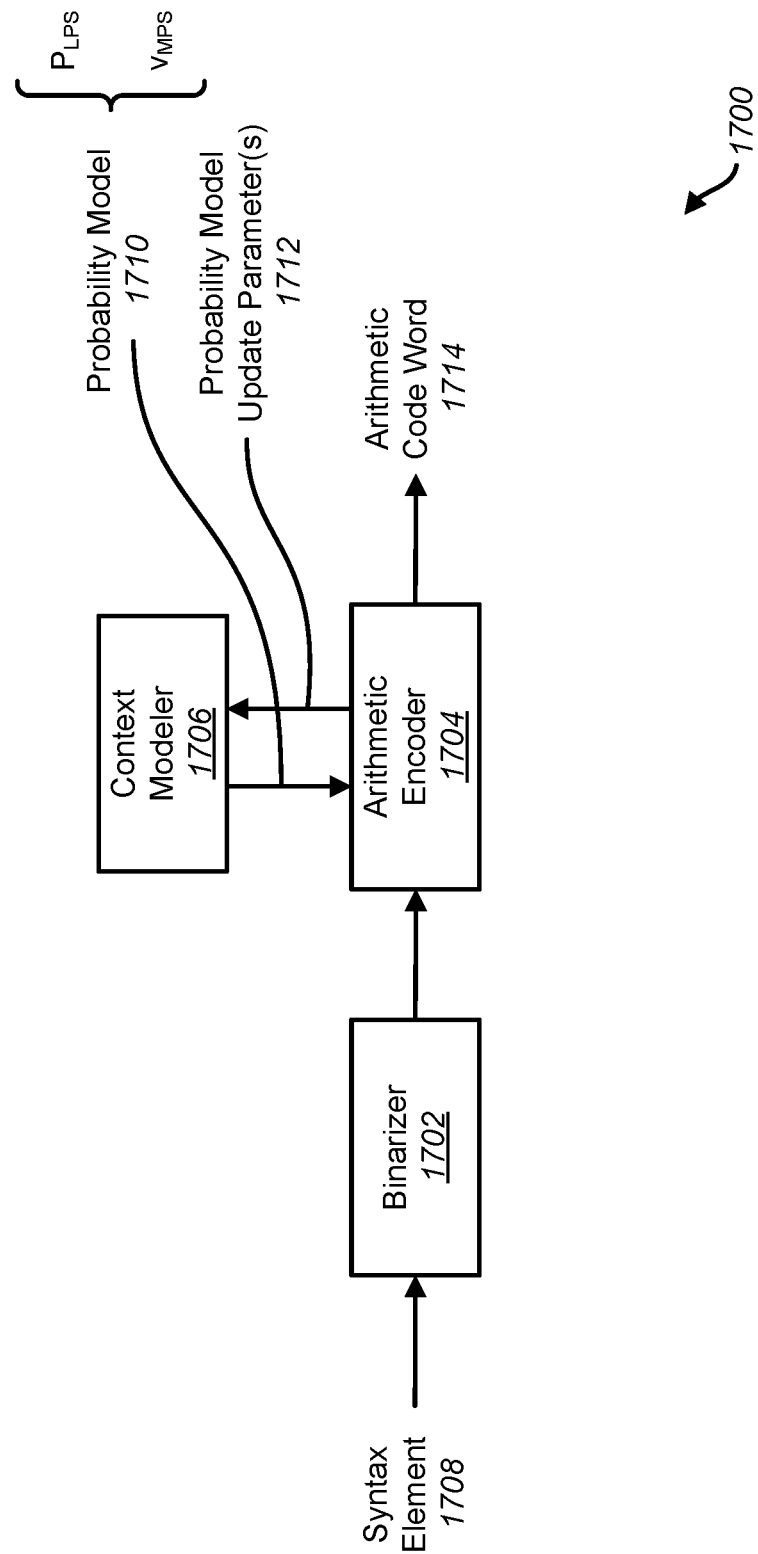
FIG. 17 shows an example of a context-based adaptive binary arithmetic coding (CABAC) encoder.

FIG. 17 shows an example of a context-based adaptive binary arithmetic coding (CABAC) encoder 1700. The CABAC encoder 1700 may be implemented in a video encoder, such as video encoder 200 in FIG. 2, for entropy encoding syntax elements of a video sequence. The CABAC encoder 1700, in this example, may include a binarizer 1702, an arithmetic encoder 1704, and a context modeler 1706.

The CABAC encoder 1700 may receive a syntax element 1708 for arithmetic encoding. Syntax elements, such as syntax element 1708, may be generated at a video encoder and may describe how a video signal may be reconstructed at a video decoder. For a coding unit (CU), the syntax elements may comprise an intra prediction mode based on the CU being intra predicted, motion data (e.g., MVD and MVP related data) based on the CU being inter predicted, or displacement data (e.g., BVD and BVP related data) based on the CU being predicted using IBC.

The binarizer 1702 may map the value of syntax element 1708 to a sequence of binary symbols (also referred to as bins). The binarizer 1702 may define a unique mapping of values of syntax element 1708 to sequences of binary symbols. Binarization of syntax elements may help to improve probability modeling and implementation of arithmetic encoding. The binarizer 1702 may implement one or more binarization processes. The one or more binarization processes implemented by binarizer 1702 may include, for example, unary, truncated unary, k-th order truncated Rice, k-th order exponential-Golomb (EGk), fixed-length, or some combination of two or more binarization processes. The binarizer 1702 may select a binarization process based on a type of syntax element 1708 and/or one or more syntax elements processed by the CABAC encoder 1700 before the syntax element 1708. The binarizer 1702 may not process syntax element 1708, for example, based on the syntax element 1708 already being represented by a sequence of one or more binary symbols. The binarizer 1702 may not be used, and the syntax element 1708 represented by a sequence of one or more non-binary symbols may be directly encoded by CABAC encoder 1700.

One or more of the binary symbols may be processed by the arithmetic encoder 1704. One or more of the binary symbols may be processed by the arithmetic encoder 1704, for example, after binarizer 1702 optionally maps the value of syntax element 1708 to a sequence of binary symbols. The arithmetic encoder 1704 may process each of the one or more binary symbols in one of at least two modes, for example, regular arithmetic encoding mode or bypass arithmetic encoding mode.

The arithmetic encoder 1704 may process binary symbols that do not have a uniform (or approximately uniform) probability distribution in regular arithmetic encoding mode (e.g., binary symbols that do not have a probability distribution of 0.5 for each of their two possible values). The arithmetic encoder 1704 may perform arithmetic encoding as described herein, for example, in regular arithmetic encoding mode. For example, arithmetic encoder 1704 may subdivide a current coding interval into m disjoint subintervals. Each of the m disjoint subintervals may have a width proportional to the probability of the binary symbol having a different one of the values in an m-ary source alphabet. For a binary symbol, m is equal to two and the current coding interval may be subdivided into two disjoint intervals that each have a width proportional to the probability of a different one of the two possible values (e.g., {0, 1}) for the binary symbol being encoded. The probabilities of the two possible values for the binary symbol may be indicated by a probability model 1710 for the binary symbol. The arithmetic encoder 1704 may encode the binary symbol. The arithmetic encoder 1704 may encode the binary symbol, for example, by choosing the subinterval corresponding to the actual value of the binary symbol as the new coding interval for the next binary symbol to be encoded.

The arithmetic encoder 1704 may receive the probability model 1710, for example, from the context modeler 1706. The context modeler 1706 may determine the probability model 1710 for the binary symbol by a fixed selection (e.g., based on a position of the binary symbol in the sequence of binary symbols representing the syntax element 1708) or by an adaptive selection from among two or more probability models (e.g., based on information related to the binary symbol). The probability model 1710 may comprise, for example, two parameters: the probability $P_{LPS}$ of the least probable symbol (LPS) and the value $V_{MPS}$ of the most probable symbol (MPS). The probability model 1710 may comprise, for example, the probability $P_{MPS}$ of the MPS in addition or alternatively to the probability Pus of the LPS. The probability model 1710 may comprise, for example, the value $V_{LPS}$ of the LPS in addition or alternatively to the value $V_{MPS}$ of the MPS. The arithmetic encoder 1704 may provide one or more probability model update parameters 1712 to context modeler 1706, for example, after arithmetic encoder 1704 encodes the binary symbol. The context modeler 1706 may adapt the probability model 1710 based on, for example, the one or more probability model update parameters 1712. The one or more probability model update parameters 1712 may comprise, for example, the actual coded value of the binary symbol. The context modeler 1706 may update the probability model 1710 by increasing the $P_{LPS}$, for example, if the actual coded value of the binary symbol is not equal to the $V_{MPS}$ and by decreasing the $P_{LPS}$ otherwise.

The arithmetic encoder 1704 may process binary symbols that have (or are assumed to have) a uniform (or approximately uniform) probability distribution in bypass arithmetic encoding mode. Because binary symbols processed by the arithmetic encoder 1704 in bypass arithmetic encoding mode have (or are assumed to have) a uniform (or approximately uniform) probability distribution, the arithmetic encoder 1704 may bypass probability model determination and adaptation performed in regular arithmetic encoding mode, for example, if encoding these binary symbols to speed up the encoding process. Subdivision of the current coding interval may be simplified given the uniform (or assumed uniform) probability distribution. The current coding interval may be partitioned into two disjoint subintervals of equal width, which may be realized using a simple implementation that may further speed up the encoding process. The arithmetic encoder 1704 may encode the binary symbol by choosing the subinterval corresponding to the value of the binary symbol as the new coding interval for the next binary symbol to be encoded. The resulting increase in encoding speed for binary symbols encoded by the arithmetic encoder 1704 in bypass arithmetic encoding mode is often important because CABAC encoding may have throughput limitations.

The arithmetic encoder 1704 may determine a value in the range of the final coding interval as an arithmetic code word 1714 for the binary symbols, for example, after processing a number of binary symbols (e.g., corresponding to one or more syntax elements). The arithmetic encoder 1704 may then output an arithmetic code word 1714. The arithmetic encoder 1704 may output the arithmetic code word 1714, for example, to a bitstream that may be received and processed by a video decoder.

Two syntax elements that may be coded in bypass arithmetic coding mode include the magnitude of the motion vector difference (MVD) and the magnitude of the block vector difference (BVD). These syntax elements may be respectively determined as part of advanced motion vector prediction (AMVP) for inter prediction and AMVP for intra block copy (IBC) as described herein. Bypass arithmetic coding mode may be used to speed up the arithmetic coding process. Compression of the symbols of these syntax elements coded in bypass arithmetic encoding mode may be limited because their probability distributions are uniform (or at least assumed to be uniform). Information theory suggests that a symbol cannot be compressed at a rate less than its entropy without a loss of information, and a symbol with a uniform probability distribution has maximum entropy. Symbols coded using the bypass arithmetic encoding mode may generally require more bits to encode than symbols encoded using the regular arithmetic encoding mode.

The disclosures provided herein improve the compression efficiency of one or more magnitude symbols of a BVD. Instead of entropy coding a magnitude symbol of the BVD, an indication may be entropy encoded that indicates whether a value of the magnitude symbol of the BVD matches a value of the magnitude symbol of a BVD candidate used as a predictor ("BVD predictor") of the BVD. The BVD predictor may be selected from among a plurality of BVD candidates based on, for example, respective costs of the plurality of BVD candidates. The cost of each BVD candidate of the plurality of BVD candidates may be calculated based on a difference between a template of a current block and a template of a candidate reference block. The candidate reference block may be displaced relative to the current block, for example, by a sum of the BVD candidate and a block vector predictor (BVP). The indication of whether the value of the magnitude symbol of the BVD matches the value of the magnitude symbol of the BVD predictor may have a non-uniform probability distribution and therefore provide improved compression efficiency over coding the magnitude symbol of the BVD based on a uniform probability distribution. Entropy encoding the indication instead of the magnitude symbol of the BVD may decrease the bit rate. By decreasing the bit rate, the overhead needed to signal the magnitude (e.g., the respective magnitudes of the horizontal component and the vertical component of a BVD) to a decoder.

The disclosures herein are further directed to improving the compression efficiency of one or more magnitude symbols of an MVD. Instead of entropy coding a magnitude symbol of the MVD, an indication of whether a value of the magnitude symbol of the MVD matches a value of the magnitude symbol of an MVD candidate used as a predictor of the MVD ("MVD predictor") may be entropy coded. The MVD predictor may be selected from among a plurality of MVD candidates, for example, based on costs of the plurality of MVD candidates. The cost of one or more MVD candidates in the plurality of MVD candidates may be calculated, for example, based on a difference between a template of a current block and a template of a candidate reference block. The candidate reference block may be displaced relative to a co-location of the current block in a reference frame by a sum of the MVD candidate and a motion vector predictor (MVP). The indication of whether the value of the magnitude symbol of the MVD matches the value of the magnitude symbol of the MVD predictor may have a non-uniform probability distribution and therefore provide improved compression efficiency over coding the magnitude symbol of the MVD based on a uniform probability distribution. Entropy encoding the indication instead of the magnitude symbol of the MVD may decrease the bit rate and thus the overhead needed to signal the magnitude (e.g., the respective magnitudes of the horizontal component and the vertical component of an MVD) to a decoder.

As described herein, HEVC and VVC both include a prediction technique to exploit the correlation between blocks of samples within the same picture. This technique is referred to as intra block (IBC). IBC is also included in the Enhanced Compression Model (ECM) software algorithm that is currently under coordinated exploration study by the Joint Video Exploration Team (JVET) of ITU-T Video Coding Experts Group (VCEG) and ISO/IEC MPEG as a potential enhanced video coding technology beyond the capabilities of VVC.

Figure 18A:
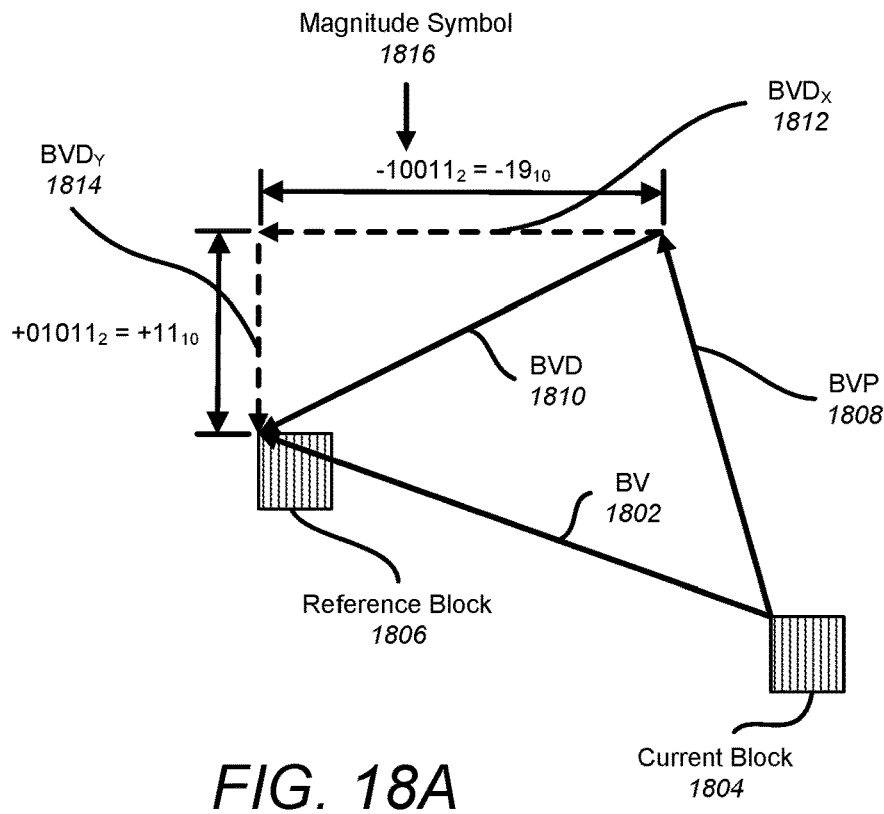
FIG. 18A shows an example of IBC.

FIG. 18A shows an example of IBC. An encoder may determine a block vector (BV) 1802 that may indicate the displacement from a current block 1804 to a reference block (or intra block compensated prediction) 1806, for example, if performing IBC. The encoder may determine the reference block 1806 from among one or more reference blocks tested, for example, if performing a searching process. For each of the one or more reference blocks tested, for example, if performing a searching process, the encoder may determine a difference (e.g., sum of squared differences (SSD), sum of absolute differences (SAD), sum of absolute transformed differences (SATD), or difference determined based on a hash function) between the samples of the reference block and the samples of the current block 1804. The encoder may determine the reference block 1806 from among the one or more reference blocks. The encoder may determine the reference block 1806 from among the one or more reference blocks, for example, based on the reference block 1806 having the smallest difference from the current block 1804 among the one or more reference blocks. The encoder may determine the reference block 1806 from among the one or more reference blocks, for example, based on some other or additional criteria. The reference block 1806 and the one or more other reference blocks tested, for example, if performing the searching process may comprise decoded (or reconstructed) samples. The decoded (or reconstructed) samples may not have been processed by in-loop filtering operations such as, for example, deblocking or SAO filtering.

The encoder may use the reference block 1806 to predict the current block 1804, for example, after the reference block 1806 is determined for the current block 1804. The encoder may determine or use a difference (e.g., a corresponding sample-by-sample difference) between the reference block 1806 and the current block 1804. The difference may be referred to as a prediction error or residual. The encoder may signal the prediction error and the related prediction information in a bitstream. The prediction information may include the BV 1802. The prediction information may include an indication of the BV 1802. A decoder, such as decoder 300 in FIG. 3, may receive the bitstream and decode the current block 1804. A decoder may receive the bitstream and decode the current block 1804, for example, by determining the reference block 1806, which forms the prediction of the current block 1804, using the prediction information and combining the prediction with the prediction error.

The BV 1802 may be predictively encoded. The BV 1802 may be predictively encoded, for example, before being signaled in a bit stream. The BV 1802 may be predictively encoded based on the BVs of neighboring blocks of the current block 1804 or BVs of other blocks. The encoder may predictively encode the BV 1802, for example, using the merge mode or AMVP as described herein. The encoder may encode the BV 1802, for example, as a difference between the BV 1802 and a BV predictor (BVP) 1808 as shown in FIG. 18A, for example, if performing AMVP. The encoder may select the BVP 1808 from a list of candidate BVPs. The candidate BVPs may come from previously decoded BVs of neighboring blocks of the current block 1804 or other sources. Both the encoder and decoder may generate or determine the list of candidate BVPs.

The encoder may signal, in a bitstream, an indication of the BVP 1808 and a BV difference (BVD) 1810, for example, after the encoder selects the BVP 1808 from the list of candidate BVPs. The encoder may indicate the BVP 1808 in the bitstream by an index of (e.g., pointing into) the list of candidate BVPs or by one or more flags. The BVD 1810 may be calculated based on the difference between the BV 1802 and the BVP 1808. The BVD 1810 may comprise a horizontal component (BVD$_x$) 1812 and a vertical component (BVD$_y$) 1814 that may be respectively determined in accordance with Equation (17) and Equation (18) above. The two components, BVD$_x$ 1812 and BVD$_y$ 1814, may each comprise a magnitude and sign. The horizontal component, BVD$_x$ 1812, in this example and only for the purposes of illustration, has a magnitude of 10011 in fixed length binary (or 19 in base 10) and a negative sign (given that the positive horizontal direction points to the right and the negative horizontal direction points to the left in the example of FIG. 18A). The vertical component, BVD$_y$ 1814, in this example and only for the purposes of illustration, has a magnitude of 01011 in fixed length binary (or 11 in base 10) and a positive sign (given that the positive vertical direction points down and the negative vertical direction points up in the example of FIG. 18A). The encoder may indicate the BVD 1810 in the bitstream via its two components, BVD$_x$ 1812 and BVD$_y$ 1814.

The decoder may decode the BV 1802 by adding the BVD 1810 to the BVP 1808. The decoder may decode the current block 1804 by determining the reference block 1806, which forms the prediction of the current block 1804, using the BV 1802 and combining the prediction with the prediction error.

The decoder may determine the reference block 1806 by adding the BV 1802 to the location of the current block 1804, which may give the location of the reference block 1806.

As described herein, the magnitude of the BVD 1810 may be encoded in bypass arithmetic encoding mode. The bypass arithmetic encoding mode may be used to speed up the arithmetic encoding process. Compression of the magnitude symbols of the BVD 1810 encoded in bypass arithmetic encoding mode may be limited because their probability distributions are uniformly distributed (or at least assumed to be uniformly distributed). Information theory suggests that a symbol cannot be compressed at a rate less than its entropy without loss of information, and a symbol with uniform probability distribution has maximum entropy. Symbols encoded using the bypass arithmetic encoding mode, therefore, may generally require more bits to encode than symbols encoded using the regular arithmetic encoding mode.

The disclosures herein may improve the compression efficiency of one or more magnitude symbols of a BVD (e.g., the BVD 1810) compared to existing technologies. For example, instead of directly entropy encoding a magnitude symbol of the BVD 1810, an encoder (e.g., the encoder 200 as shown in FIG. 2) may entropy encode an indication of whether a value of the magnitude symbol of the BVD 1810 matches a value of the same magnitude symbol of a BVD candidate used as a predictor of the BVD 1810. The indication of whether the value of the magnitude symbol of the BVD 1810 matches the value of the magnitude symbol of the BVD predictor may have a non-uniform probability distribution and therefore provide improved compression efficiency. The encoder may select the BVD predictor from among a plurality of BVD candidates. The encoder may select the BVD predictor from among a plurality of BVD candidates, for example, based on respective costs of the plurality of the BVD candidates. The BVD candidates may include a BVD candidate for each possible value of the magnitude symbol of the BVD 1810. For example, a magnitude symbol of the BVD 1810 represented in binary form has only two possible values (e.g., {0, 1}). Therefore, the BVD candidates may include two BVD candidates for this representation (e.g., one for each possible value of the magnitude symbol in the BVD 1810 being encoded): a first BVD candidate equal to the BVD 1810 itself and a second BVD candidate equal to the BVD 1810 but with the opposite (or other) value of the magnitude symbol of the BVD 1810. The cost for each BVD candidate in the plurality of BVD candidates may be calculated. The cost for each BVD candidate in the plurality of BVD candidates may be calculated, for example, based on a difference between a template of the current block 1804 and a template of a candidate reference block. The candidate reference block may be displaced relative to the current block by a sum of the BVD candidate and the BVP 1808.

FIG. 18A shows a specific example. FIG. 18A shows an example magnitude symbol 1816 of the BVD 1810 to be entropy encoded. The magnitude symbol 1816 of the BVD 1810 is the second most significant bit in the fixed length binary representation of horizontal component the BVD, 1812 of the BVD 1810 and has a binary value of "0". As described herein, instead of directly entropy encoding the magnitude symbol 1816 of the BVD 1810, the encoder may entropy encode an indication of whether the value of the magnitude symbol 1816 of the BVD 1810 matches the value of the same magnitude symbol of a BVD candidate used as a predictor of the BVD 1810. The encoder may select the BVD predictor from among a plurality of BVD candidates. The encoder may select the BVD predictor from among a plurality of BVD candidates, for example, based on respective costs of the plurality of BVD candidates. The BVD candidates may include a BVD candidate for each of the two possible values (e.g., {0, 1}) of the magnitude symbol 1816 of BVD 1810, for example, a first BVD candidate 1818 equal to BVD 1810 itself and a second BVD candidate 1820 equal to BVD 1810 but with the opposite (or other) value of magnitude symbol 1816 of BVD 1810.

Figure 18B:
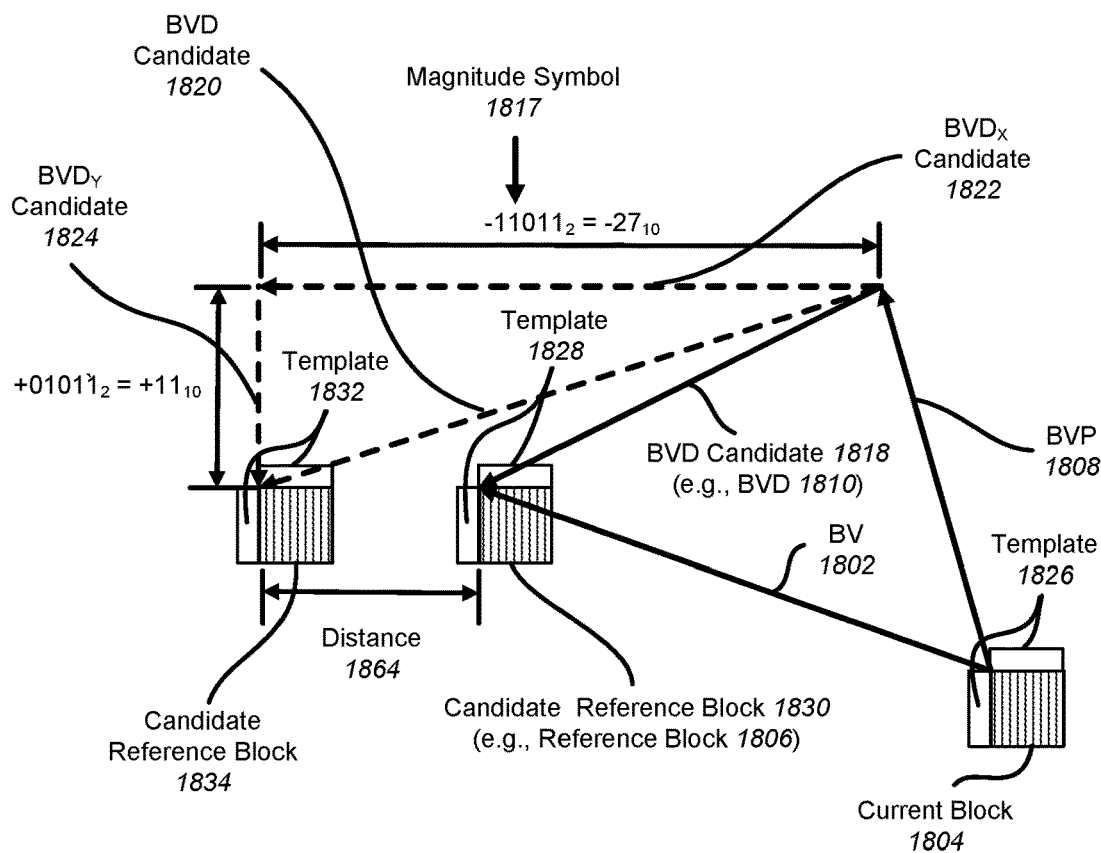
FIG. 18B shows example BVD candidates that may be used to entropy encode a magnitude symbol of a BVD.

FIG. 18B shows example BVD candidates that may be used to entropy encode a magnitude symbol of a BVD. Both BVD candidates shown in FIG. 18B may be used, for example, to entropy encode magnitude symbol 1816 of BVD 1810. More specifically, FIG. 18B shows the BVD candidate 1818 equal to the BVD 1810 itself and the BVD candidate 1820 equal to the BVD 1810 but with the value of its magnitude symbol 1817 ("1" in FIG. 18B) being the opposite (or other) value of the magnitude symbol 1816 of the BVD 1810 ("0" in FIG. 18A). With the opposite (or other) value of the magnitude symbol 1816 of the BVD candidate 1818, the BVD candidate 1820 has a horizontal component, $BVD_x$ 1822, with a magnitude of 11011 in fixed length binary (or 27 in base 10) and a negative sign. The vertical component, $BVD_y$ 1824, of the BVD candidate 1820 has the same magnitude of 01011 in fixed length binary (or 11 in base 10) and positive sign as the vertical component, $BVD_y$ 1814, of the BVD candidate 1818 (or BVD 1810).

A cost for a BVD candidate in the plurality of BVD candidates may be determined (e.g., calculated). The cost for a BVD candidate in the plurality of BVD candidates may be determined (e.g., calculated), for example, based on a difference between a template of current block 1804 and a template of a candidate reference block displaced relative to current block 1804 by a sum of the BVD candidate and BVP 1808. An encoder (e.g., encoder 114 as shown in FIG. 1, encoder 200 as shown in FIG. 2) may determine a cost for the BVD candidate 1818. An encoder (e.g., encoder 114 as shown in FIG. 1, encoder 200 as shown in FIG. 2) may determine a cost for the BVD candidate 1818, for example, based on a difference between a template 1826 of the current block 1804 and a template 1828 of a candidate reference block 1830 displaced relative to the current block 1804 by a sum of the BVD candidate 1818 and the BVP 1808. The encoder may determine the difference between the template 1826 and the template 1828, for example, based on a difference (e.g., sum of squared differences (SSD), sum of absolute differences (SAD), sum of absolute transformed differences (SATD), mean removal SAD, or mean removal SSD) between samples of the template 1826 and samples of the template 1828. The encoder may determine a cost for the BVD candidate 1820, for example, based on a difference between the template 1826 of the current block 1804 and a template 1832 of a candidate reference block 1834 displaced relative to the current block 1804 by a sum of the BVD candidate 1820 and the BVP 1808. The encoder may determine the difference between the template 1826 and the template 1832, for example, based on a difference (e.g., SSD, SAD, SATD, mean removal SAD, or mean removal SSD) between samples of the template 1826 and samples of the template 1828. The templates 1826, 1828, and 1832 may comprise one or more samples to the left and/or above their respective blocks. For example, the templates 1826, 1828, and 1832 may comprise samples from one or more columns to left of their respective block and/or from one or more rows above their respective block. FIG. 18B shows one example position and shape (L-shape rotated clockwise 90 degrees) of templates 1826, 1828, and 1832. Additional and alternative positions and/or shapes may be used for the templates.

The encoder may select one of the plurality of BVD candidates as a BVD predictor. The encoder may select one of the plurality of BVD candidates as a BVD predictor, for example, after determining the costs of each of the plurality of BVD candidates. For example, the encoder may select the BVD candidate with the lowest (e.g., smallest) cost among the plurality of BVD candidates as the BVD predictor.

Figure 18C:
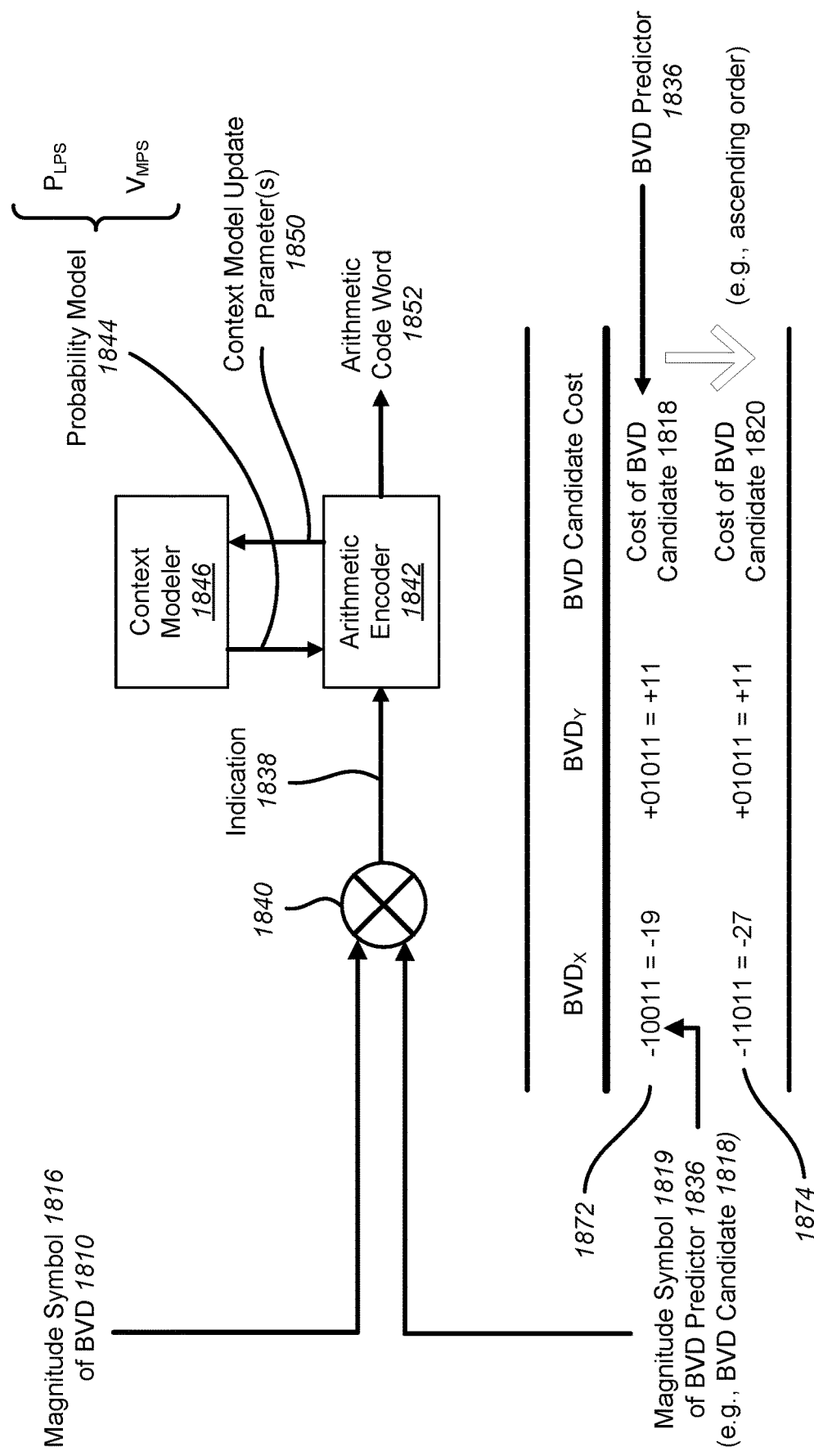
FIG. 18C shows an example of entropy encoding an indication of whether a value of a magnitude symbol of a BVD matches a value of the magnitude symbol of a BVD candidate used as a predictor of the BVD.

FIG. 18C shows an example of entropy encoding an indication of whether a value of a magnitude symbol of a BVD matches a value of the magnitude symbol of a BVD candidate used as a predictor of the BVD. More specifically, FIG. 18C shows a table 1870 with the components (e.g., horizontal and vertical) and costs of each BVD candidate 1818 and 1820 in respective rows 1872 and 1874. The BVD candidates 1818 and 1820, in this example, are assumed to be the only BVD candidates for the purposes of illustration. More BVD candidates may be used. The rows of the table 1870, in this example, are sorted based on the costs of BVD candidates 1818 and 1820 (e.g., from lowest to highest with the BVD candidate with the lowest (e.g., smallest) cost listed in the first row 1872). The BVD candidate 1818, in this example, has the lowest (e.g., smallest) cost among BVD candidates 1818 and 1820. The encoder may select the BVD candidate 1818 as the BVD predictor 1836 for the BVD 1810, for example, based on the cost associated with the BVD candidate 1818 being the lowest cost. The rows of the table 1870 alternatively may be sorted highest to lowest with the BVD candidate with the highest cost listed in the first row.

The encoder may entropy encode an indication 1838 of whether the value of magnitude symbol 1816 of the B VD 1810 matches the value of magnitude symbol 1819 in the BVD predictor 1836, for example, after selecting BVD candidate 1818 as BVD predictor 1836. The magnitude symbol 1819 of the BVD predictor 1836 has a value of "0", which matches the value of the magnitude symbol 1816 of the BVD 1810. The indication 1838, in this example, may indicate that the value of the magnitude symbol 1816 of the BVD 1810 matches the value of the magnitude symbol 1819 of the BVD predictor 1836. The indication 1838 may be, for example, a single bit that may have, for example, the value "0" if the value of the magnitude symbol 1816 of the BVD 1810 matches the value of the magnitude symbol 1819 of the BVD predictor 1836. The indication 1838 may have, for example, the value "1" if the value of the magnitude symbol 1816 of the BVD 1810 does not match the value of the magnitude symbol 1819 of the BVD predictor 1836. Alternatively, the value of the indication 1838 may be, for example, "1" if the value of the magnitude symbol 1816 of the BVD 1810 matches the value of the magnitude symbol 1819 of the BVD predictor 1836 and "0" if the value of the magnitude symbol 1816 of the BVD 1810 does not match the value of the magnitude symbol 1819 of the BVD predictor 1836. Logic 1840 may be used to determine the indication 1838. The logic 1840 may implement, for example, a logical exclusive (XOR) function. The value of a magnitude symbol may be non-binary. The indication 1838 may indicate the first candidate among the plurality of candidates (e.g., as sorted based on their respective costs) that has a value of a magnitude symbol that may match the value of magnitude symbol 1816 in BVD 1810, for example, if the value of the magnitude symbol is non-binary.

The encoder may entropy encode the indication 1838 using an arithmetic encoder 1842. The indication 1838 may have a non-uniform probability distribution, for example, if determined as described herein. The arithmetic encoder 1842 may process the indication 1838 in regular arithmetic encoding mode as described herein. For example, the arithmetic encoder 1842 may subdivide a current coding interval into m disjoint subintervals. Each of the m disjoint subintervals may have a width proportional to the probability of the symbol being encoded having a different one of the values in an m-ary source alphabet. For the indication 1838, which is binary, m is equal to two and the current coding interval may be subdivided into two disjoint intervals that each have a width proportional to the probability of a different one of the two possible values (e.g., {0, 1}) for the indication 1838 being encoded. The probabilities of the two possible values for the indication 1838 may be indicated by a probability model 1844 for the indication 1838. The arithmetic encoder 1842 may encode the indication 1838. The arithmetic encoder 1842 may encode the indication 1838, for example, by choosing the subinterval corresponding to the actual value of the indication 1838 as the new coding interval for the next binary symbol to be encoded.

The arithmetic encoder 1842 may receive the probability model 1844 from a context modeler 1846. The context modeler 1846 may determine the probability model 1844 for the indication 1838 by a fixed selection or an adaptive selection from among two or more probability models. The context modeler 1846 may determine the probability model 1844, for example, by a fixed selection or an adaptive selection from among two or more probability models based on a position of the magnitude symbol 1816 in the horizontal component, $BVD_x$ 1812, of the BVD 1810 or an index of (e.g., a value indicating) the position of the magnitude symbol 1816 in the horizontal component, $BVD_x$ 1812, of the BVD 1810. The position (or index of the position) of the magnitude symbol 1816 in the horizontal component, BVD, 1812, of the BVD 1810 may provide an indication of the horizontal distance 1864 (as shown in FIG. 18B) between the two candidate BVDs. A position (or index of the position) of a magnitude symbol in a vertical component, $BVD_y$ (e.g., $BVD_y$ 1812), of a BVD (e.g., BVD 1810) provides an indication of a vertical distance between the two candidate BVDs (e.g., two candidate BVDs that differ with each other only by the value of the magnitude symbol in a given position). The likelihood of the value of the magnitude symbol 1819 of the BVD predictor 1836 matching the value of the magnitude symbol 1816 of the BVD 1810 may be proportional to the distance 1864. The position (or index of the position) of the magnitude symbol 1816 in the horizontal component, $BVD_x$ 1812, of the BVD 1810 may be helpful in selecting the probability model 1844 for the indication 1838.

A context modeler may determine (e.g., select) a probability model for an indication of whether a value of a magnitude symbol of a BVD matches a value of a magnitude symbol of a BVD predictor. The context modeler may select the probability model based on a comparison of a position (or index of the position) of a magnitude symbol in a component (e.g., a horizontal component, $BVD_x$, or a vertical component, $BVD_y$) of a BVD to one or more thresholds. An encoder and a decoder may use the same threshold value, for example, for encoding and decoding respectively. The value of the threshold, therefore, may be normative and thus defined in a video coding standard. The context modeler may select the probability model from among multiple probability models, for example, based on whether the position (or index of the position) satisfies (e.g., meets, is greater than, is less than) the threshold. The context modeler may select a probability model from among multiple probability models, as described herein, for adaptive selection from among the probability models.

The context modeler 1846 may compare the position (or index of the position) of the magnitude symbol 1816 in the horizontal component, $BVD_x$ 1812, of the BVD 1810 to one or more thresholds, for example, for adaptive selection from among two or more probability models. For example, the context modeler 1846 may compare the position (or index of the position) of the magnitude symbol 1816 in the horizontal component, $BVD_x$ 1812, of the BVD 1810 to a first threshold. The context modeler 1846 may select a first probability model for the indication 1838, for example, based on the position (or index of the position) of the magnitude symbol 1816 in the horizontal component, $BVD_x$ 1812, of the BVD 1810 being less than the first threshold (or equal to the first threshold or greater than the first threshold depending on the particular implementation). The context modeler 1846 may select a second (e.g., different) probability model for the indication 1838, for example, based on the position (or index of the position) of magnitude symbol 1816 in the horizontal component, $BVD_x$ 1812, of the BVD 1810 being greater than the first threshold (or equal to the first threshold or less than the first threshold depending on the particular implementation). The context modeler 1846 may compare the position (or index of the position) of the magnitude symbol 1816 in the horizontal component, $BVD_x$ 1812, of the BVD 1810 to a second threshold, for example, based on the position (or index of the position) of the magnitude symbol 1816 in the horizontal component, $BVD_x$ 1812, of the BVD 1810 being greater than the first threshold (or equal to the first threshold or less than the first threshold depending on the particular implementation). The context modeler 1846 may select a second probability model for the indication 1838, for example, based on the position (or index of the position) of the magnitude symbol 1816 in the horizontal component, $BVD_x$ 1812, of the BVD 1810 being less than the second threshold (or equal to the second threshold or greater than the second threshold depending on the particular implementation). The context modeler 1846 may select a third probability model for the indication 1838, for example, based on the position (or index of the position) of the magnitude symbol 1816 in the horizontal component, $BVD_x$ 1812, of the BVD 1810 being greater than the second threshold (or equal to the second threshold or less than the second threshold depending on the particular implementation).

The disclosures as described herein also may be used to determine (e.g., select, identify, indicate) one or more probability models for an indication of whether a value of a magnitude symbol of a vertical component, $BVD_y$, of a BVD matches a value of a magnitude symbol of a vertical component of a BVD predictor. A context modeler (e.g., the context modeler 1846) may compare the position (or index of the position) of a magnitude symbol in a vertical component, $BVD_y$, of a BVD (e.g., BVD 1810) to one or more thresholds, for example, for adaptive selection from among two or more probability models. For example, the context modeler may compare the position (or index of the position) of the magnitude symbol in the vertical component, $BVD_y$, of the BVD to a first threshold. The context modeler may select a first probability model for the indication, for example, based on the position (or index of the position) of the magnitude symbol in the vertical component, $BVD_y$, of the BVD being less than the first threshold (or equal to the first threshold or greater than the first threshold depending on the particular implementation). The context modeler may compare the position (or index of the position) of the magnitude symbol in the vertical component, $BVD_y$, of the BVD to a second threshold, for example, based on the position (or index of the position) of the magnitude symbol in the vertical component, $BVD_y$, of the BVD being greater than the first threshold (or equal to the first threshold or less than the first threshold depending on the particular implementation). The context modeler may select a second probability model for the indication, for example, based on the position (or index of the position) of the magnitude symbol in the vertical component, $BVD_y$, of the BVD being less than the second threshold (or equal to the second threshold or greater than the second threshold depending on the particular implementation). The context modeler may select a third probability model for the indication, for example, based on the position (or index of the position) of the magnitude symbol in the vertical component, $BVD_y$, of the BVD being greater than the second threshold (or equal to the second threshold or less than the second threshold depending on the particular implementation).

The context modeler 1846 may determine (e.g., select, identify, indicate) the probability model 1844 by a fixed selection or an adaptive selection from among two or more probability models. The context modeler 1846 may determine the probability model 1844, for example, based on a change in value of the BVD 1810 (or the horizontal component, $BVD_x$ 1812, of the BVD 1810) for an incremental change in value of the magnitude symbol 1816 of the BVD 1810. The change in value of the BVD 1810 (or the horizontal component, $BVD_x$ 1812, of the BVD 1810) for an incremental change in value of the magnitude symbol 1816 of the BVD 1810 may be determined as $2^{(n-1)}$, where n is the bit position of the magnitude symbol 1816 in the horizontal component, $BVD_x$ 1812, of the BVD 1810. In FIGS. 18A-D, for example, n=4 (with the magnitude symbol 1816 being at the fourth position of the bit sequence), and therefore the change in value of the BVD 1810 (or the horizontal component, $BVD_x$ 1812, of BVD 1810) for an incremental change in value of the magnitude symbol 1816 of the BVD 1810 may be determined as $2^{(4-1)}$ or 8. The change in value of the BVD 1810 (or the horizontal component, $BVD_x$ 1812, of the BVD 1810) for an incremental change in value of the magnitude symbol 1816 of the BVD 1810 may indicate the distance 1864 (shown in FIG. 18B) between the two candidate BVDs (e.g., BVD candidate 1818 and BVD candidate 1820 in FIG. 18B). As described herein, the likelihood of the value of the magnitude symbol 1819 of the BVD predictor 1836 matching the value of the magnitude symbol 1816 of the BVD 1810 may be proportional to the distance 1864. The change in value of the BVD 1810 (or the horizontal component, $BVD_x$ 1812, of the BVD 1810) for an incremental change in value of the magnitude symbol 1816 of the BVD 1810 may be helpful in determining (e.g., selecting, identifying, indicating) the probability model 1844 for the indication 1838.

The disclosures as described herein also may be used to determine (e.g., select, identify, indicate) a probability model for a vertical component, $BVD_y$ (e.g., $BVD_y$ 1814), or a BVD (e.g., BVD 1010) by a fixed selection or an adaptive selection from among two or more probability models. A context modeler (e.g., the context modeler 1846) may determine the probability model, for example, based on a change in value of a BVD (e.g., the BVD 1810, or the vertical component, $BVD_y$ 1814, of the BVD 1810) for an incremental change in value of a magnitude symbol of the BVD. The change in value of the BVD (or the vertical component, $BVD_y$ 1814, of the BVD 1810) for an incremental change in value of the magnitude symbol of the BVD may be determined as $2^{(n-1)}$, where n is the bit position of the magnitude symbol in the vertical component, $BVD_y$, of the BVD. The change in value of the BVD (or the vertical component, $BVD_y$ 1814, of the BVD) for an incremental change in value of the magnitude symbol of the BVD may indicate a distance between the two candidate BVDs. As described herein, the likelihood of the value of the magnitude symbol of a BVD predictor matching the value of the magnitude symbol of the BVD may be related to the distance. The extent of the difference between respective templates of the candidate BVDs may be larger for greater values of the distance between the candidate BVDs. The larger the difference between respective templates of the BVD candidates, the costs of the BVD candidates may be more likely to accurately reflect the BVD candidate with a value of the magnitude symbol that matches the value of the magnitude symbol of the BVD. The change in value of the BVD (or the vertical component, $BVD_y$ 1814, of the BVD) for an incremental change in value of the magnitude symbol of the BVD may be helpful in determining, (e.g., selecting, identifying, indicating) the probability model for the indication.

The context modeler 1846 may compare the value of the BVD 1810 (or the horizontal component, $BVD_x$ 1812, of the BVD 1810) for an incremental change in value of the magnitude symbol 1816 of the BVD 1810 to one or more thresholds, for example, for adaptive selection from among two or more probability models. For example, the context modeler 1846 may compare the value of the BVD 1810 (or the horizontal component, $BVD_x$ 1812, of the BVD 1810) for an incremental change in value of the magnitude symbol 1816 of the BVD 1810 to a first threshold. The context modeler 1846 may determine (e.g., select, identify, indicate) a first probability model for the indication 1838, for example, based on the value of the BVD 1810 (or the horizontal component, $BVD_x$ 1812, of the BVD 1810) for an incremental change in value of the magnitude symbol 1816 of the BVD 1810 being less than the first threshold (or equal to the first threshold or greater than the first threshold depending on the particular implementation). The context modeler 1846 may select a second (e.g., different) probability model for the indication 1838, for example, based on the value of BVD 1810 (or the horizontal component, $BVD_x$ 1812, of the BVD 1810) for an incremental change in value of the magnitude symbol 1816 of the BVD 1810 being greater than the first threshold (or equal to the first threshold or less than the first threshold depending on the particular implementation). The context modeler 1846 may compare the value of the BVD 1810 (or the horizontal component, $BVD_x$ 1812, of the B VD 1810) for an incremental change in value of the magnitude symbol 1816 of the BVD 1810 to a second threshold, for example, based on the value of BVD 1810 (or the horizontal component, $BVD_x$ 1812, of the BVD 1810) for an incremental change in value of the magnitude symbol 1816 of the BVD 1810 being greater than the first threshold (or equal to the first threshold or less than the first threshold depending on the particular implementation). The context modeler 1846 may select a second (e.g., different) probability model for the indication 1838, for example, based on the value of the BVD 1810 (or the horizontal component, $BVD_x$ 1812, of the BVD 1810) for an incremental change in value of the magnitude symbol 1816 of the BVD 1810 being less than the second threshold (or equal to the second threshold or greater than the second threshold depending on the particular implementation. The context modeler 1846 may select a third probability model for the indication 1838, for example, based on the value of the BVD 1810 (or the horizontal component, $BVD_x$ 1812, of the BVD

1810) for an incremental change in value of the magnitude symbol 1816 of the BVD 1810 being greater than the second threshold (or equal to the second threshold or less than the second threshold depending on the particular implementation).

The disclosures described herein also may be used to compare the value of the vertical component, $BVD_y$ (e.g., $BVD_y$ 1814) of a BVD (e.g., the BVD 1810) to one or more thresholds. A context modeler (e.g., the context modeler 1846) may compare the value of the vertical component, $BVD_y$ (e.g., $BVD_y$ 1812), of the BVD (e.g., BVD 1810) for an incremental change in value of a magnitude symbol of the BVD to one or more thresholds, for example, for adaptive selection from among two or more probability models. For example, the context modeler may compare the value of the BVD (or the vertical component, $BVD_y$, of the BVD) for an incremental change in value of the magnitude symbol of the BVD to a first threshold. The context modeler may determine (e.g., select, identify, indicate) a first probability model for the indication, for example, based on the value of the BVD (or the vertical component, $BVD_y$, of the BVD) for an incremental change in value of the magnitude symbol of the BVD being less than the first threshold (or equal to the first threshold or greater than the first threshold depending on the particular implementation). The context modeler may determine (e.g., select, identify, indicate) a second (e.g., different) probability model for the indication, for example, based on the value of BVD (or the vertical component, $BVD_y$, of the BVD) for an incremental change in value of the magnitude symbol of the BVD being greater than the first threshold (or equal to the first threshold or less than the first threshold depending on the particular implementation). The context modeler may compare the value of the BVD (or the vertical component, $BVD_y$, of the BVD) for an incremental change in value of the magnitude symbol of the BVD to a second threshold, for example, based on the value of BVD (or the vertical component, $BVD_y$, of the BVD) for an incremental change in value of the magnitude symbol of the BVD being greater than the first threshold (or equal to the first threshold or less than the first threshold depending on the particular implementation). The context modeler may determine (e.g., select, identify, indicate) a second (e.g., different) probability model for the indication, for example, based on the value of the BVD (or the vertical component, $BVD_y$, of the BVD) for an incremental change in value of the magnitude symbol of the BVD being less than the second threshold (or equal to the second threshold or greater than the second threshold depending on the particular implementation). The context modeler may select a third probability model for the indication, for example, based on the value of the BVD (or the vertical component, $BVD_y$, of the BVD) for an incremental change in value of the magnitude symbol of the BVD being greater than the second threshold (or equal to the second threshold or less than the second threshold depending on the particular implementation).

A probability model may contain multiple parameters. The parameters of a probability model may include, for example, the probability $P_{LPS}$ of the least probable symbol (LPS) for an indication of whether the value of a magnitude symbol of a BVD matches the value of a magnitude symbol in a BVD predictor, the value $V_{MPS}$ of the most probable symbol (MPS) for the indication, the probability $P_{MPS}$ of the MPS for the indication (e.g., in addition or alternatively to the probability $P_{LPS}$ of the LPS for the indication 1838), and/or the value $V_{LPS}$ of the LPS for the indication (e.g., in addition or alternatively to the value $V_{MPS}$ of the MPS for the indication. The example probability model 1844 shown in FIG. 18C includes the $P_{LPS}$ and the $V_{MPS}$ for the indication 1838.

An arithmetic encoder may provide parameters used to adapt a probability model. For example, the arithmetic encoder 1842 may provide one or more probability model update parameters 1850 to the context modeler 1846. The arithmetic encoder 1842 may provide the one or more probability model update parameters 1850, for example, after the arithmetic encoder 1842 encodes the indication 1838. The context modeler 1846 may adapt the probability model 1844, for example, based on the one or more probability model update parameters 1850. The one or more probability model update parameters 1850 may comprise, for example, the actual coded value of the indication 1838. The context modeler 1846 may update probability model 1844, for example, by increasing or decreasing the $P_{LPS}$ for the indication 1838. The context modeler 1846 may increase the $P_{LPS}$, for example, if the actual coded value of the indication 1838 is not equal to the $V_{MPS}$. The context modeler 1846 may decrease the $P_{LPS}$ for the indication 1838, for example, if the actual coded value of the indication 1838 is equal to the $V_{MPS}$.

An arithmetic encoder (e.g., the arithmetic encoder 1842) may determine a value in the range of the final coding interval as an arithmetic code word for the binary symbols. For example, the arithmetic encoder 1842 may determine a value in the range of the final coding interval as an arithmetic code word 1852 for the binary symbols. The arithmetic encoder 1842 may determine the value, for example, after processing a number of binary symbols (e.g., corresponding to one or more syntax elements). The arithmetic encoder 1842 may output the arithmetic code word 1852. For example, the arithmetic encoder 1842 may output the arithmetic code word 1852 to a bitstream (e.g., bitstream 110 as shown in FIG. 1, bitstream 204 as shown in FIG. 2, bitstream 302 as shown in FIG. 3). The bitstream may be received and processed by a video decoder.

Figure 18D:
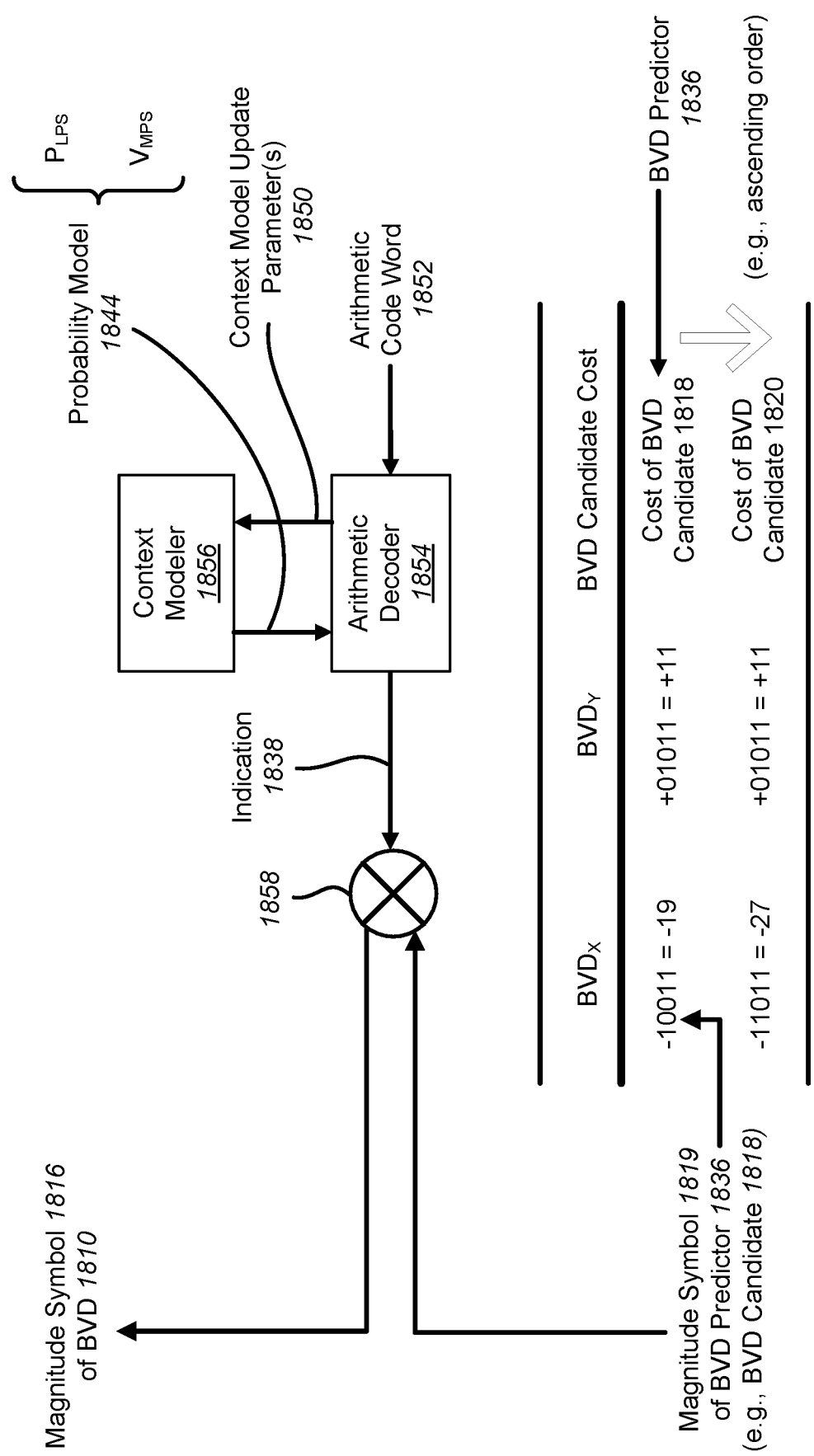
FIG. 18D shows an example of entropy decoding an indication of whether a value of a magnitude symbol of a BVD matches a value of the magnitude symbol of a BVD candidate used as a predictor of the BVD and using the indication to determine a magnitude symbol of the BVD.

FIG. 18D shows an example of entropy decoding an indication of whether a value of a magnitude symbol of a BVD matches a value of the magnitude symbol of a BVD candidate used as a predictor of the BVD and using the indication to determine a magnitude symbol of the BVD. More specifically, FIG. 18D shows an example of a decoder (e.g., decoder 120 as shown in FIG. 1, decoder 300 as shown in FIG. 3) that may receive the arithmetic code word 1852, arithmetically decode the indication 1838 from the arithmetic code word 1852, and use the indication 1838 to determine the magnitude symbol 1816 of the BVD 1810 as described herein.

The decoder may receive the arithmetic code word 1852 in a bitstream. The decoder may provide the arithmetic code word 1852 to an arithmetic decoder 1854. The indication 1838 may have a non-uniform probability distribution, for example, based on the method of determining the indication 1838 as described herein. The arithmetic decoder 1854 may process the indication 1838 in regular arithmetic decoding mode. For example, the arithmetic decoder 1854 may perform recursive interval subdivision as described herein to decode symbols encoded by the arithmetic code word 1852. The arithmetic decoder 1854 may arithmetically decode a symbol that takes a value from an m-ary source alphabet. The arithmetic decoder 1854 may arithmetically decode a symbol that takes a value from an w-ary source alphabet, for example, by dividing an initial coding interval into m disjoint subintervals. Each of the m disjoint subintervals may have a width proportional to the probability of the symbol having a different one of the values in the m-ary source alphabet. For binary symbols such as, for example, the indication 1838, m is equal to two, and the initial coding interval may be subdivided into two disjoint intervals that each have a width proportional to the probability of a different one of the two possible values (e.g., {0, 1}). The probabilities of the symbol having the different values in the m-ary source alphabet may be referred to as a probability model for the symbol, as described herein. The symbol may be arithmetically decoded from the arithmetic code word 1852 by determining the symbol value corresponding to the subinterval in which the arithmetic code word falls within. The decoder may sequentially decode each symbol $s_i$ of a sequence s={$s_1$, $s_2$, ..., $s_N$} encoded by arithmetic code word 1852 (e.g., sequence "10011" for the horizontal component, $BVD_x$, of the BVD predictor 1836 and sequence "01011" for the vertical component, $BVD_y$, of the BVD predictor as shown in FIG. 18D). The decoder may sequentially decode each symbol $s_i$ of a sequence s={$s_1$, $s_2$, ..., $s_N$} encoded by arithmetic code word 1852, for example, by recursively using this interval-subdivision scheme N times and determining which subinterval the arithmetic code word 1852 falls within at each iteration.

The arithmetic decoder 1854 may receive the probability model 1844 for the indication 1838 from the context modeler 1846, for example, if decoding the symbol corresponding to indication 1838. The context modeler 1856 may determine the probability model 1844 for the indication 1838 by a fixed selection from among two or more probability models in the same manner as described herein for the context modeler 1846 as shown in FIG. 18C. The context modeler 1856 may determine the probability model 1844 for the indication 1838 an adaptive selection from among two or more probability models in the same manner as described herein for the context modeler 1846 as shown in FIG. 18C.

As shown in FIG. 18D, the arithmetic decoder 1854 may provide one or more probability model update parameters 1850 to context modeler 1856, for example, after the arithmetic decoder 1854 decodes the indication 1838. The context modeler 1856 may adapt the probability model 1844 based on the one or more probability model update parameters 1850. For example, the one or more probability model update parameters 1850 may comprise the actual decoded value of the indication 1838. The context modeler 1856 may update the probability model 1844 by increasing or decreasing the $P_{LPS}$ for the indication 1838. The context modeler 1856 may increase the $P_{LPS}$, for example, if the actual decoded value of the indication 1838 is not equal to the $V_{MPS}$. The context modeler 1856 may decrease the $P_{LPS}$ for the indication 1838, for example, if the actual decoded value of the indication 1838 is equal to the $V_{MPS}$.

An arithmetic decoder (e.g., the arithmetic decoder 1854) may determine a value of a magnitude symbol of a BVD based on the value of a magnitude symbol of a BVD predictor and the value of an indication of whether the value of a magnitude symbol of the BVD matches the value of the magnitude symbol of the BVD predictor. A decoder may determine the value of the magnitude symbol 1816 of the BVD 1810, for example, based on the value of magnitude symbol 1819 of BVD predictor 1836 and the value of indication 1838. The decoder may determine the value, for example, after entropy decoding the indication 1838. The decoder may determine the value of the magnitude symbol 1816 of the BVD 1810 as being equal to the magnitude symbol of the BVD predictor 1836, for example, based on the indication 1838 indicating that the value of the magnitude symbol 1816 of the BVD 1810 matches the value of the magnitude symbol 1819 of the BVD predictor 1836. The decoder may determine the value of the magnitude symbol 1816 of the BVD 1810 as being not equal to (or equal to the opposite value of) the magnitude symbol 1819 of the BVD predictor 1836 based on the indication 1838 indicating that the value of the magnitude symbol 1816 of the BVD 1810 does not match the value of the magnitude symbol 1819 of the BVD predictor 1836. The magnitude symbol 1819 of the BVD predictor 1836, in this example, may have a value of "0" that may match the value of the magnitude symbol 1816 of the BVD 1810. The indication 1838, in this example, may indicate that the value of the magnitude symbol 1816 of the BVD 1810 matches the value of the magnitude symbol 1819 of the BVD predictor 1836. The indication 1838 may be, for example, a single bit that may have, for example, the value "0" if the value of the magnitude symbol 1816 of the BVD 1810 matches the value of the magnitude symbol 1819 of the BVD predictor 1836 and may have, for example, the value "1" if the value of the magnitude symbol 1816 of the BVD 1810 does not match the value of the magnitude symbol 1819 of the BVD predictor 1836. Alternatively, the value of the indication 1838 may be, for example, "1" if the value of the magnitude symbol of the BVD 1810 matches the value of the magnitude symbol 1819 of the BVD predictor 1836 and "0" if the value of the magnitude symbol 1816 of the BVD 18010 does not match the value of the magnitude symbol 1819 of the BVD predictor 1836. Logic 1858 may be used to determine the magnitude symbol 1816 of the BVD 1810. The logic 1858 may implement, for example, a logical XOR function. If a magnitude symbol is non-binary, an indication may indicate the first candidate among the plurality of candidates (e.g., as sorted based on their respective costs) that has a value of the magnitude symbol that matches the value of the magnitude symbol in the BVD.

The decoder may determine the value of the magnitude symbol 1819 of the BVD predictor 1836 in the same manner as the encoder, as described herein. More specifically, the decoder may select the BVD predictor 1836 from among a plurality of BVD candidates. The decoder may select the BVD predictor 1836 from among a plurality of BVD candidates, for example, based on respective costs of (e.g., determined for, calculated for) the plurality of BVD candidates. The BVD candidates may include a BVD candidate for each possible value of the magnitude symbol of the BVD 1810. For example, a magnitude symbol of a BVD represented in binary form (e.g., the BVD 1810) has only two possible values, {0,1}. The BVD candidates for a BVD having a magnitude symbol with only two possible value, therefore, may include at least two BVD candidates for the BVD (one for each possible value of the magnitude symbol in the BVD being encoded): a first BVD candidate equal to the BVD itself (e.g., BVD candidate 1818 for the BVD 1810) and a second BVD candidate equal to the BVD but with the opposite (or other) value of the magnitude symbol of the BVD (e.g., BVD candidate 1820 for the BVD 1810). The cost for each BVD candidate in the plurality of BVD candidates may be calculated as described herein with respect to the encoder, for example, based on a difference between a template of a current block (e.g., current block 1804 as shown in FIGS. 18A-B) and a template of a candidate reference block (e.g., candidate reference block 1806, candidate reference block 1830, candidate reference block 1843 as shown in FIGS. 18A-B). The candidate reference block may be displaced relative to the current block by a sum of the BVD candidate and a BVP (e.g., the BVP 1808 as shown in FIGS. 18A-B). The decoder may select the BVD candidate with the lowest cost as the BVD predictor (e.g., BVD predictor 1836).

The disclosures provided herein (e.g., with respect to FIGS. 18A-D) to entropy code and/or decode an indication of whether a value of a magnitude symbol of a BVD matches a value of the magnitude symbol of a BVD candidate used as a predictor of the BVD may be used for multiple magnitude symbols of the BVD. The disclosures provided herein may be used, for example, to code and/or decode one or more magnitude symbols of the $BVD_x$ 1812 other than the magnitude symbol 1816 and/or to code and/or decode one or more magnitude symbols of the $BVD_y$ 1814. For each additional magnitude symbol of the $BVD_x$ 1812 and/or the $BVD_y$ 1814 that the disclosures provided herein (e.g., with respect to FIGS. 18A—D) may be used, additional candidate BVPs may be determined. For example, using the disclosures provided herein (e.g., with respect to FIGS. 18A-D) for N magnitude symbols of the $BVD_x$ 1812 and/or the $BVD_y$ 1814 (where N is an integer value), $2^N$ (2^N) different BVP candidates may be determined, one for each possible combination of values for the N magnitude symbols of the $BVD_x$ 1812 and/or the $BVD_y$ 1814. Cost values may be further obtained (e.g., determined, calculated) for each of the BVP candidates and sorted to determine a BVD predictor for encoding and/or decoding each of the N magnitude symbols of the $BVD_x$ 1812 and/or the $BVD_y$ 1814.

Figure 19A:
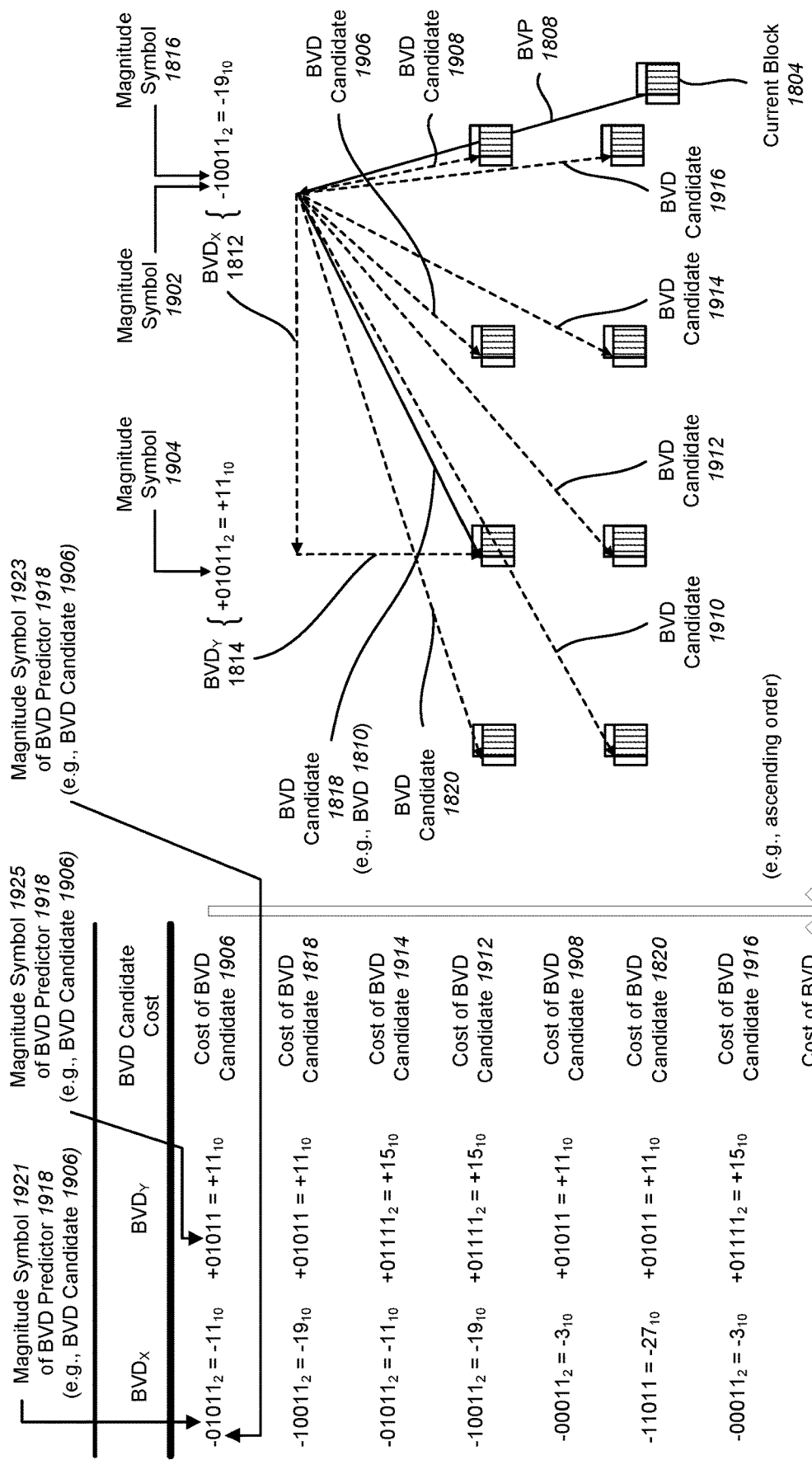
FIG. 19A shows an example of coding additional magnitude symbols of a BVD.

FIG. 19A shows an example of coding additional magnitude symbols of a BVD. The BVD 1810 may be used to code not only the magnitude symbol 1816 of the horizontal component, $BVD_x$ 1812, of the BVD 1810 but also to code, for example, two (2) additional magnitude symbols of the BVD 1810: a magnitude symbol 1902 of the horizontal component, $BVD_x$ 1812, the of BVD 1810 and a magnitude symbol 1904 of the vertical component, $BVD_y$ 1814, of the BVD 1810. As described herein (e.g., with respect to FIG. 18), and as shown in FIG. 19A, the magnitude symbol 1816 of the horizontal component, $BVD_x$ 1812, is the second most significant bit in the fixed length binary representation (e.g., "−10011") of the horizontal component, $BVD_x$ 1812, and has a binary value of "0." As also shown in FIG. 19A the magnitude symbol 1902 of the horizontal component, $BVD_x$ 1812, is the most significant bit in the fixed length binary representation of the horizontal component, $BVD_x$ 1812, and has a binary value of "1," and the magnitude symbol 1904 of the vertical component, $BVD_y$ 1814, is the third most significant bit of the vertical component, $BVD_y$ 1814, and has a binary value of "0."

As described herein, instead of directly entropy encoding magnitude symbols (e.g., the magnitude symbols 1816, 1902, and 1904) of a BVD (e.g., the BVD 1810), an encoder may entropy encode a respective indication for each of the magnitude symbols (e.g., a respective indication for each of the magnitude symbols 1816, 1902, and 1904). The indication for a magnitude symbol may indicate whether the value of the magnitude symbol of the BVD (e.g., the BVD 1810) matches the value of the same magnitude symbol of a BVD candidate used as a predictor of the BVD. The encoder may select the BVD predictor from among a plurality of BVD candidates based on respective costs associated with the plurality of BVD candidates. The plurality BVD candidates may include, for example, a BVD candidate for each (or a subset of the) combination of values of the magnitude symbols (e.g., each combination or subset of the magnitude symbols 1816, 1902, and 1904) of a BVD (e.g., the BVD 1810). For example, with three different magnitude symbols that each may have two possible values {0, 1}, the plurality of BVD candidates would include eight (8) different BVD candidates. FIG. 19A shows by way of example, eight different BVD candidates, which include the BVD candidates 1818 (e.g., the BVD 1810 itself), 1820, 1906, 1908, 1910, 1912, 1914, and 1916. FIG. 19A also shows an example table 1901 that lists the horizontal and vertical components of each of the eight different example BVD candidates in respective rows. The BVD candidates listed in the table 1901 are listed according to the respective cost (e.g., a template matching cost) associated with each BVD candidate. The BVD candidates listed in the table 1901 are listed in descending order of cost. BVD candidates may alternatively be listed in ascending order of cost.

A cost for a BVD candidate (e.g., each BVD candidate) in the plurality of BVD candidates may be obtained (e.g., determined, calculated). The cost may be obtained, for example, based on a difference between a template of a current block (e.g., the current block 1804) and a template of a candidate reference block. The candidate reference block may be displaced relative to the current block by a sum of a BVD candidate and a BVP (e.g., BVP 1808). For example, an encoder may obtain (e.g., determine, calculate) a cost for the BVD candidate 1818 based on a difference between a template of the current block 1804 and a template of a candidate reference block displaced relative to current block 1804 by a sum of the BVD candidate 1818 and the BVP 1808. The encoder may obtain (e.g., determine, calculate) the difference between the two templates based on a difference (e.g., a sum of squared differences (SSD), a sum of absolute differences (SAD), a sum of absolute transformed differences (SATD), a mean removal SAD, or a mean removal SSD) between samples of the two templates. The template of a block may comprise one or more samples to the left and/or above the block. For example, the template of the candidate reference block displaced relative to the current block 1804 by a sum of the BVD candidate 1818 and the BVP 1808 may comprise samples from one or more columns to left of the candidate reference block and/or from one or more rows above the candidate reference block. FIG. 19A shows example positions and shapes (e.g., L-shapes rotated clockwise 90 degrees) of templates for candidate reference blocks that are respectively displaced relative to the current block 1804 by a sum of a respective one of the plurality of BVD candidates and the BVP 1808. Different templates may be used (e.g., templates having different shapes, rotations, and/or sizes).

The encoder may select one of the plurality of BVD candidates as a BVD predictor, for example, after determining the costs of each of the plurality of BVD candidates. For example, the encoder may select the BVD candidate with the lowest (e.g., smallest) cost among the plurality of BVD candidates as the BVD predictor. The example table 1901 shown in FIG. 19A includes the components (horizontal, BVDx, and vertical, BVDy) and respective cost of each of the plurality of BVD candidates in a respective row. The eight example BVD candidates discussed herein are assumed, solely for the purpose of providing an example and without limitation, to be the only BVD candidates. More or fewer BVD candidates may be used. The rows of the table 1901 may be sorted (e.g., in descending order or ascending order) based on the costs of the plurality of BVD candidates. The rows of the table 1901, for example, are sorted in descending order with the BVD candidate associated with the lowest (e.g., smallest cost) at the top row. For example, the BVD candidate 1906 has the lowest (e.g., smallest) cost among the plurality of BVD candidates listed in the example table 1901. The encoder may select the BVD candidate 1906 as a BVD predictor 1918 for the BVD 1810.

An encoder (e.g., encoder 114 or encoder 200) may entropy encode a respective indication for one or more magnitude symbols (e.g., each of the magnitude symbols 1816, 1902, and 1904), for example, after selecting a BVD candidate (e.g., BVD candidate 1906) as a BVD predictor (e.g., BVD predictor 1918). The indication for a magnitude symbol may indicate whether the value of the magnitude symbol of a BVD (e.g., the BVD 1810) matches the value of the magnitude symbol of a BVD predictor (e.g., the BVD predictor 1918) at the same position (e.g., at the same bit position in a sequence of bits). The encoder may entropy encode the respective indication for one or more magnitude symbols (e.g., each of the magnitude symbols 1816, 1902, and 1904), for example, using an arithmetic encoder (e.g., the arithmetic encoder 1842) as described herein (e.g., in the same manner as the indication 1838 described herein with respect to FIG. 18).

For example, as shown in FIG. 19A, the value of the magnitude symbol 1921 of the horizontal component, $BVD_X$, of the BVD predictor 1918 ("1") does not match the value of the magnitude symbol 1816 of the horizontal component, $BVD_X$ 1812, of the BVD 1810 ("0"). As a result, the indication for the magnitude symbol 1816 of the horizontal component, $BVD_X$ 1812, of the BVD 1810 would indicate, in this example, that the value of the magnitude symbol 1816 of the horizontal component, $BVD_X$ 1812, of the BVD 1810 ("0") does not match the value of the magnitude symbol 1921 of the horizontal component, $BVD_X$, of the BVD predictor 1918 ("1"). As also shown in FIG. 19A, for example, the value of the magnitude symbol 1923 of the horizontal component, $BVD_X$, of the BVD predictor 1918 ("0") does not match the value of the magnitude symbol 1902 of the horizontal component, $BVD_X$ 1812, of the BVD 1810 ("1"). As a result, the indication for the magnitude symbol 1902 of the horizontal component, $BVD_X$ 1812, of the BVD 1810 would indicate, in this example, that the value of the magnitude symbol 1902 of the horizontal component, $BVD_X$ 1812, of the BVD 1810 ("1") does not match the value of the magnitude symbol 1923 of the horizontal component, $BVD_X$, of the BVD predictor 1918. As also shown in FIG. 19A, for example, the value of the magnitude symbol 1925 of the vertical component, $BVD_Y$, of the BVD predictor 1918 ("0") does match the value of the magnitude symbol 1904 of the vertical component, $BVD_Y$ 1814, of the BVD 1810. As a result, the indication for the magnitude symbol 1904 would indicate, in this example, that the value of the magnitude symbol 1904 of the vertical component, $BVD_Y$ 1814, of the BVD 1810 does match the value of the magnitude symbol 1904 of the vertical component, $BVD_Y$, of the BVD predictor 1918.

An indication of whether a value of a magnitude symbol of a component of a BVD (e.g., the horizontal component or the vertical component of the BVD) may be a single bit. For example, the indication may be a single bit that has the value "0" if the value of the magnitude symbol of the component of the BVD (e.g., the BVD 1810) matches the value of the magnitude symbol of a BVD predictor (e.g., the BVD predictor 1918); and has the value "1" if the value of the magnitude symbol of the BVD (e.g., the BVD 1810) does not match the value of the same magnitude symbol of the BVD predictor (e.g., the BVD predictor 1918). Other values may be used to indicate whether a value of a magnitude symbol of a BVD matches the value of a magnitude symbol of a BVD predictor. Logic may be used to determine the indication (e.g., each respective indication for each bit position in a sequence of bits that represent the magnitude). The logic may implement a logical exclusive or (XOR) function. An indication may indicate a BVD candidate (e.g., the first candidate) among a plurality of BVD candidates (e.g., BVD candidates sorted based on their respective costs) that has a value of a magnitude symbol that matches a value of the magnitude symbol of a BVD, for example, if the magnitude symbol is non-binary.

A single BVD predictor (e.g., the BVD predictor 1918) may be used to determine a respective indication for each magnitude symbol position of the horizontal component and/or the vertical component of a BVD (e.g., for each magnitude symbol position corresponding to the magnitude symbols 1816, 1902 of the horizontal component, $BVD_X$ 1812, of the BVD 1810 and the magnitude symbol 1904 of the vertical component, $BVD_Y$ 1814, of the BVD 1810). Rather than using a single BVD predictor to determine a respective indication for each of magnitude symbol position, different BVD predictors may be selected respectively for different magnitude symbol positions (e.g., at least two magnitude symbol positions or each magnitude symbol position) of a BVD. An encoder may prune the plurality of BVD candidates, for example, after determining an indication for one of magnitude symbol positions (e.g., after determining the magnitude symbol 1816, 1902, and/or 1904). An encoder may select another BVD predictor. The encoder may select another BVD predictor, for example, based on a subset of the plurality of BVD candidates that after the pruning, for example, to determine an indication for another magnitude symbols at a different magnitude symbol position.

For example, the BVD predictor 1918 may be used to determine an indication for a first magnitude symbol (e.g., the magnitude symbol 1902) based on the BVD predictor 1918., An encoder may prune the plurality of BVD candidates (e.g., the BVD candidates 1818, 1820, 1908, 1910, 1912, 1914, and 1916) to remove one or more BVD candidates. The encoder may remove, for example, any BVD candidate that does not have a value of a magnitude symbol that matches a value of a magnitude symbol at the same magnitude symbol position of the corresponding component of the BVD (e.g., at the same magnitude symbol position of the horizontal component, $BVD_X$ 1812, or the vertical component, $BVD_Y$ 1814, of the BVD 1810). Removing BVD candidates from the plurality of BVD candidates as described herein may result in a subset of the plurality of BVD candidates that have a value of a magnitude symbol that matches a value of a magnitude symbol at the same magnitude symbol position of the corresponding component of the BVD (e.g., at the same magnitude position of the horizontal component, $BVD_X$ 1812, or the vertical component, $BVD_Y$ 1814, of the BVD 1810).

Removing from the plurality of BVD candidates one or more BVD candidates that do not match a BVD at one or more values of their respective magnitude symbols may improve the likelihood of a magnitude symbol of a remaining BVD candidate matching a magnitude symbol of the BVD at a subsequent magnitude symbol position. Removing BVD candidates from the plurality of BVD candidates (e.g., pruning the plurality of BVD candidates) may improve the predictions for the magnitude symbols of the BVD. Improving the predictions of the magnitude symbols of a BVD (e.g., correctly predicting the symbols of the BVD) may improve the compression efficiency of the magnitude symbol predictions. Improving the compression efficiency of the magnitude symbol predictions may reduce the overhead needed to signal the magnitude symbol predictions.

As shown in FIG. 19A, for example, the magnitude symbol 1902 of the BVD 1810 has a value of "1." An encoder may determine a subset of the plurality of BVD candidates based on the value of the magnitude symbol at the same magnitude symbol position having the same value of "1" (e.g., the BVD candidates 1818, 1912, 1820, and 1910).

Determining a subset of BVD candidates based on matching magnitude symbols at the same magnitude symbol position may, for example if encoding or decoding, improve predictions of additional magnitude symbols (e.g., additional bits of a combination of bits of a BVD). Predictions of additional magnitude symbols (e.g., the most significant bits (MSBs) of a BVD) may be improved, for example, by eliminating BVD candidates that are less likely to include the correct magnitude symbol value for the additional magnitude symbol.

For example, predicting three (3) binary magnitude symbols may yield eight (8) BVD candidates given the two possible values (e.g., {0, 1}) for each of the three magnitude symbols (e.g., eight possible combinations of magnitude symbol values). Predicting one of the three binary magnitude symbols may, for example, leave two of the three binary magnitude symbols remaining to predict. With two remaining magnitude symbols remaining to predict, the total number of BVD candidates is reduced by a factor of two yielding four remaining BVD candidates given the two possible values (e.g., { 0, 1}) for each of the remaining two magnitude symbols (e.g., four possible combinations of magnitude symbol values). Predicting one of the remaining two binary magnitude symbols may, for example, leave one of the two remaining magnitude symbols to predict. With one remaining magnitude symbol remaining to predict, the total number of BVD candidates is reduced again by a factor of two yielding two remaining BVD candidates given the two possible values (e.g., {0, 1}) for the remaining magnitude symbol (two possible combinations of magnitude symbol values). The quantity of BVD candidates may be reduced by a factor greater than two (e.g., a factor of four, a factor of eight), for example, if predicting magnitude symbols (e.g., if encoding or decoding) using parallel operations as described herein. Parallelization of the disclosures herein may be achieved in various hardware implementation, for example, using multiple processors as described herein.

The quantity of magnitude symbols predicted (e.g., if encoding and/or decoding) may be a defined parameter (e.g., a variable). Defining the quantity of magnitude symbols predicted may help, for example, to manage complexity if encoding and/or decoding. For example, a maximum quantity of magnitude symbols (e.g., bits) to be predicted may be defined. Defining a maximum quantity of magnitude symbols to predict may, for example, limit the worst case complexity by the quantity of magnitude symbols being predicted. Tradeoffs may exist between, for example, complexity and coding gain. For example, increasing the quantity of magnitude symbols being predicted may yield diminishing returns with respect to any coding gains achieved. Defining a maximum quantity of magnitude symbols to predict may, for example, indicate a quantity of hardware elements and/or hardware resources used for any hardware implementations of the disclosures herein.

As described herein, a BVD predictor may be selected based on a cost such as, for example, a template matching cost. The template matching operations may be, for example, independent of each other. With no dependency between template matching operations, the template matching operations may be parallelized in one or more hardware implementations as described herein. For example, a hardware implementation may perform up to 64 (or more) template matching operations in parallel. The quantity of parallel template matching operations performed in a hardware implementation may depend, for example, on a ratio between complexity and achieved encoding and/or decoding gains (e.g., a defined ratio, a specified ratio, a desired ratio, a preferred ratio).

Figure 19B:
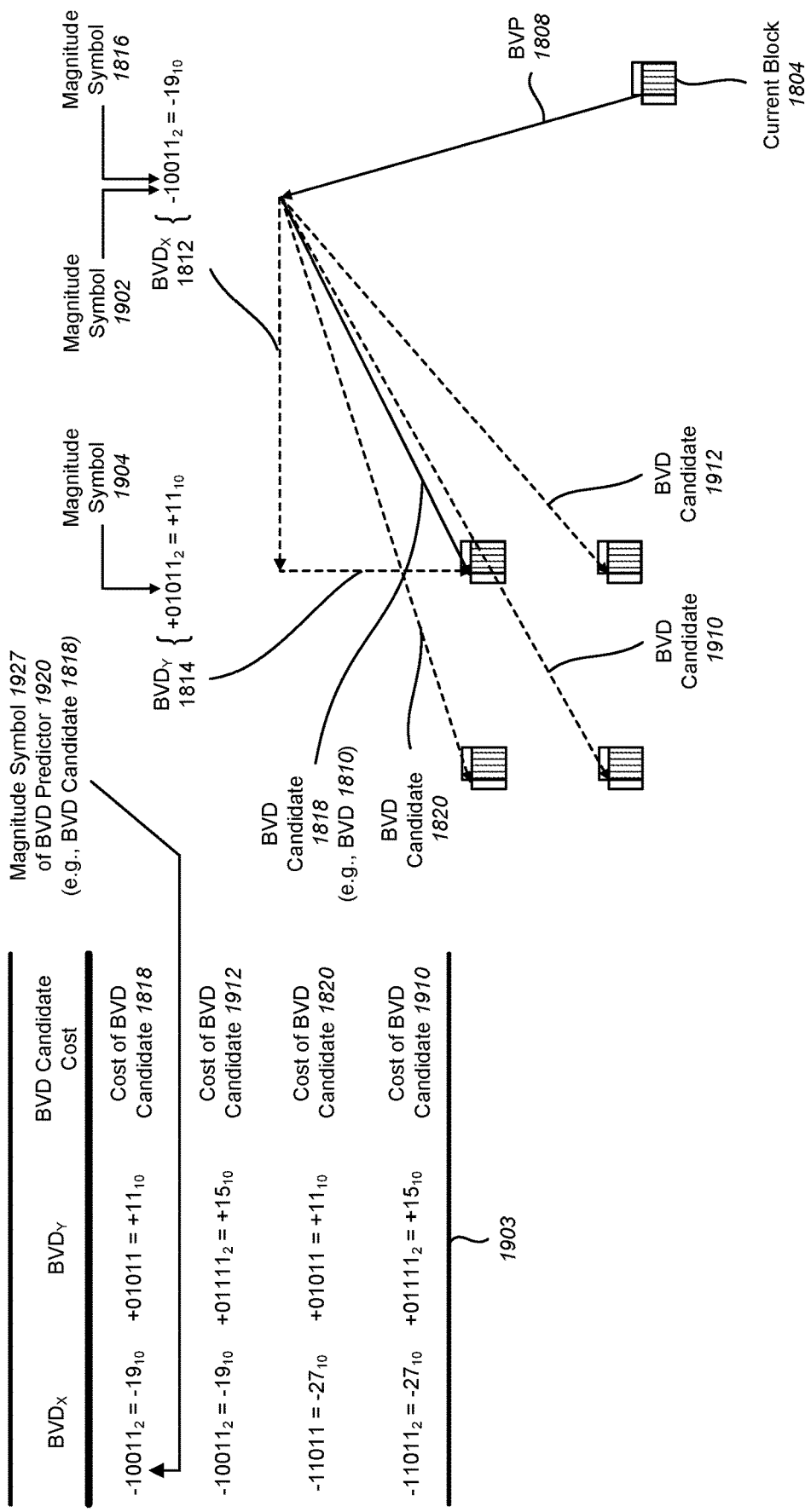
FIG. 19B shows an example of coding additional magnitude symbols of a BVD.

FIG. 19B shows an example of coding additional magnitude symbols of a BVD. As seen in FIG. 19B, a table 1903 that lists the horizontal and vertical components of a subset of the BVD candidates listed in the table 1901 shown in FIG. 19A. The table 1903 includes the respective costs for each BVD candidate of the subset of BVD candidates. The encoder may determine (e.g., obtain, select) another BVD predictor from among the subset of the BVD candidates (e.g., the BVD candidates 1818, 1912, 1820, and 1910) as a BVD predictor. The encoder may determine (e.g., obtain, select) another BVD predictor from among the subset of the BVD candidates (e.g., the BVD candidates 1818, 1912, 1820, and 1910) as a BVD predictor, for example, after determining the subset of the BVD candidates. For example, the encoder may select the BVD candidate associated with the lowest (e.g., smallest) cost among the subset of the BVD candidates as the next BVD predictor. The example table 1903 shown in FIG. 19B includes the horizontal and vertical components of the BVD candidates and the cost associated with each BVD candidate in a respective row of the table. The rows of the table 1903 may be sorted (e.g., in ascending order or descending order) based on the costs of the subset of BVD candidates. The BVD candidate associated with the lowest (e.g., smallest) cost may be listed at the top row of the table, for example, if sorted in ascending order. The BVD candidate 1818, in this example, is associated with the lowest (e.g., smallest) cost among the subset of the BVD candidates 1818, 1912, 1820, and 1910. An encoder may select the BVD candidate 1818 as a next BVD predictor 1920 for the BVD 1810, for example, based on the BVD candidate 1818 being associated with the lowest cost. The encoder may entropy encode an indication for one of the remaining two magnitude symbols 1816 and 1904, for example, after selecting BVD candidate 1818 as BVD predictor 1920. For example, the encoder may entropy encode an indication for the magnitude symbol 1816 that indicates whether the value of magnitude symbol 1816 of the BVD 1810 matches the value of the magnitude symbol 1927 of BVD predictor 1920 at the same magnitude symbol position. The encoder may entropy encode the indication for magnitude symbol 1816 using an arithmetic encoder (e.g., the arithmetic encoder 1842) in the same manner as the indication 1838 as described herein with respect to FIG. 18.

The encoder may further prune the subset of the BVD candidates (e.g., the BVD candidates 1818, 1912, 1820, and 1910) to remove one or more additional BVD candidates of the plurality of BVD candidates. The encoder may remove, for example, any BVD candidate that does not have a value of a magnitude symbol that matches a value of a magnitude symbol at the same magnitude symbol position of the corresponding component of the BVD (e.g., at the same magnitude symbol position of the horizontal component, $BVD_X$ 1812, or the vertical component, $BVD_Y$ 1814, of the BVD 1810). The encoder may remove one or more BVD candidates from the subset of the BVD candidates. The encoder may remove one or more BVD candidates from the subset of the BVD candidates, for example, after determining the indication for a magnitude symbol (e.g., the magnitude symbol 1816). For example, the encoder may determine the subset of the BVD candidates shown in the table 1903 of FIG. 19B that have a value of a magnitude symbol that matches the value of the magnitude symbol 1816 of the horizontal component, BVD$_X$ 1812, of the BVD 1810. As shown in FIG. 19B, for example, the magnitude symbol 1816 of the horizontal component, BVD$_X$ 1812, of the BVD 1810 has a value of "0." The encoder may further prune the subset of the BVD candidates shown in the table 1903 to remove the BVD candidates 1820 and 1910, where a value of the magnitude symbol at the same magnitude symbol position is "1," resulting in another subset of BVD candidates that includes the BVD candidates 1818 and 1912, where a value of the magnitude symbol at the same magnitude symbol position is "0."

Figure 19C:
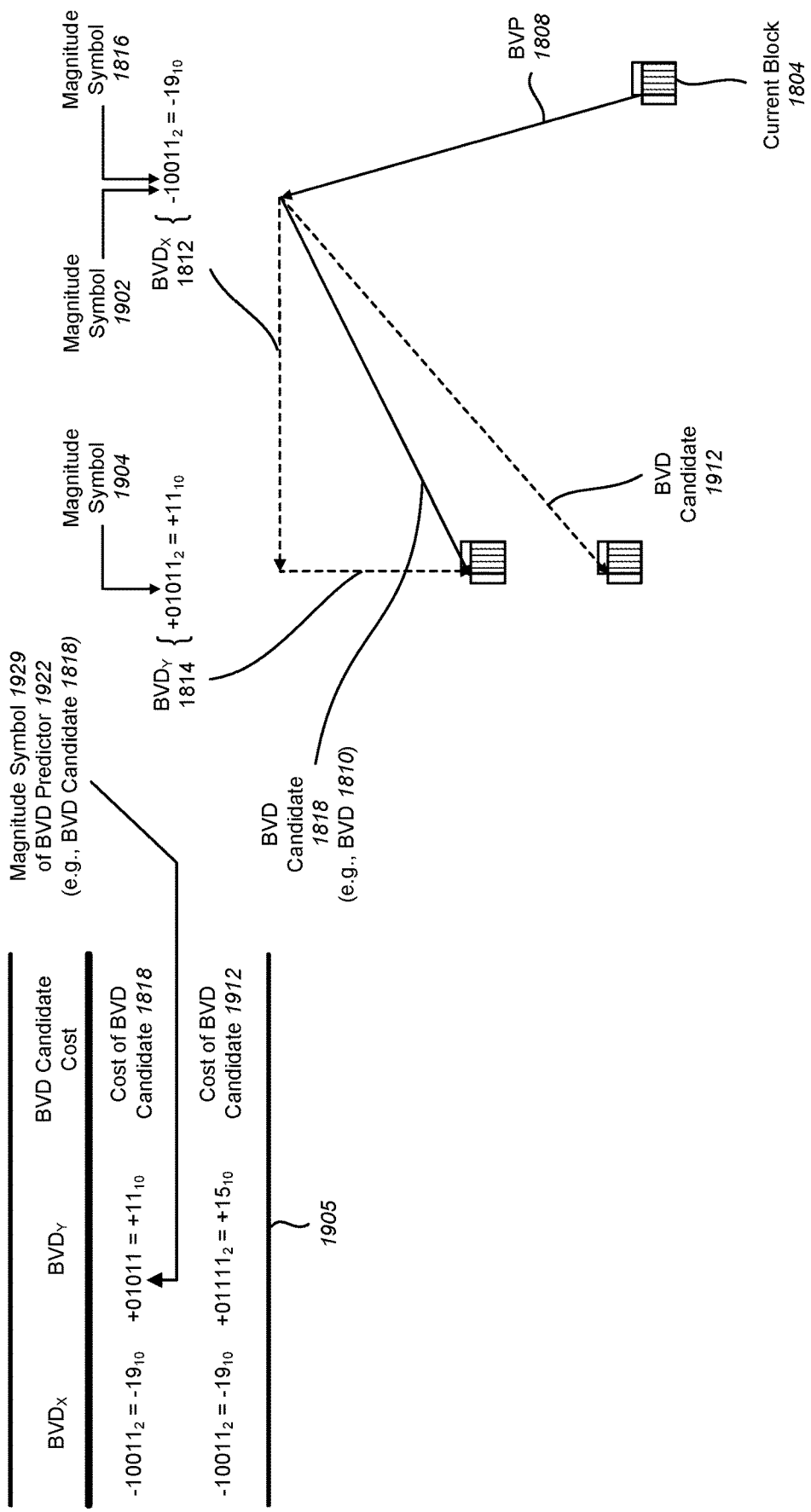
FIG. 19C shows an example of coding additional magnitude symbols of a BVD.

FIG. 19C shows an example of coding additional magnitude symbols of a BVD. As seen in FIG. 19C, a table 1905 lists the horizontal and vertical components of a subset of the BVD candidates listed in the example table 1903 shown in FIG. 19B. The example table 1905 includes the respective costs for each BVD candidate of the subset of BVD candidates. The encoder may determine (e.g., select, obtain) another BVD predictor from among the subset of the BVD candidates (e.g., the BVD candidates 1818 and 1912) as a next BVD predictor. The encoder may determine (e.g., select, obtain) another BVD predictor from among the subset of the BVD candidates (e.g., the BVD candidates 1818 and 1912) as a next BVD predictor, for example, after determining the subset of BVD candidates. For example, the encoder may select the BVD candidate with the lowest (e.g., smallest) cost among the subset of the BVD candidates as the next BVD predictor. The example table 1905 shown in FIG. 19C includes the horizontal and vertical components of the BVD candidates and the cost of each BVD candidate in a respective row of the table. The rows of the example table 1905 may be sorted (e.g., in ascending order or descending order) based on the costs of the subset of BVD candidates. The BVD candidate with the lowest (e.g., smallest) cost may be listed at the top row of the table, for example, if sorted in ascending order. The BVD candidate 1818, in this example, is associated with the lowest (e.g., smallest) cost among the subset of the BVD candidates 1818 and 1912. An encoder may select the BVD candidate 1818 as a next BVD predictor 1922 for the BVD 1810, for example, based on the BVD candidate 1818 being associated with the lowest cost. The encoder may entropy encode an indication for the remaining magnitude symbol 1904, for example, after selecting BVD candidate 1818 as BVD predictor 1922. The indication may indicate whether the value of magnitude symbol 1904 of the vertical component, BVD$_Y$ 1814, of the BVD 1810 matches the value of the magnitude symbol 1929 of the vertical component, BVD$_Y$, the BVD predictor 1922 at the same magnitude symbol position. The encoder may entropy encode the indication for magnitude symbol 1904 using the arithmetic encoder 1842 in the same manner as the indication 1838 as described herein with respect to FIG. 18.

A decoder may receive an entropy coded indication for a magnitude symbol (e.g., each indication for the magnitude symbols 1816, 1902, and 1904). The decoder may entropy decode the received entropy coded indication (e.g., each indication for the magnitude symbols 1816, 1902, and 1904) in the same manner as the indication 1838 as described herein with respect FIG. 18.

The decoder may determine the value of a magnitude symbol (e.g., the magnitude symbol 1902 of the horizontal component, BVD$_X$ 1812, of the BVD 1810), for example, based on the value of a magnitude symbol of a BVD predictor (e.g., the magnitude symbol 1923 of the horizontal component, BVD$_X$, of the BVD predictor 1918) and the value of the indication for the magnitude symbol of the horizontal component, BVD$_X$, of the BVD (e.g., the indication for the magnitude symbol 1902). The decoder may determine the value of the magnitude symbol for a BVD, for example, after entropy decoding the indication for the magnitude symbol. For example, the decoder may determine the value of the magnitude symbol 1902 of the horizontal component, BVD$_X$ 1812, of the BVD 1810 as being equal to the value of the magnitude symbol 1923 of the horizontal component, BVD$_X$, of the BVD predictor 1918 based on the indication for magnitude symbol 1902 indicating that the value of magnitude symbol 1902 matches the value of magnitude symbol 1923. The decoder may determine the value of magnitude symbol 1902 of the horizontal component, BVD$_X$ 1812, of the BVD 1810 as being not equal to (or equal to the opposite value of) the value of the magnitude symbol 1923 of the horizontal component, BVD$_X$, of the BVD predictor 1918, for example, based on the indication for magnitude symbol 1902 indicating that the value of the magnitude symbol 1902 of the horizontal component, BVD$_X$ 1812, of the BVD 1810 does not match the value of the magnitude symbol 1923 of the horizontal component, BVD$_X$, of the BVD predictor 1918.

The decoder may determine the value of the magnitude symbol 1923 of the horizontal component, BVD$_X$, of the BVD predictor 1918 in the same manner as the encoder described herein. For example, the decoder may select the BVD predictor 1918 from among a plurality of BVD candidates. The decoder may select the BVD predictor 1918, for example, based on costs associated with the plurality of the BVD candidates. The plurality BVD candidates may include a BVD candidate for each (or some subset of the) combination of values of magnitude symbols of a BVD (e.g., the magnitude symbols 1816, 1902, and 1904 of the BVD 1810). With three different magnitude symbols that each may have two possible values (e.g., {0, 1}), the plurality of BVD candidates may include eight (8) different BVD candidates. Examples of these eight different BVD candidates are shown in FIG. 19A and include the BVD candidates 1818, 1820, 1906, 1908, 1910, 1912, 1914, and 1916. FIG. 19A also shows a table 1901 that lists the horizontal and vertical components of each of the eight different example BVD candidates in a respective row. The cost associated with each BVD candidate of the plurality of BVD candidates may be determined (e.g., calculated) as described herein. For example, the cost associated with a BVD candidate may be determined (e.g., selected, obtained) with respect to the decoder based on a difference between a template of a current block (e.g., the current block 1804) and a template of a candidate reference block. The candidate reference block may be displaced relative to the current block by a sum of a BVD candidate and a BVP (e.g., BVP 1808). The decoder may select the BVD candidate associated with the lowest (e.g., smallest) cost as the BVD predictor (e.g., BVD predictor 1918).

The decoder may prune the plurality of BVD candidates (e.g., the BVD candidates 1818, 1820, 1908, 1910, 1912, 1914, and 1916) to remove one or more BVD candidates. The decoder may remove, for example, any BVD candidate that does not have a value of a magnitude symbol that matches a value of a magnitude symbol at the same magnitude symbol position of the corresponding component of the BVD (e.g., at the same magnitude symbol position of the horizontal component, BVD$_X$ 1812, or the vertical component, BVD$_Y$ 1814, of the BVD 1810). The decoder may remove one or more BVD candidates from the plurality of BVD candidates, for example, after the decoder determines the value of a magnitude symbol of a BVD. Removing BVD candidates from the plurality of BVD candidates as described herein may result in a subset of the plurality of BVD candidates that have a value of a magnitude symbol that matches a value of a magnitude symbol at the same magnitude symbol position of the corresponding component of the BVD (e.g., at the same magnitude position of the horizontal component, $BVD_X$ 1812, or the vertical component, $BVD_Y$ 1814, of the BVD 1810). This pruning step removes from the plurality of BVD candidates one or more BVD candidates that do not match a BVD at one or more values of their respective magnitude symbols. As shown in FIG. 19A, for example, the magnitude symbol 1902 of the BVD 1810 has a value of "1." A decoder may determine a subset of the plurality of BVD candidates based on the value of the magnitude symbol at the same magnitude symbol position having the same value of "1" (e.g., the BVD candidates 1818, 1912, 1820, and 1910).

As described herein, FIG. 19B shows a table 1903 with a subset of BVD candidates and their respective costs (e.g., the subset of the costs from the table 1901 of FIG. 19A that are associated with the subset of BVD candidates). The decoder may determine (e.g., select) another BVD predictor from among the subset of the BVD candidates (e.g., the BVD candidates 1818, 1912, 1820, and 1910) as a BVD predictor, for example, after determining the subset of BVD candidates. For example, the decoder may select the BVD candidate associated with the lowest (e.g., smallest) cost among the subset of BVD candidates as the next BVD predictor. The example table 1903 shown in FIG. 19B includes the horizontal and vertical components of the BVD candidates and the cost associated with each BVD candidate in a respective row of the table. The rows of the table 1903 may be sorted (e.g., in ascending order or descending order) based on the costs of the subset of BVD candidates. The BVD candidate associated with the lowest (e.g., smallest) cost may be listed at the top row of the table, for example, if sorted in ascending order. The BVD candidate 1818, in this example, is associated with the lowest (e.g., smallest) cost among the subset of the BVD candidates 1818, 1912, 1820, and 1910. A decoder may select the BVD candidate 1818 as a next BVD predictor 1920 for the BVD 1810, for example, based on the BVD candidate 1818 being associated with the lowest cost.

The decoder may determine (e.g. select, obtain) the value of a magnitude symbol (e.g., magnitude symbol 1816) of a BVD (e.g., BVD 1810), for example, based on the value of a magnitude symbol (e.g., magnitude symbol 1927) of a BVD predictor (e.g., BVD predictor 1920) and the value of an indication for the magnitude symbol (e.g., the magnitude symbol 1816). For example, the decoder may determine (e.g. select, obtain) the value of the magnitude symbol 1816 of the horizontal component, $BVD_X$ 1812, of the BVD 1810 as being equal to the magnitude symbol 1927 of the horizontal component, $BVD_X$, of the BVD predictor 1920 based on the indication for the magnitude symbol 1816 indicating that the value of the magnitude symbol 1816 of the horizontal component, $BVD_X$ 1812, of the BVD 1810 matches the value of the magnitude symbol 1927 of the horizontal component, $BVD_X$, of the BVD predictor 1920. The decoder may determine (e.g. select, obtain) the value of the magnitude symbol 1816 of the horizontal component, $BVD_X$ 1812, of the BVD 1810 as being not equal to (or equal to the opposite value of) magnitude symbol 1927 of the horizontal component, $BVD_X$, of the BVD predictor 1920 based on the indication for the magnitude symbol 1816 indicating that the value of the magnitude symbol 1816 of the horizontal component, $BVD_X$ 1812, of the BVD 1810 does not match the value of magnitude symbol 1927 of the horizontal component, $BVD_X$, of the BVD predictor 1920.

The decoder may further prune the subset of the BVD candidates (e.g., the BVD candidates 1818, 1912, 1820, and 1910) to remove one or more additional BVD candidates of the plurality of BVD candidates. The decoder may remove, for example, any BVD candidate that does not have a value of a magnitude symbol that matches a value of a magnitude symbol at the same magnitude symbol position of the corresponding component of the BVD (e.g., at the same magnitude symbol position of the horizontal component, $BVD_X$ 1812, or the vertical component, $BVD_Y$ 1814, of the BVD 1810. The decoder may remove one or more BVD candidates from the subset of the BVD candidates, for example, after determining the indication for a magnitude symbol (e.g., magnitude symbol 1816). For example, the decoder may determine the subset of the BVD candidates shown in the table 1903 of FIG. 19B that have a value of a magnitude symbol that matches the value of the magnitude symbol 1816 of the horizontal component, $BVD_X$ 1812, of the BVD 1810. As shown in FIG. 19B, for example, the magnitude symbol 1816 of the horizontal component, $BVD_X$ 1812, of the BVD 1810 has a value of "0." The decoder may further prune the subset of the BVD candidates shown in the table 1903 to remove the BVD candidates 1820 and 1910, where a value of the magnitude symbol at the same magnitude symbol position is "1," resulting in another subset of BVD candidates that includes the BVD candidates 1818 and 1912, where a value of the magnitude symbol at the same magnitude symbol position is "0."

As described herein, FIG. 19C shows an example of coding additional magnitude symbols of a BVD. As seen in FIG. 19C, a table 1905 lists the horizontal and vertical components of a subset of the BVD candidates listed in the example table 1903 shown in FIG. 19B. The example table 1905 includes the respective costs for each BVD candidate of the subset of BVD candidates. The decoder may determine (e.g., select, obtain) another BVD predictor from among the subset of the BVD candidates (e.g., the BVD candidates 1818 and 1912) as a next BVD predictor, for example, after determining the subset of BVD candidates. For example, the decoder may select the BVD candidate with the lowest (e.g., smallest) cost among the subset of the BVD candidates as the next BVD predictor. The example table 1905 shown in FIG. 19C includes the horizontal and vertical components of the BVD candidates and the cost of each BVD candidate in a respective row of the table. The rows of the example table 1905 may be sorted (e.g., in ascending order or descending order) based on the costs of the subset of BVD candidates. The BVD candidate with the lowest (e.g., smallest) cost may be listed at the top row of the table, for example, if sorted in ascending order. The BVD candidate 1818, in this example, is associated with the lowest (e.g., smallest) cost among the subset of the BVD candidates 1818 and 1912. A decoder may select the BVD candidate 1818 as a next BVD predictor 1922 for the BVD 1810, for example, based on the BVD candidate 1818 being associated with the lowest cost.

The decoder may determine the value of a magnitude symbol (e.g., the magnitude symbol 1904) of a BVD (e.g., the BVD 1810) based on the value of the magnitude symbol (e.g., the magnitude symbol 1929) of a BVD predictor (e.g., the BVD predictor 1922) and the value of the indication for the magnitude symbol (e.g., the magnitude symbol 1904). For example, the decoder may determine (e.g. select, obtain) the value of the magnitude symbol 1904 of the vertical component, $BVD_Y$ 1814, of the BVD 1810 as being equal to the magnitude symbol 1929 of the vertical component, $BVD_y$, of the BVD predictor 1922. The decoder may determine (e.g. select, obtain) the value of the magnitude symbol 1904 of the vertical component, $BVD_y$ 1814, of the BVD 1810 as being equal to the magnitude symbol 1929 of the vertical component, $BVD_y$, of the BVD predictor 1922, for example, based on the indication for the magnitude symbol 1904 indicating that the value of the magnitude symbol 1904 of the vertical component, $BVD_y$ 1814, of the BVD 1810 matches the value of the magnitude symbol 1929 of the vertical component, $BVD_y$, of the BVD predictor 1922. The decoder may determine the value of the magnitude symbol 1904 of the vertical component, $BVD_y$ 1814, of the BVD 1810 as being not equal to (or equal to the opposite value of) the magnitude symbol 1929 of the vertical component, $BVD_y$, of the BVD predictor 1922 based on the indication for the magnitude symbol 1904 indicating that the value of magnitude symbol 1904 of the vertical component, $BVD_y$ 1814, of the BVD 1810 does not match the value of the magnitude symbol 1929 of the vertical component, $BVD_y$, of the BVD predictor 1922.

The vertical component, $BVD_y$ 1814, and the horizontal component, $BVD_x$ 1812, of the BVD 1810 and the vertical and horizontal components of the BVD candidates are described herein (e.g., with respect to FIGS. 18A-D and FIGS. 19A-C) as being represented using fixed-length binary. Other binarizations of the vertical component, $BVD_y$ 1814, and the horizontal component, $BVD_x$ 1812, of the BVD 1810 and the vertical and horizontal components of the BVD candidates may be possible. For example, the vertical component, $BVD_y$ 1814, and the horizontal component, $BVD_x$ 1812, of the BVD 1810 may be represented using unary, truncated unary, k-th order truncated Rice, k-th order exponential-Golomb (EGk), or some combination of two or more of these binarization processes. For EGk, each codeword may include a unary prefix of length $L_N+1$ and a suffix of length $L_N+k$, where $L_N=\lfloor \log_2((N\gg k)+1) \rfloor$. Any magnitude symbols coded using the approach discussed herein (e.g., with respect to FIG. 18) may be in the respective suffix of one or more of the vertical component, $BVD_y$ 1814, and the horizontal component, $BVD_x$ 1812, of the BVD 1810 and the vertical and horizontal components of the BVD candidates, for example, for EGk representations of the vertical component, $BVD_y$ 1814, and the horizontal component, $BVD_x$ 1812, of the BVD 1810 and the vertical and horizontal components of the BVD candidates.

As described herein, pruning may be performed for a magnitude symbol at a magnitude symbol position of a component of a BVD. The component may be the horizontal component, $BVD_x$, of the BVD or the vertical component, $BVD_y$, of the BVD. For a pair of BVD candidates that are different from each other by, for example, one (1) bit (also referred to as a bin) in a position of a horizontal component or a vertical component, the distance between the two BVD candidates may be determined by the significance of the position of the bit. More significant positions of a bit (or bits) of a horizontal component and/or a vertical component may correspond to greater distances between the BVD candidates. Greater distances between the BVD candidates may correspond to greater differences in the costs (e.g., the template matching costs) associated with the BVD candidates. The magnitude symbol used to prune the BVD candidates may be the most significant bit (or next most significant bit) of the BVD. Pruning the BVD candidates based on the most significant bit (or next most significant bit) of the horizontal or vertical component may result in the BVD candidates that are relatively farther from the BVD being pruned before BVD candidates that are relatively closer to the BVD. The BVD candidates may be pruned, for example, first based on the horizontal component and then based on the vertical component (e.g., as described herein by way of example with reference to FIGS. 19A-C). The BVD candidates may be pruned, for example, first based on the vertical component and then based on the horizontal component. The BVD candidates may be pruned, for example, based on which of the horizontal component or the vertical component is larger. The BVD candidates may be pruned first based on the horizontal component and then based on the vertical component, for example, if the horizontal component is larger than the vertical component. The BVD candidates may be pruned first based on the vertical component and then based on the horizontal component, for example, if the vertical component is larger than the horizontal component. The BVD candidates may be pruned first based on the horizontal component or the vertical component, for example, if the horizontal component is the same as the vertical component.

The disclosures provided herein (e.g., with respect to FIGS. 18A-D and FIGS. 19A-C) may be further used for one or more magnitude symbols of an MVD used in inter prediction in addition or alternatively to one or more magnitude symbols of a BVD used in IBC. The terms BV, BVP, BVD, and BVD candidate (e.g., used with reference to FIGS. 18A-D and FIGS. 19A-C) may be replaced by the terms MV, MVP, MVD, and MVD, for example, for inter prediction.

The disclosures provided herein (e.g., with respect to FIGS. 18A-D and FIGS. 19A-C) may be used for IBC and inter prediction based on a translational motion model for the prediction block. The disclosures provided herein (e.g., with respect to FIGS. 18A-D and FIGS. 19A-C) may be used for IBC and inter prediction based on an affine motion model for the prediction block.

Figure 20:
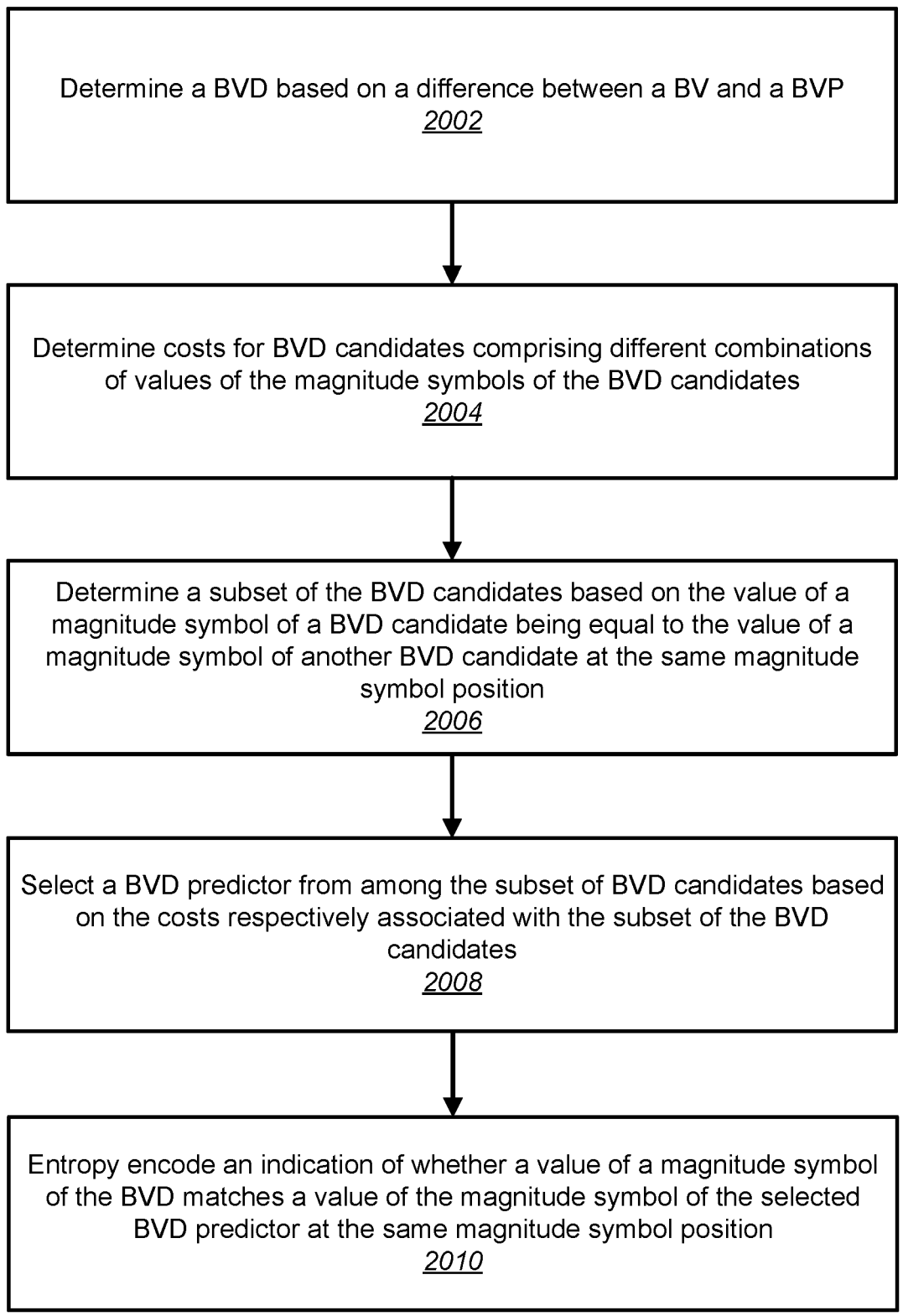
FIG. 20 shows an example method of entropy encoding an indication of whether a value of a magnitude symbol of a BVD matches a value of a magnitude symbol of a BVD candidate used as a predictor of the BVD.

FIG. 20 shows an example method of entropy encoding an indication of whether a value of a magnitude symbol of a BVD matches a value of a magnitude symbol of a BVD candidate used as a predictor of the BVD. More specifically, FIG. 20 shows a flowchart 2000 of example method steps for entropy encoding an indication of whether a value of a magnitude symbol of a BVD matches a value of the magnitude symbol of a BVD candidate used as a predictor of the BVD. One or more steps of the example flowchart 2000 may be performed by an encoder, such as encoder 114 as shown in FIG. 1 and/or encoder 200 as shown in FIG. 2.

At step 2002, the encoder may determine a BVD based on a difference between a BV and a BVP. The BV may indicate a displacement of a reference block relative to a current block. The reference block may be used to predict the current block.

At step 2004, the encoder may determine (e.g., calculate, obtain, receive) respective costs for BVD candidates. The BVD candidates may comprise different combinations of values of the magnitude symbols of the BVD candidates. For example, a first BVD candidate may comprise at least two magnitude symbols, for example, a first magnitude symbol and a second magnitude symbol. The combination of values for the first magnitude symbol and the second magnitude symbol may be different. For example, if binary (e.g., {0, 1}) is used to represent the values of the magnitude symbols, then the combination of values for the first magnitude symbol and the second magnitude symbol may be "1" and "1," "1" and "0," "0" and "1," or "0" and "0." A second BVD candidate also may comprise at least two magnitude symbols, for example a third magnitude symbol and a fourth magnitude symbol. The first and second magnitude symbols of the first BVD candidate may correspond to the same magnitude symbol position as the third and fourth magnitude symbols of the second BVD candidate (e.g., the first and second most significant bit positions (consecutive bit positions), the first and third most significant bit positions (non-consecutive bit positions), etc.). The combination of values for the third magnitude symbol and the fourth magnitude symbol of the second BVD candidate may be different than the combination of values for the first magnitude symbol and the second magnitude symbol of the first BVD candidate. For example, if binary (e.g., {0, 1}) is used to represent the values of the magnitude symbols, then the combination of values for the first magnitude symbol and the second magnitude symbol may be "1" and "1," "1" and "0," "0" and "1," or "0" and "0." To provide one specific, non-limiting example, if the combination of values for the first and second magnitude symbols of the first BVD candidate is "1" and "0," then the different combination of values for the third and fourth magnitude symbols of the second BVD candidate may be "1" and "1," "0" and "1," or "0" and "0." Other examples will be recognized and appreciated with the benefit of the disclosures herein. The encoder may determine (e.g., calculate, obtain), for example, a respective cost associated with each BVD candidate of the BVD candidates. The encoder may determine (e.g., calculate, obtain, receive) the cost for example, based on a difference between a template of a current block and a template of a candidate reference block displaced relative to the current block by a sum of the BVD candidate and the BVP. A magnitude symbol may be in either a horizontal component, $BVD_X$, or vertical component, $BVD_Y$, of the BVD candidate.

At step 2006, the encoder may determine (e.g., select, obtain, receive) a subset of the BVD candidates. The encoder may determine (e.g., select, obtain, receive) a subset of the BVD candidates, for example, based on a value of a magnitude symbol of a BVD candidate being equal to a value of a magnitude symbol of another BVD candidate at the same magnitude symbol position. For example, a magnitude symbol of a first BVD candidate may have a value of "1" at a given magnitude symbol position (e.g., the most significant bit position), a magnitude symbol of a second BVD candidate may have a value of "0" at that magnitude symbol position, and a magnitude symbol of a third BVD candidate may have a value of "1" at that magnitude symbol position. The encoder, in this example, may determine (e.g., select, obtain, receive) a subset of the BVD candidates that includes the first BVD candidate and the third BVD candidate based on the value magnitude symbols at the magnitude symbol position both being equal to "1." The subset of BVD candidates, in this example, may not include the second BVD candidate based on the value of the magnitude symbol at the magnitude symbol position being different, specifically being equal to "0" rather than "1."

At step 2008, the encoder may select (e.g. determine, obtain, receive) a BVD predictor from among the subset of the BVD candidates. The encoder may select (e.g. determine, obtain, receive) the BVD predictor, for example, based on the costs respectively associated with the subset of BVD candidates. A cost may be determined (e.g., calculated, obtained, received) based on a respective BVD candidate in the subset of the BVD candidates. The encoder may select (e.g. determine, obtain, receive), as the BVD predictor the BVD candidate in the subset of BVD candidates that is associated with a lowest (e.g., smallest) cost of the costs determined for the subset of BVD candidates. The BVD may be one of the BVD candidates. A magnitude symbol may be in either a horizontal component or a vertical component of a BVD, BVD candidate, and/or BVD predictor.

At step 2010, the encoder may entropy encode an indication of whether a value of a magnitude symbol of the BVD matches a value of a magnitude symbol of the BVD predictor at the same magnitude symbol position. The encoder may entropy encode the indication, for example, by arithmetically encoding the indication based on a probability model. A probability model may indicate a least probable symbol for the indication and a value of a most probable symbol for the indication. The decoder may select (e.g. determine, obtain, receive) the probability model from among a plurality of probability models. The probability model may be selected (e.g. determined, obtained, received) from a plurality of probability models, for example, based on a position of a magnitude symbol in a BVD. The probability model may be selected (e.g. determined, obtained, received) from a plurality of probability models, for example, based on a change in value of a BVD for an incremental change in value of the magnitude symbol of the BVD. The probability model may be selected (e.g. determined, obtained, received) from the plurality of probability models, for example, based on a comparison of a change in the value of a BVD to one or more thresholds.

The encoder may further select (e.g. determine, obtain, receive) a second BVD predictor from among the BVD candidates, for example, based on the costs respectively associated with the BVD candidates. The encoder may entropy encode an indication of whether a value of a second magnitude symbol of the BVD matches a value of a magnitude symbol of the second BVD predictor at the same magnitude symbol position (e.g., the second most significant bit position). The encoder may select (e.g. determine, obtain, receive), as the second BVD predictor, the BVD candidate in a subset (e.g., a further subset) of the BVD candidates that is associated with a lowest (e.g., smallest) cost among the costs determined for the subset of BVD candidates.

A BVD candidate (e.g., each BVD candidate) may be represented in binary form. For example, a Golomb code word may be used to represent the BVD candidate. The Golomb code word may comprise, for example in a suffix of the Golomb code word, a first magnitude symbol of the BVD candidate and a second magnitude symbol of the BVD candidate. The Golomb code word may be an exponential-Golomb code word.

Figure 21:
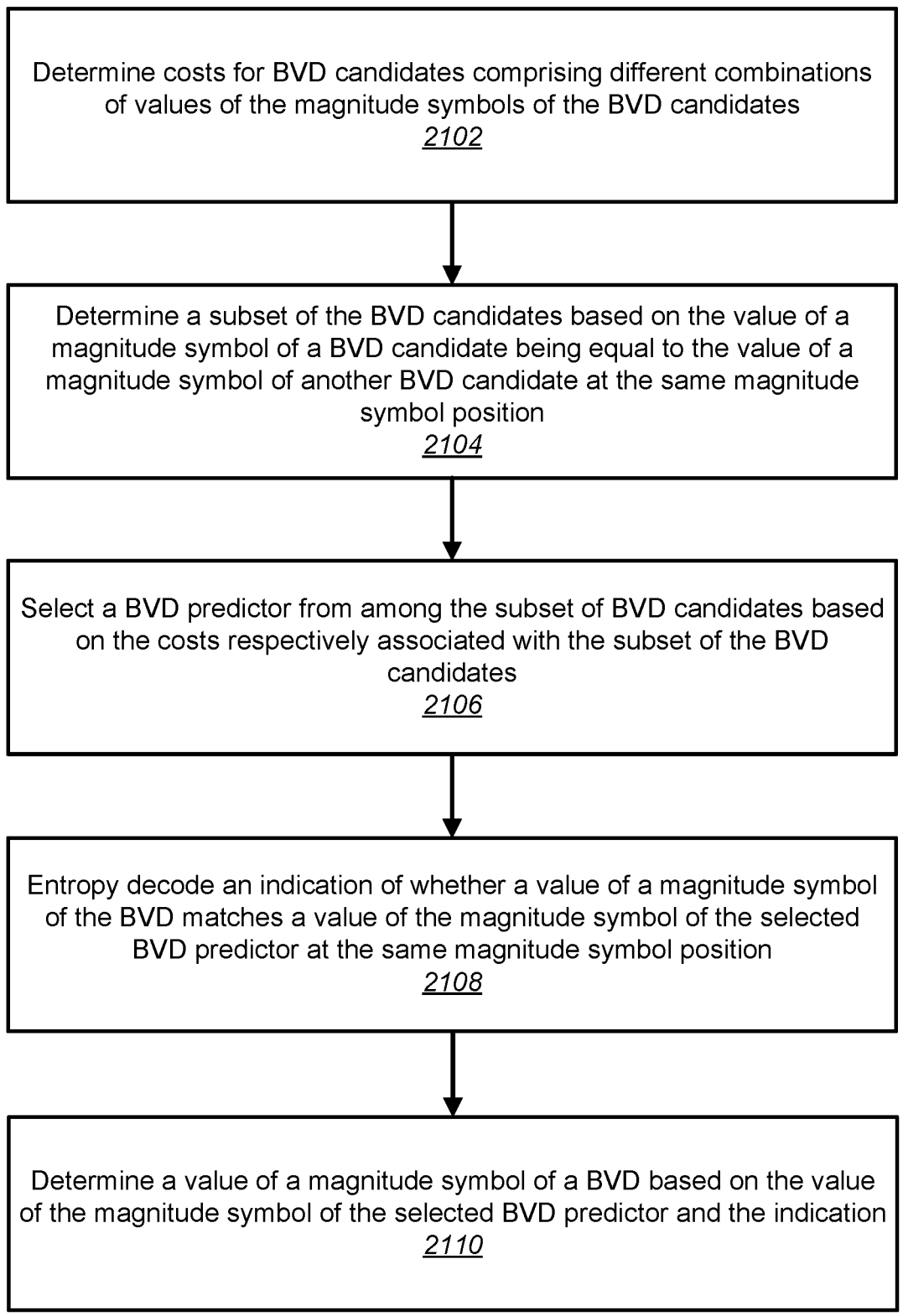
FIG. 21 shows an example method of entropy decoding an indication of whether a value of a magnitude symbol of a BVD matches a value of a magnitude symbol of a BVD candidate used as a predictor of the BVD and using the indication to determine a magnitude symbol of the BVD.

FIG. 21 shows an example method of entropy decoding an indication of whether a value of a magnitude symbol of a BVD matches a value of a magnitude symbol of a BVD candidate used as a predictor of the BVD and using the indication to determine a magnitude symbol of the BVD. More specifically, FIG. 21 shows a flowchart 2100 of example method steps for entropy decoding an indication of whether a value of a magnitude symbol of a BVD matches a value of a magnitude symbol of a BVD candidate used as a predictor of the BVD and using the indication to determine (e.g., obtain) a magnitude symbol of the BVD. One or more steps of the example flowchart 2100 may be performed by a decoder, such as the decoder 120 as shown in FIG. 1 and/or the decoder 300 as shown in FIG. 3.

At step 2102, the decoder may determine (e.g., calculate, obtain) respective costs for BVD candidates. The BVD candidates may comprise different combinations of values of the magnitude symbols of the BVD candidates as described herein (e.g., as described with reference to FIG. 20). The decoder may determine (e.g., calculate, obtain), for example, a respective cost associated with each BVD candidate of the BVD candidates.

At step 2104, the decoder may determine (e.g., select, obtain, receive) a subset of the BVD candidates. The decoder may determine (e.g., select, obtain, receive) a subset of the BVD candidates, for example, based on a value of a magnitude symbol of a BVD candidate being equal to a value of a magnitude symbol of another BVD candidate at the same magnitude symbol position as described herein (e.g., as described with reference to FIG. 20).

At step 2106, the decoder may determine (e.g., select, obtain, receive) a BVD predictor from among the subset of BVD candidates. The decoder may determine (e.g., select, obtain, receive) the BVD candidate, for example, based on the costs respectively associated with the subset of BVD candidates. A cost may be determined (e.g., calculated, obtained, received) based on a respective BVD candidate in the subset of the BVD candidates. The decoder may determine (e.g., select, obtain, receive), as the BVD predictor the BVD candidate in the subset of BVD candidates that is associated with a lowest (e.g., smallest) cost of the costs determined for the subset of BVD candidates. The BVD may be one of the BVD candidates. A magnitude symbol may be in either a horizontal component or a vertical component of a BVD, BVD candidate, or BVD predictor.

At step 2108, the decoder may entropy decode an indication of whether a value of a magnitude symbol of the BVD matches a value of the a magnitude symbol of the BVD predictor at the same magnitude symbol position. The decoder may entropy decode the indication, for example, by arithmetically decoding the indication based on a probability model. A probability model may indicate a least probable symbol for the indication and a value of a most probable symbol for the indication. The decoder may determine (e.g., select, obtain, receive) the probability model from among a plurality of probability models. The probability model may be determined (e.g., selected, obtained, received) from a plurality of probability models, for example, based on a position of a magnitude symbol in a BVD. The probability model may be determined (e.g., selected, obtained, received) from a plurality of probability models, for example, based on a change in value of a BVD for an incremental change in value of the first magnitude symbol of the BVD. The probability model may be determined (e.g., selected, obtained, received) from the plurality of probability models, for example, based on a comparison of a change in the value of a BVD to one or more thresholds.

At step 2110, the decoder may determine the value of a magnitude symbol of a BVD based on a value of a magnitude symbol of the BVD predictor and the indication. The decoder may determine the value of the magnitude symbol of the BVD as being equal to the value of the magnitude symbol of the BVD predictor, for example, based on the indication indicating that the value of the magnitude symbol of the BVD matches the value of the magnitude symbol of the BVD predictor. The decoder may determine the value of the magnitude symbol of the BVD as being not equal to the value of the magnitude symbol of the BVD predictor, for example, based on the indication indicating that the value of the magnitude symbol of the BVD does not match the value of the magnitude symbol of the BVD predictor.

The decoder may further determine (e.g., select, obtain, receive) a second BVD predictor from among the BVD candidates, for example, based on the costs respectively associated with the BVD candidates. The decoder may entropy decode an indication of whether a value of a second magnitude symbol of the BVD matches a value of a magnitude symbol of the second BVD predictor at the same magnitude symbol position (e.g., the second most significant bit position). The decoder may determine (e.g., select, obtain, receive), as the second BVD predictor, the BVD candidate in a subset (e.g., a further subset) of the BVD candidates that is associated with a lowest (e.g., smallest) cost determined for the subset of BVD candidates. The decoder may further determine the value of the second magnitude symbol of the BVD, for example, based on the value of the second magnitude symbol of the second BVD predictor and the indication of whether the value of the second magnitude symbol of the BVD matches a value of the second magnitude symbol of the second BVD predictor at the same magnitude symbol position.

The decoder may further determine (e.g., calculate, obtain) a block vector (BV), for example, based on a sum of the BVD and a block vector predictor (BVP). The BV may indicate a displacement of a reference block relative to a current block. The reference block may be used to predict the current block. The decoder may determine (e.g., calculate, obtain, receive) a cost, for a BVD candidate (e.g., each BVD candidate) in a plurality of BVD candidates, for example, based on a difference between a template of a current block and a template of a candidate reference block displaced relative to the current block by a sum of the BVD candidate and the BVP.

A BVD candidate (e.g., each BVD candidate) may be represented in binary form. For example, a Golomb code word may be used to represent the BVD candidate. The Golomb code word may comprise, for example, in a suffix of the Golomb code word, a first magnitude symbol of the BVD candidate and a second magnitude symbol of the BVD candidate. The Golomb code word may be an exponential-Golomb code word.

Figure 22:
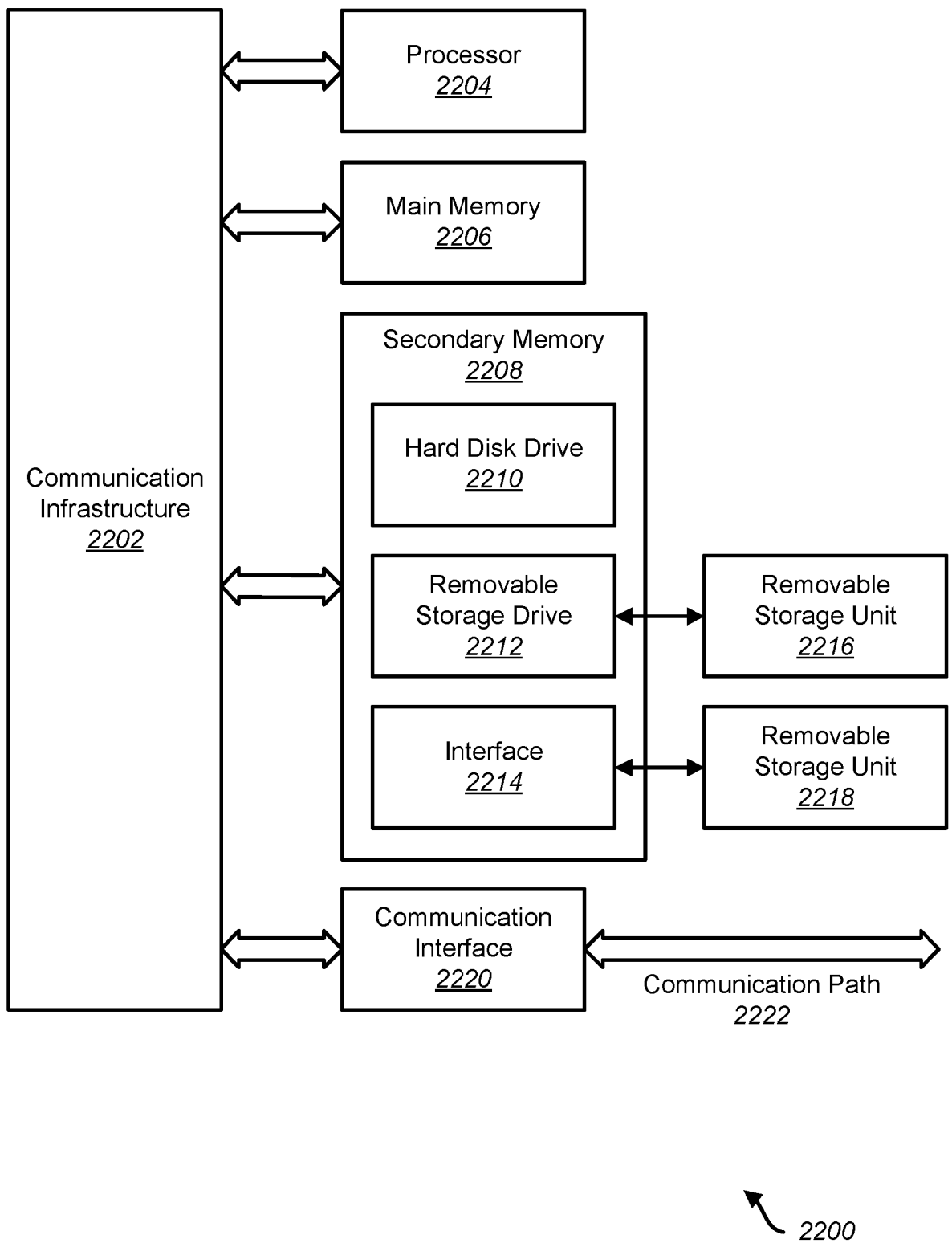
FIG. 22 shows an example computer system in which examples of the present disclosure may be implemented.

FIG. 22 shows an example computer system in which examples of the present disclosure may be implemented. For example, the example computer system 2200 shown in FIG. 22 may implement one or more of the methods described herein. For example, various devices and/or systems described herein (e.g., in FIGS. 1, 2, and 3) may be implemented in the form of one or more computer systems 2200. Furthermore, each of the steps of the flowcharts depicted in this disclosure may be implemented on one or more computer systems 2200.

The computer system 2200 may comprise one or more processors, such as a processor 2204. The processor 2204 may be a special purpose processor, a general purpose processor, a microprocessor, and/or a digital signal processor. The processor 2204 may be connected to a communication infrastructure 2202 (for example, a bus or network). The computer system 2200 may also comprise a main memory 2206 (e.g., a random access memory (RAM)), and/or a secondary memory 2208.

The secondary memory 2208 may comprise a hard disk drive 2210 and/or a removable storage drive 2212 (e.g., a magnetic tape drive, an optical disk drive, and/or the like). The removable storage drive 2212 may read from and/or write to a removable storage unit 2216. The removable storage unit 2216 may comprise a magnetic tape, optical disk, and/or the like. The removable storage unit 2216 may be read by and/or may be written to the removable storage drive 2212. The removable storage unit 2216 may comprise a computer usable storage medium having stored therein computer software and/or data.

The secondary memory 2208 may comprise other similar means for allowing computer programs or other instructions to be loaded into the computer system 2200. Such means may include a removable storage unit 2218 and/or an interface 2214. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2218 and interfaces 2214 which may allow software and/or data to be transferred from the removable storage unit 2218 to the computer system 2200.

The computer system 2200 may also comprise a communications interface 2220. The communications interface 2220 may allow software and data to be transferred between the computer system 2200 and external devices. Examples of the communications interface 2220 may include a modem, a network interface (e.g., an Ethernet card), a communications port, etc. Software and/or data transferred via the communications interface 2220 may be in the form of signals which may be electronic, electromagnetic, optical, and/or other signals capable of being received by the communications interface 2220. The signals may be provided to the communications interface 2220 via a communications path 2222. The communications path 2222 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2216 and 2218 or a hard disk installed in the hard disk drive 2210. The computer program products may be means for providing software to the computer system 2200. The computer programs (which may also be called computer control logic) may be stored in the main memory 2206 and/or the secondary memory 2208. The computer programs may be received via the communications interface 2220. Such computer programs, when executed, may enable the computer system 2200 to implement the present disclosure as discussed herein. In particular, the computer programs, when executed, may enable the processor 2204 to implement the processes of the present disclosure, such as any of the methods described herein. Accordingly, such computer programs may represent controllers of the computer system 2200.

Figure 23:
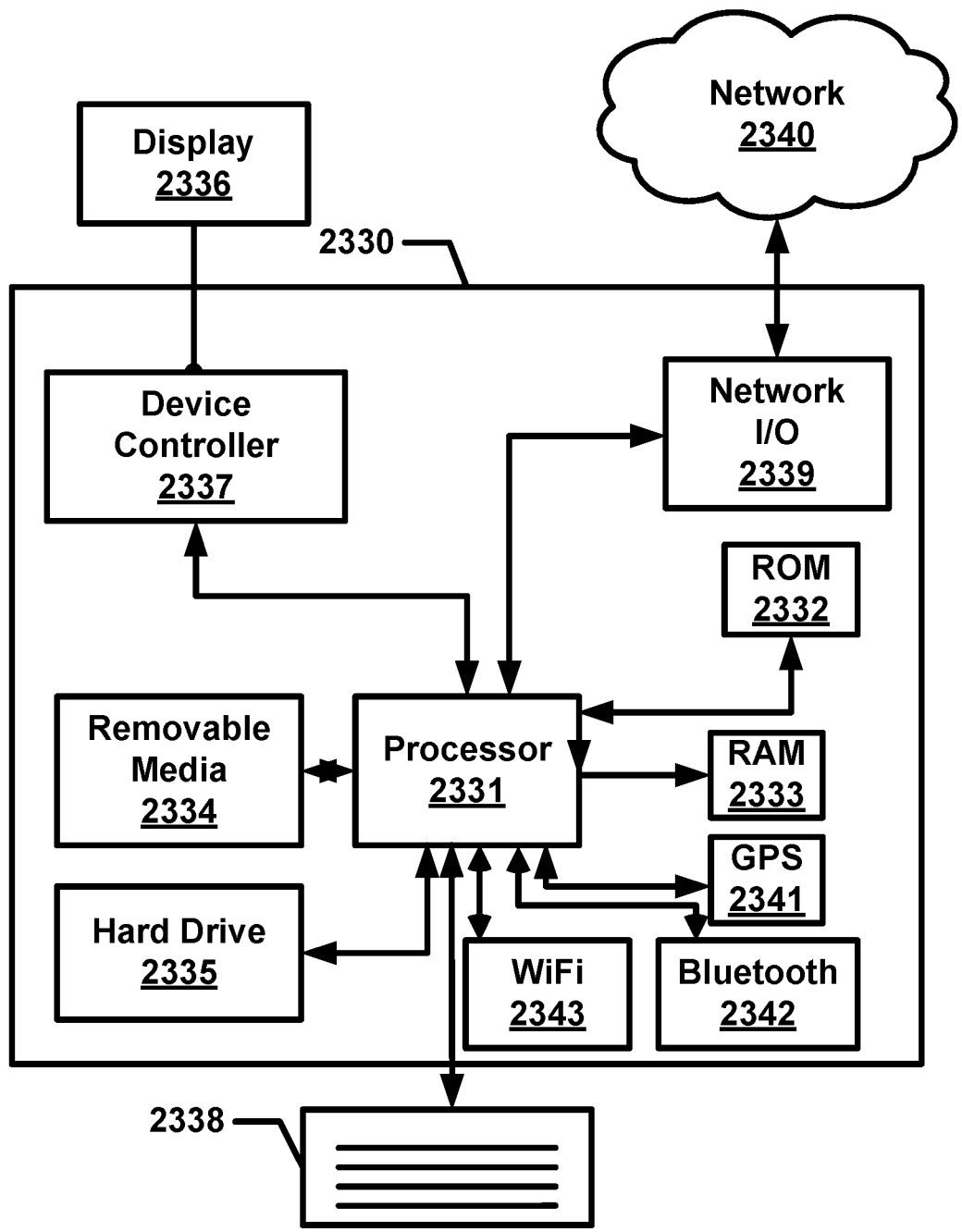
FIG. 23 shows example elements of a computing device that may be used to implement any of the various devices described herein.

FIG. 23 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2330 may include one or more processors 2331, which may execute instructions stored in the random-access memory (RAM) 2333, the removable media 2334 (such as a Universal Serial Bus (USB) drive, compact disk (CD) or digital versatile disk (DVD), or floppy disk drive), or any other desired storage medium. Instructions may also be stored in an attached (or internal) hard drive 2335. The computing device 2330 may also include a security processor (not shown), which may execute instructions of one or more computer programs to monitor the processes executing on the processor 2331 and any process that requests access to any hardware and/or software components of the computing device 2330 (e.g., ROM 2332, RAM 2333, the removable media 2334, the hard drive 2335, the device controller 2337, a network interface 2339, a GPS 2341, a Bluetooth interface 2342, a WiFi interface 2343, etc.). The computing device 2330 may include one or more output devices, such as the display 2336 (e.g., a screen, a display device, a monitor, a television, etc.), and may include one or more output device controllers 2337, such as a video processor. There may also be one or more user input devices 2338, such as a remote control, keyboard, mouse, touch screen, microphone, etc. The computing device 2330 may also include one or more network interfaces, such as a network interface 2339, which may be a wired interface, a wireless interface, or a combination of the two. The network interface 2339 may provide an interface for the computing device 2330 to communicate with a network 2340 (e.g., a RAN, or any other network). The network interface 2339 may include a modem (e.g., a cable modem), and the external network 2340 may include communication links, an external network, an in-home network, a provider's wireless, coaxial, fiber, or hybrid fiber/coaxial distribution system (e.g., a DOCSIS network), or any other desired network. Additionally, the computing device 2330 may include a location-detecting device, such as a global positioning system (GPS) microprocessor 2341, which may be configured to receive and process global positioning signals and determine, with possible assistance from an external server and antenna, a geographic position of the computing device 2330.

The example in FIG. 23 may be a hardware configuration, although the components shown may be implemented as software as well. Modifications may be made to add, remove, combine, divide, etc. components of the computing device 2330 as desired. Additionally, the components may be implemented using basic computing devices and components, and the same components (e.g., processor 2331, ROM storage 2332, display 2336, etc.) may be used to implement any of the other computing devices and components described herein. For example, the various components described herein may be implemented using computing devices having components such as a processor executing computer-executable instructions stored on a computer-readable medium, as shown in FIG. 23. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. A plurality of costs for a plurality of block vector difference (BVD) candidates may be determined. Each BVD candidate may comprise a different combination of values for a plurality of magnitude symbols. A subset of the plurality of BVD candidates may be determined. A value of a magnitude symbol of each BVD candidate, of the subset of the plurality of BVD candidates, may match a value of the magnitude symbol of a BVD of a current block. One of the BVD candidates may be selected as a BVD predictor. The BVD predictor may be selected from the subset of the plurality of BVD candidates. The BVD predictor may be selected based on at least one of the plurality of costs. An entropy-encoded indication of whether the value of the magnitude symbol of the BVD matches a value of the magnitude symbol of the BVD predictor may be decoded. The value of the magnitude symbol of the BVD may be determined based on the value of the magnitude symbol of the BVD predictor and the decoded indication. One of the plurality of BVD candidates may be selected as a second BVD predictor. The second BVD predictor may be selected based on the plurality of costs. An entropy-encoded indication of whether the a value of a second magnitude symbol of the BVD matches a value of the second magnitude symbol of the second BVD predictor may be decoded.

Selecting the BVD predictor may comprise selecting the BVD predictor based on the BVD predictor being associated with a lowest cost of the plurality of costs. A second subset of the plurality of BVD candidates may be determined. A value of a second magnitude symbol of each BVD candidate, of the second subset of the plurality of BVD candidates, may match a value of the second magnitude symbol of the BVD. A probability model may be selected. The probability model may be selected from a plurality of probability models. The probability model may indicate a probability of a least probable symbol for the entropy-encoded indication. The probability model may indicate a value of a most probable symbol for the entropy-encoded indication. Decoding the entropy-encoded indication may comprise arithmetically decoding the entropy-encoded indication based on the selected probability model. Selecting the probability model may comprise selecting the probability model based on a position of the magnitude symbol of the BVD. Selecting the probability model may comprise selecting the probability model based on a change in value of the BVD associated with an incremental change in value of the magnitude symbol of the BVD. Selecting the probability model may comprise selecting the probability model based on a change in value of the BVD satisfying one or more thresholds. Determining the value of the magnitude symbol of the BVD may comprise determining, based on the decoded indication indicating that the value of the magnitude symbol of the BVD matches the value of the magnitude symbol of the BVD predictor, that the value of the magnitude symbol of the BVD is equal to the value of the magnitude symbol of the BVD predictor. Determining the value of the magnitude symbol of the BVD may comprise determining, based on the decoded indication indicating that the value of the magnitude symbol of the BVD does not match the value of the magnitude symbol of the BVD predictor, that the value of the magnitude symbol of the BVD is not equal to the value of the magnitude symbol of the BVD predictor. Calculating the plurality of costs may comprise calculating a cost based on a difference between a template of a current block and a template of a candidate reference block that is displaced relative to the current block by a sum of the BVD candidate and a block vector predictor (BVP). A BVD candidate of the plurality of BVD candidates may be represented in binary form using an exponential-Golomb code word. The exponential-Golomb code word may comprise, in a suffix of the exponential-Golomb code word, an indication of a value of at least one of the plurality of magnitude symbols. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to entropy encode the indication of whether the value of the first magnitude symbol of the BVD matches the value of the first magnitude symbol of the BVD predictor. A computer-readable medium may store instructions that, when executed, cause performance of the described method, additional operations and/or include the additional elements.

A computing device may perform a method comprising multiple operations. A plurality of BVD candidates may be determined. A first combination of values for a first magnitude symbol and a second magnitude symbol of a first BVD candidate may be different than a second combination of values for the first magnitude symbol and the second magnitude symbol of a second BVD candidate. A subset of the plurality of BVD candidates may be determined. At least one magnitude symbol of each BVD candidate of the subset of the plurality of BVD candidates may be the same. One of the BVD candidates may be selected, from the subset of the plurality of BVD candidates, as a BVD predictor. The BVD predictor may be selected based on a plurality of costs associated with the plurality of BVD candidates. An entropy-encoded indication of whether a value of the first magnitude symbol of a BVD matches a value of the first magnitude symbol of the BVD predictor may be determined. The value of the first magnitude symbol of the BVD may be determined based on the value of the first magnitude symbol of the BVD predictor and the decoded indication. A probability model may be selected. The probability model may be selected from a plurality of probability models. The probability model may indicate a probability of a least probable symbol for the indication. The probability model may indicate a value of a most probable symbol for the indication. Decoding the entropy-encoded indication may comprise arithmetically decoding the decoded indication based on the selected probability model. A BVD candidate, of the plurality of BVD candidates, may be represented in binary form using an exponential-Golomb code word. The exponential-Golomb code word may comprise, in a suffix of the exponential-Golomb code word, an indication of a value of the first magnitude symbol of the BVD candidate and an indication of a value of the second magnitude symbol of the BVD candidate. The plurality of costs comprises a plurality of template matching costs. The first magnitude symbol of the BVD may be a magnitude symbol of a horizontal component of the BVD. The first magnitude symbol of the BVD may be a magnitude symbol of a vertical component of the BVD. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to entropy encode the indication of whether the value of the first magnitude symbol of the BVD matches the value of the first magnitude symbol of the BVD predictor. A computer-readable medium may store instructions that, when executed, cause performance of the described method, additional operations and/or include the additional elements.

A computing device may perform a method comprising multiple operations. A plurality of different block vector difference (BVD) candidates may be pruned. The plurality of different BVD candidates may be pruned based on whether a value of a magnitude symbol of a BVD candidate of the plurality of different BVD candidates is the same as a value of the magnitude symbol of a BVD. A BVD candidate may be selected, from the pruned plurality of different BVD candidates, as a BVD predictor. The BVD predictor may be selected based on a template matching cost associated with the BVD candidate. An entropy-encoded indication of whether a value of the magnitude symbol of the BVD matches a value of the magnitude symbol of the BVD predictor may be decoded. The value of the magnitude symbol of the BVD may be determined based on the value of the magnitude symbol of the BVD predictor and the decoded indication. A block vector (BV) may be determined based on a sum of the BVD and a block vector predictor (BVP). Selecting the BVD candidate as the BVD predictor may comprise selecting the BVD candidate as the BVD predictor based on the template matching cost associated with the BVD candidate being the lowest template matching cost of a plurality of template matching costs associated with the pruned plurality of different BVD candidates. A probability model may be selected. The probability model may be selected from a plurality of probability models. The probability model may indicate a probability of a least probable symbol for the indication. The probability model may indicate a value of a most probable symbol for the indication. Decoding the entropy-encoded indication may comprise arithmetically decoding the decoded indication based on the selected probability model. A BVD candidate, of the plurality of different BVD candidates, may be represented in binary form using an exponential-Golomb code word. The exponential-Golomb code word may comprise, in a suffix of the exponential-Golomb code word, an indication of a value of a first magnitude symbol of the BVD candidate and an indication of a value of a second magnitude symbol of the BVD candidate. The plurality of different BVD candidates may comprises the BVD. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to entropy encode the indication of whether the value of the magnitude symbol of the BVD matches the value of the magnitude symbol of the BVD predictor. A computer-readable medium may store instructions that, when executed, cause performance of the described method, additional operations and/or include the additional elements.

A computing device may perform a method comprising multiple operations. A block vector difference (BVD) may be determined based on a difference between a block vector (BV) and a block vector predictor (BVP). Costs for BVD candidates that each comprise a first magnitude symbol and a second magnitude symbol with a different combination of values may be calculated. A subset of the BVD candidates that each have a value of the second magnitude symbol equal to a value of the second magnitude symbol of the BVD may be determined. A first BVD predictor may be selected from among the subset of the BVD candidates based on a subset of the costs for the subset of the BVD candidates. An indication of whether a value of the first magnitude symbol of the BVD matches a value of the first magnitude symbol of the first BVD predictor may be entropy encoded. A second BVD predictor may be selected from among the BVD candidates based on the costs. An indication of whether the value of the second magnitude symbol of the BVD matches a value of the second magnitude symbol of the second BVD predictor may be entropy encoded. Selecting the second BVD predictor may further comprise selecting the second BVD predictor, from among the BVD candidates, as a BVD candidate with a smallest cost among the costs. Each cost in the costs may be calculated based on a respective BVD candidate in the BVD candidates. Each cost in the subset of the costs may be calculated based on a respective BVD candidate in the subset of the BVD candidates. Selecting the first BVD predictor may further comprise selecting the first BVD predictor, from among the subset of the BVD candidates, as a BVD candidate with a lowest (e.g., smallest) cost among the subset of the costs.

Calculating the costs for BVD candidates may comprise calculating a cost, for each BVD candidate of the BVD candidates, based on a difference between a template of a current block and a template of a candidate reference block displaced relative to the current block by a sum of the BVD candidate and the BVP. The BV may indicate a displacement of a reference block relative to a current block. The reference block may be used to predict the current block. The BVD may be one of the BVD candidates. The first magnitude symbol may be in either a horizontal or vertical component. The entropy encoding the indication may further comprise arithmetically encoding the indication based on a probability model indicating a probability of a least probable symbol for the indication, and a value of a most probable symbol for the indication. The probability model may selected from a plurality of probability models based on a position of the first magnitude symbol in the BVD. The probability model may be selected from a plurality of probability models based on a change in value of the BVD for an incremental change in value of the first magnitude symbol of the BVD. The probability model may be selected from the plurality of probability models based on a comparison of the change in the value of the BVD to one or more thresholds. Each of the BVD candidates may be represented in binary form using a Golomb code word comprising, in a suffix of the Golomb code word, the first magnitude symbol of the BVD candidate and the second magnitude symbol of the BVD candidate. The Golomb code word may be an exponential-Golomb code word. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to entropy decode the indication of whether the value of the first magnitude symbol of the BVD matches the value of the first magnitude symbol of the first BVD predictor. A computer-readable medium may store instructions that, when executed, cause performance of the described method, additional operations and/or include the additional elements.

A computing device may perform a method comprising multiple operations. Costs for block vector difference (BVD) candidates that each comprise a first magnitude symbol and a second magnitude symbol with a different combination of values may be calculated. A subset of the BVD candidates that each have a value of the second magnitude symbol equal to a value of the second magnitude symbol of a BVD may be determined. A first BVD predictor may be selected from among the subset of the BVD candidates based on a subset of the costs that are for the subset of the BVD candidates. An indication of whether a value of the first magnitude symbol of the BVD matches a value of the first magnitude symbol of the first BVD predictor may be entropy decoded. The value of the first magnitude symbol of the BVD may be determined based on the value of the first magnitude symbol of the first BVD predictor and the indication. A second BVD predictor may be selected from among the BVD candidates based on the costs. An indication of whether the value of the second magnitude symbol of the BVD matches a value of the second magnitude symbol of the second BVD predictor may be entropy decoded. Each cost in the costs may be calculated based on a respective BVD candidate in the BVD candidates. Selecting the second BVD predictor may further comprise selecting the second BVD predictor, from among the BVD candidates, as a BVD candidate with a smallest cost among the costs. The value of the second magnitude symbol of the BVD may be determined based on the value of the second magnitude symbol of the second BVD predictor and the indication of whether the value of the second magnitude symbol of the BVD matches a value of the second magnitude symbol of the second BVD predictor. Each cost in the subset of the costs is calculated based on a respective BVD candidate in the subset of the BVD candidates. Selecting the first BVD predictor may further comprise selecting the first BVD predictor, from among the subset of the BVD candidates, as a BVD candidate with a smallest cost among the subset of the costs. Decoding the indication may further comprise arithmetically decoding the indication based on a probability model indicating a probability of a least probable symbol for the indication, and a value of a most probable symbol for the indication. The probability model may be selected from a plurality of probability models based on a position of the first magnitude symbol in the BVD. The probability model may be selected from a plurality of probability models based on a change in value of the BVD for an incremental change in value of the first magnitude symbol of the BVD. The probability model may be selected from the plurality of probability models based on a comparison of the change in the value of the BVD to one or more thresholds. The determining the value of the first magnitude symbol of the BVD may further comprise determining the value of the first magnitude symbol of the BVD as being equal to the value of the first magnitude symbol of the BVD predictor based on the indication indicating that the value of the first magnitude symbol of the BVD matches the value of the first magnitude symbol of the BVD predictor. Determining the value of the first magnitude symbol of the BVD may further comprise determining the value of the first magnitude symbol of the BVD as being not equal to the value of the first magnitude symbol of the BVD predictor based on the indication indicating that the value of the first magnitude symbol of the BVD matches the value of the first magnitude symbol of the BVD predictor. A block vector (BV) may be determined based on a sum of the BVD and a block vector predictor (BVP), wherein the BV indicates a displacement of a reference block relative to a current block, and the reference block is used to predict the current block. Calculating the costs for the BVD candidates may comprise calculating a cost, for each BVD candidate in the plurality of BVD candidates, based on a difference between a template of a current block and a template of a candidate reference block displaced relative to the current block by a sum of the BVD candidate and the BVP. The BVD may be one of the BVD candidates. The first magnitude symbol may be in either a horizontal or vertical component. Each of the BVD candidates may be represented in binary form using a Golomb code word comprising, in a suffix of the Golomb code word, the first magnitude symbol of the BVD candidate and the second magnitude symbol of the BVD candidate. The Golomb code word may be an exponential-Golomb code word. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to entropy encode the indication of whether the value of the first magnitude symbol of the BVD matches the value of the first magnitude symbol of the first BVD predictor. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    determining, by a computing device, a plurality of costs for a plurality of block vector difference (BVD) candidates associated with decoding of a current block of content, wherein each BVD candidate comprises a different combination of values for a plurality of magnitude symbols;
    determining a subset of the plurality of BVD candidates, wherein a value of a first magnitude symbol of each BVD candidate, of the subset of the plurality of BVD candidates, matches a value of the first magnitude symbol of a BVD of the current block;
    selecting, from the subset of the plurality of BVD candidates and based on at least one of the plurality of costs, one of the plurality of BVD candidates as a BVD predictor;
    decoding an entropy-encoded indication of whether a value of a second magnitude symbol of the BVD matches a value of the second magnitude symbol of the BVD predictor; and
    determining, based on the value of the second magnitude symbol of the BVD predictor and the decoded indication, a value of the second magnitude symbol of the BVD.

2. The method of claim 1, further comprising:
    selecting, based on the plurality of costs, one of the plurality of BVD candidates as a second BVD predictor; and
    decoding an entropy-encoded indication of whether a value of a third magnitude symbol of the BVD matches a value of the third magnitude symbol of the second BVD predictor.

3. The method of claim 1, wherein the selecting the BVD predictor comprises selecting the BVD predictor based on the BVD predictor being associated with a lowest cost of the plurality of costs.

4. The method of claim 1, further comprising determining a second subset of the plurality of BVD candidates, wherein a value of the second magnitude symbol of each BVD candidate, of the second subset of the plurality of BVD candidates, matches the value of the second magnitude symbol of the BVD.

5. The method of claim 1, further comprising:
selecting, from a plurality of probability models, a probability model indicating:
a probability of a least probable symbol for the entropy-encoded indication; and
a value of a most probable symbol for the entropy-encoded indication;
wherein the decoding the entropy-encoded indication comprises arithmetically decoding, based on the selected probability model, the entropy-encoded indication.

6. The method of claim 5, wherein the selecting the probability model comprises selecting the probability model based on:
a position of the second magnitude symbol of the BVD;
a change in value of the BVD associated with an incremental change in value of the second magnitude symbol of the BVD; or
a change in value of the BVD satisfying one or more thresholds.

7. The method of claim 1, wherein:
the determining the value of the second magnitude symbol of the BVD comprises determining, based on the decoded indication indicating that the value of the second magnitude symbol of the BVD matches the value of the second magnitude symbol of the BVD predictor, that the value of the second magnitude symbol of the BVD is equal to the value of the second magnitude symbol of the BVD predictor; or
the determining the value of the second magnitude symbol of the BVD comprises determining, based on the decoded indication indicating that the value of the second magnitude symbol of the BVD does not match the value of the second magnitude symbol of the BVD predictor, that the value of the second magnitude symbol of the BVD is not equal to the value of the second magnitude symbol of the BVD predictor.

8. The method of claim 1, wherein the determining the plurality of costs comprises calculating a cost based on a difference between:
a template of the current block; and
a template of a candidate reference block that is displaced relative to the current block by a sum of the BVD candidate and a block vector predictor (BVP).

9. The method of claim 1, further comprising representing a BVD candidate of the plurality of BVD candidates in binary form using an exponential-Golomb code word that comprises, in a suffix of the exponential-Golomb code word, an indication of a value of at least one of the plurality of magnitude symbols.

10. A method comprising:
determining, by a computing device, a plurality of block vector difference (BVD) candidates associated with decoding of a current block of content, wherein a first combination of values for a first magnitude symbol and a second magnitude symbol of a first BVD candidate is different than a second combination of values for the first magnitude symbol and the second magnitude symbol of a second BVD candidate;
determining a subset of the plurality of BVD candidates, wherein at least one magnitude symbol of each BVD candidate, of the subset of the plurality of BVD candidates, is the same;
selecting, from the subset of the plurality of BVD candidates and based on a plurality of costs associated with the plurality of BVD candidates, one of the BVD candidates as a BVD predictor;
decoding an entropy-encoded indication of whether a value of the first magnitude symbol of a BVD of the current block matches a value of the first magnitude symbol of the BVD predictor;
determining, based on the value of the first magnitude symbol of the BVD predictor and the decoded indication, the value of the first magnitude symbol of the BVD; and
decoding, based on the BVD, the current block of content.

11. The method of claim 10, further comprising:
selecting, from a plurality of probability models, a probability model indicating:
a probability of a least probable symbol for the indication; and
a value of a most probable symbol for the indication;
wherein the decoding the entropy-encoded indication comprises arithmetically decoding, based on the selected probability model, the entropy-encoded indication.

12. The method of claim 10, further comprising representing a BVD candidate, of the plurality of BVD candidates, in binary form using an exponential-Golomb code word that comprises, in a suffix of the exponential-Golomb code word, an indication of a value of the first magnitude symbol of the BVD candidate and an indication of a value of the second magnitude symbol of the BVD candidate.

13. The method of claim 10, wherein the plurality of costs comprises a plurality of template matching costs.

14. The method of claim 10, wherein the first magnitude symbol of the BVD is a magnitude symbol of a horizontal component of the BVD.

15. The method of claim 10, wherein the first magnitude symbol of the BVD is a magnitude symbol of a vertical component of the BVD.

16. A method comprising:
pruning, by a computing device, a plurality of different block vector difference (BVD) candidates associated with decoding of a current block of content based on whether a value of at least one magnitude symbol of a BVD candidate is the same as a value of at least one magnitude symbol of a BVD of the current block;
selecting, from the pruned plurality of different BVD candidates, a BVD candidate as a BVD predictor based on a template matching cost associated with the BVD candidate;
decoding an entropy-encoded indication of whether a value of a magnitude symbol of the BVD matches a value of the magnitude symbol of the BVD predictor;
determining, based on the value of the magnitude symbol of the BVD predictor and the decoded indication, the value of the magnitude symbol of the BVD;
determining, based on a sum of the BVD and a block vector predictor (BVP), a block vector (BV); and
decoding, based on the BV, the current block of content.

17. The method of claim 16, wherein the selecting the BVD candidate as the BVD predictor comprises selecting the BVD candidate as the BVD predictor based on the template matching cost associated with the BVD candidate being the lowest template matching cost of a plurality of template matching costs associated with the pruned plurality of different BVD candidates.

18. The method of claim 16, further comprising:
selecting, from a plurality of probability models, a probability model indicating:
a probability of a least probable symbol for the indication; and
a value of a most probable symbol for the indication;

wherein the decoding the entropy-encoded indication comprises arithmetically decoding, based on the selected probability model, the entropy-encoded indication.

19. The method of claim 16, further comprising representing a BVD candidate, of the plurality of different BVD candidates, in binary form using an exponential-Golomb code word that comprises, in a suffix of the exponential-Golomb code word, an indication of a value of a first magnitude symbol of the BVD candidate and an indication of a value of a second magnitude symbol of the BVD candidate.

20. The method of claim 16, wherein the plurality of different BVD candidates comprises the BVD.

* * * * *